United States Patent
Carlson et al.

(10) Patent No.: US 8,266,856 B2
(45) Date of Patent: Sep. 18, 2012

(54) REINFORCED STRUCTURAL MEMBER AND FRAME STRUCTURES

(75) Inventors: Barry L. Carlson, Fort Collins, CO (US); Jason Underhill, Fort Collins, CO (US)

(73) Assignee: TAC Technologies, LLC, Fort Collins, CO (US)

( * ) Notice: Subject to any disclaimer, the term of this patent is extended or adjusted under 35 U.S.C. 154(b) by 609 days.

(21) Appl. No.: 12/253,155

(22) Filed: Oct. 16, 2008

(65) Prior Publication Data

US 2009/0094929 A1    Apr. 16, 2009

Related U.S. Application Data

(63) Continuation-in-part of application No. 11/777,930, filed on Jul. 13, 2007, now Pat. No. 7,721,496, which is a continuation-in-part of application No. 11/675,587, filed on Feb. 15, 2007, now Pat. No. 7,930,866, which is a continuation-in-part of application No. 11/194,973, filed on Aug. 2, 2005, now Pat. No. 7,213,379, application No. 12/253,155, which is a continuation-in-part of application No. 11/696,629, filed on Apr. 4, 2007, now Pat. No. 7,882,679, which is a continuation of application No. 11/194,973, filed on Aug. 2, 2005, now Pat. No. 7,213,379, application No. 12/253,155, which is a continuation-in-part of application No. 12/233,523, filed on Sep. 18, 2008, now Pat. No. 8,065,848.

(60) Provisional application No. 60/980,423, filed on Oct. 16, 2007, provisional application No. 60/980,427, (Continued)

(51) Int. Cl.
*E04H 12/00* (2006.01)

(52) U.S. Cl. ............... 52/309.16; 52/204.5; 52/204.595; 52/204.7; 52/834; 29/897.312; 264/173.17; 428/172

(58) Field of Classification Search ................ 52/204.5, 52/204.595, 204.7, 204.71, 204.72, 204.1, 52/783.1, FOR. 134, 309.16, 483.1, 834, 52/309.8, 794.1, FOR. 128; 428/411.1, 412, 428/156, 172; 264/34, 271.1, 173.17, 177.1; 29/458, 527.2, 527.1, 897.312, 897.3
See application file for complete search history.

(56) References Cited

U.S. PATENT DOCUMENTS 526,730 A    10/1894    Norcross
(Continued)

FOREIGN PATENT DOCUMENTS

DE    1484185    2/1969
(Continued)

OTHER PUBLICATIONS

U.S. Appl. No. 11/194,973, filed Apr. 3, 2007.
(Continued)

*Primary Examiner* — Robert Canfield
*Assistant Examiner* — Matthew Gitlin
(74) *Attorney, Agent, or Firm* — William W. Cochran; Cochran Freund & Young LLC

(57) ABSTRACT

Disclosed are frame members and mullions for a window frame that comprise a reinforcing member that is surrounded by an outer plastic layer. The outer plastic layer is held securely to the reinforcing member as a result of a waist banding effect that comprises an inward force created by the outer plastic layer as it cools and contracts around the reinforcing member. In addition, lobes are formed in the reinforcing member that assist in holding the outer plastic layer to the reinforcing member. Window inserts can be removed and replaced using adapters and removable brackets. Frame members and mullions can be built sufficiently strong to provide structural support. The frame can also be used to hold photovoltaic cells and protective coverings for photovoltaic cells. Structural members are also disclosed that have reinforcing members with apertures, debossing, scarification and/or indentations that secure the thermoplastic layer to the reinforcing member.

5 Claims, 44 Drawing Sheets

Related U.S. Application Data filed on Oct. 16, 2007, provisional application No. 60/598,014, filed on Aug. 2, 2004, provisional application No. 60/644,451, filed on Jan. 14, 2005, provisional application No. 60/686,870, filed on Jun. 1, 2005, provisional application No. 60/774,105, filed on Feb. 15, 2006, provisional application No. 60/791,301, filed on Apr. 12, 2006, provisional application No. 60/822,048, filed on Aug. 10, 2006, provisional application No. 60/807,294, filed on Jul. 13, 2006, provisional application No. 60/973,425, filed on Sep. 18, 2007.

(56) References Cited

U.S. PATENT DOCUMENTS

| | | | |
|---|---|---|---|
| 1,422,579 | A | 7/1922 | Kent |
| 1,860,205 | A | 5/1932 | Schenker |
| 2,751,775 | A | 6/1956 | Sergovic |
| 3,195,699 | A | 7/1965 | Johnston |
| 3,217,659 | A | 11/1965 | Ford, Jr. |
| 3,228,162 | A | 1/1966 | Gregoire |
| 3,239,982 | A | 3/1966 | Nicosia |
| 3,263,387 | A | 8/1966 | Simpson |
| 3,267,627 | A | 8/1966 | Hammitt |
| 3,283,464 | A | 11/1966 | Litzka |
| 3,284,971 | A | 11/1966 | Attwood |
| 3,286,413 | A | 11/1966 | Wells |
| 3,295,267 | A | 1/1967 | Lundell |
| 3,300,931 | A | 1/1967 | Lutze |
| 3,307,312 | A | 3/1967 | Kreibaum |
| 3,328,931 | A | 7/1967 | Smith |
| 3,368,016 | A | 2/1968 | Birguer |
| 3,394,507 | A | 7/1968 | Doke |
| 3,427,773 | A | 2/1969 | Kandall |
| 3,442,542 | A | 5/1969 | Watanabe |
| 3,487,518 | A | 1/1970 | Hopfeld |
| 3,507,738 | A | 4/1970 | Prusinski et al. |
| 3,511,743 | A | 5/1970 | Rach |
| 3,516,213 | A | 6/1970 | Sauer |
| 3,577,504 | A | 5/1971 | Lipski |
| 3,583,123 | A | 6/1971 | Holmgren et al. |
| 3,590,547 | A | 7/1971 | Molyneux |
| 3,617,364 | A | 11/1971 | Jarema et al. |
| 3,654,018 | A | 4/1972 | Bogue et al. |
| 3,707,401 | A | 12/1972 | Jarema et al. |
| 3,708,380 | A | 1/1973 | Niebylski |
| 3,715,846 | A | 2/1973 | Sullhofer |
| 3,716,957 | A | 2/1973 | Bernardi |
| 3,716,959 | A | 2/1973 | Bernardi |
| 3,732,654 | A | 5/1973 | Tsurumi |
| 3,753,326 | A | 8/1973 | Kaufman, Sr. |
| 3,798,867 | A | 3/1974 | Starling |
| 3,810,363 | A | 5/1974 | Dar Conte |
| 3,845,544 | A | 11/1974 | Nurminen et al. |
| 3,866,372 | A | 2/1975 | Haage |
| 3,877,193 | A | 4/1975 | Hall |
| 3,896,199 | A | 7/1975 | Michaelis |
| 3,908,327 | A | 9/1975 | Quigg |
| 3,913,290 | A | 10/1975 | Billing et al. |
| 3,946,529 | A | 3/1976 | Chevaux |
| 3,946,533 | A | 3/1976 | Raugh et al. |
| 3,947,309 | A | 3/1976 | Troutner |
| 3,963,552 | A | 6/1976 | Troutner et al. |
| 3,964,231 | A * | 6/1976 | Budich et al. ............ 52/213 |
| 3,979,870 | A | 9/1976 | Moore |
| D242,625 | S | 12/1976 | Schmidt |
| D242,799 | S | 12/1976 | Schmidt |
| 4,012,883 | A | 3/1977 | Muller |
| 4,014,201 | A | 3/1977 | Troutner et al. |
| 4,019,301 | A | 4/1977 | Fox |
| 4,033,166 | A | 7/1977 | Troutner |
| 4,047,341 | A | 9/1977 | Bernardi |
| 4,081,941 | A | 4/1978 | Van Ausdall |
| 4,122,203 | A | 10/1978 | Stahl |
| 4,129,974 | A | 12/1978 | Ojalvo |
| 4,130,976 | A * | 12/1978 | Kesseler et al. ............ 52/656.2 |
| 4,141,944 | A | 2/1979 | Anstadt et al. |
| 4,147,379 | A | 4/1979 | Winslow |
| 4,177,306 | A | 12/1979 | Schulz et al. |
| 4,196,558 | A | 4/1980 | Jungbluth |
| 4,219,980 | A | 9/1980 | Loyd |
| 4,251,973 | A | 2/1981 | Paik |
| 4,291,081 | A | 9/1981 | Olez |
| 4,297,825 | A | 11/1981 | Harper, Jr. |
| 4,302,913 | A | 12/1981 | Schwartz et al. |
| 4,320,162 | A | 3/1982 | Schulz |
| 4,333,289 | A | 6/1982 | Strickland |
| 4,341,831 | A * | 7/1982 | Kleiss ............ 428/188 |
| 4,355,754 | A | 10/1982 | Lund et al. |
| 4,364,213 | A | 12/1982 | Biesanz, Sr. |
| 4,383,812 | A * | 5/1983 | Calcagni ............ 425/133.1 |
| 4,407,106 | A | 10/1983 | Beck |
| 4,424,652 | A | 1/1984 | Turner |
| 4,429,872 | A | 2/1984 | Capachi |
| 4,453,363 | A | 6/1984 | Koller |
| 4,471,597 | A * | 9/1984 | Walton ............ 52/775 |
| 4,492,063 | A | 1/1985 | Schock et al. |
| 4,505,082 | A | 3/1985 | Schmitz |
| 4,512,835 | A | 4/1985 | Gardiner |
| 4,527,372 | A | 7/1985 | Ryan |
| 4,566,231 | A | 1/1986 | Konsevich |
| 4,569,875 | A | 2/1986 | Pohlmann et al. |
| 4,571,913 | A | 2/1986 | Schleich et al. |
| 4,576,849 | A | 3/1986 | Gardiner |
| 4,587,774 | A | 5/1986 | Wendt |
| 4,607,470 | A | 8/1986 | Ecker |
| 4,616,464 | A | 10/1986 | Schleich et al. |
| 4,616,960 | A | 10/1986 | Gladish |
| 4,621,475 | A | 11/1986 | McClain |
| 4,630,546 | A | 12/1986 | Wiger et al. |
| 4,630,547 | A | 12/1986 | Przybylinski et al. |
| 4,630,548 | A | 12/1986 | Wiger et al. |
| 4,646,493 | A | 3/1987 | Grossman |
| 4,647,489 | A | 3/1987 | Siol et al. |
| 4,695,501 | A | 9/1987 | Robinson |
| 4,704,830 | A | 11/1987 | Magadini |
| 4,738,058 | A | 4/1988 | Svensson |
| 4,774,794 | A | 10/1988 | Grieb |
| 4,779,395 | A | 10/1988 | Schleich et al. |
| 4,785,599 | A | 11/1988 | Murphy |
| 4,811,542 | A | 3/1989 | Jewell |
| 4,831,800 | A | 5/1989 | Nedeicu |
| 4,848,054 | A | 7/1989 | Blitzer et al. |
| 4,887,406 | A | 12/1989 | Saia |
| 4,891,081 | A | 1/1990 | Takahashi et al. |
| 4,894,898 | A | 1/1990 | Walker |
| 4,953,339 | A | 9/1990 | Jewell |
| 4,996,812 | A | 3/1991 | Venable |
| 5,021,281 | A | 6/1991 | Bompard et al. |
| 5,022,209 | A | 6/1991 | Kimura |
| 5,052,164 | A | 10/1991 | Sandow |
| 5,052,307 | A | 10/1991 | Morrison |
| 5,066,440 | A | 11/1991 | Kennedy et al. |
| 5,095,674 | A | 3/1992 | Huettemann |
| 5,096,525 | A | 3/1992 | Engwall |
| 5,119,614 | A | 6/1992 | Rex |
| 5,125,207 | A | 6/1992 | Strobl, Jr. et al. |
| 5,148,642 | A | 9/1992 | Plumier et al. |
| 5,207,045 | A | 5/1993 | Bodnar |
| 5,230,190 | A | 7/1993 | Schuette |
| 5,233,807 | A | 8/1993 | Spera |
| 5,238,716 | A | 8/1993 | Adachi |
| 5,268,226 | A | 12/1993 | Sweeney |
| 5,279,093 | A | 1/1994 | Mead |
| 5,285,616 | A | 2/1994 | Tripp |
| 5,294,468 | A | 3/1994 | Chang |
| 5,295,334 | A | 3/1994 | Haraden |
| 5,308,675 | A | 5/1994 | Crane et al. |
| 5,313,749 | A | 5/1994 | Conner |
| 5,321,926 | A | 6/1994 | Kennedy |
| 5,373,674 | A | 12/1994 | Winter, IV |
| 5,396,748 | A | 3/1995 | Rogers |
| 5,398,470 | A | 3/1995 | Ritter et al. |
| 5,412,913 | A | 5/1995 | Daniels et al. |

| | | |
|---|---|---|
| 5,414,969 A | 5/1995 | Krejci et al. |
| 5,421,132 A | 6/1995 | Bischel et al. |
| 5,437,303 A | 8/1995 | Johnson |
| 5,455,100 A | 10/1995 | White |
| 5,471,809 A | 12/1995 | Frankel |
| 5,491,951 A * | 2/1996 | Riegelman ............ 52/309.16 |
| 5,501,053 A | 3/1996 | Goleby |
| 5,509,250 A | 4/1996 | Jensen et al. |
| 5,511,355 A | 4/1996 | Dingler |
| 5,518,208 A | 5/1996 | Roseburg |
| 5,524,410 A | 6/1996 | Menchetti |
| 5,535,569 A | 7/1996 | Seccombe et al. |
| 5,537,789 A | 7/1996 | Minke |
| 5,553,437 A | 9/1996 | Navon |
| 5,579,618 A * | 12/1996 | Riegelman ............ 52/309.16 |
| 5,588,273 A | 12/1996 | Csagoly |
| 5,595,040 A | 1/1997 | Chen |
| 5,600,930 A | 2/1997 | Drucker |
| 5,600,932 A | 2/1997 | Paik et al. |
| 5,612,111 A | 3/1997 | Lin |
| 5,634,306 A * | 6/1997 | Riegelman ............ 52/309.16 |
| 5,636,492 A | 6/1997 | Dingler |
| 5,671,573 A | 9/1997 | Tadros et al. |
| 5,680,738 A | 10/1997 | Allen et al. |
| 5,681,641 A | 10/1997 | Grigsby et al. |
| 5,749,199 A | 5/1998 | Allen |
| 5,749,256 A | 5/1998 | Bodnar |
| 5,817,397 A | 10/1998 | Kamiya et al. |
| 5,829,716 A | 11/1998 | Kirkwood et al. |
| 5,845,447 A | 12/1998 | Bodine et al. |
| 5,848,512 A | 12/1998 | Conn |
| 5,895,419 A | 4/1999 | Tweden et al. |
| 5,913,784 A | 6/1999 | Hite |
| 5,913,794 A | 6/1999 | Chen |
| 5,914,175 A | 6/1999 | Nudo et al. |
| 5,924,261 A | 7/1999 | Fricke |
| 5,930,966 A | 8/1999 | Wood et al. |
| 5,930,968 A | 8/1999 | Pullam |
| 5,950,377 A | 9/1999 | Yoder |
| 5,968,444 A | 10/1999 | Yamamoto |
| 5,974,760 A | 11/1999 | Tingley |
| 5,985,435 A | 11/1999 | Czaplicki et al. |
| 5,996,672 A | 12/1999 | Kotin |
| 6,012,256 A | 1/2000 | Aschheim |
| 6,023,903 A | 2/2000 | Stecker |
| 6,041,566 A | 3/2000 | Allen |
| 6,058,673 A | 5/2000 | Wycech |
| 6,060,144 A | 5/2000 | Kimura et al. |
| 6,067,770 A | 5/2000 | Lubker, II et al. |
| 6,073,420 A | 6/2000 | Bjoru et al. |
| 6,082,073 A | 7/2000 | Silvanus et al. |
| 6,115,986 A | 9/2000 | Kelly |
| 6,122,884 A | 9/2000 | Talwar |
| 6,128,884 A | 10/2000 | Berdan, II et al. |
| 6,131,362 A | 10/2000 | Buecker |
| 6,138,432 A | 10/2000 | Banicevic |
| 6,161,361 A | 12/2000 | Ehrenkrantz |
| 6,170,217 B1 | 1/2001 | Meyer |
| 6,173,550 B1 | 1/2001 | Tingley |
| 6,209,282 B1 | 4/2001 | Lafrance |
| 6,212,846 B1 | 4/2001 | Johnston |
| 6,216,404 B1 | 4/2001 | Vellrath |
| 6,219,990 B1 | 4/2001 | Snyder et al. |
| 6,233,892 B1 | 5/2001 | Tylman |
| 6,237,302 B1 | 5/2001 | Fricke |
| 6,237,303 B1 | 5/2001 | Allen et al. |
| 6,280,667 B1 | 8/2001 | Koenig et al. |
| 6,296,224 B1 | 10/2001 | Hayakawa |
| 6,301,857 B1 | 10/2001 | Vrana |
| 6,318,029 B1 | 11/2001 | Huppunen |
| D451,612 S | 12/2001 | Thibault et al. |
| 6,330,778 B1 | 12/2001 | Jakobsson |
| 6,332,301 B1 | 12/2001 | Goldzak |
| 6,341,467 B1 | 1/2002 | Wycech |
| 6,343,453 B1 | 2/2002 | Wright |
| 6,344,268 B1 | 2/2002 | Stucky et al. |
| 6,370,833 B1 | 4/2002 | Rastegar |
| 6,374,555 B1 | 4/2002 | Gusler |
| 6,391,456 B1 | 5/2002 | Krishnaswamy et al. |
| 6,408,591 B1 | 6/2002 | Yamashita et al. |
| 6,415,562 B1 | 7/2002 | Donaghue et al. |
| 6,418,686 B1 | 7/2002 | Record |
| 6,446,414 B1 | 9/2002 | Bullard, III et al. |
| 6,460,309 B1 | 10/2002 | Schneider |
| 6,460,310 B1 | 10/2002 | Ford et al. |
| 6,475,577 B1 | 11/2002 | Hopton et al. |
| 6,484,997 B1 | 11/2002 | Edwards et al. |
| 6,497,080 B1 | 12/2002 | Malcolm |
| 6,516,583 B1 | 2/2003 | Houghton |
| 6,526,723 B2 | 3/2003 | Hovenier |
| 6,532,713 B2 | 3/2003 | Katayama et al. |
| 6,550,211 B2 | 4/2003 | Kergen |
| 6,555,214 B1 | 4/2003 | Yates |
| 6,561,571 B1 | 5/2003 | Brennecke |
| 6,561,736 B1 | 5/2003 | Doleshal |
| 6,612,085 B2 | 9/2003 | Edwards et al. |
| 6,615,559 B2 | 9/2003 | McGrath et al. |
| 6,616,997 B1 | 9/2003 | Lauer et al. |
| 6,619,502 B2 | 9/2003 | Walther et al. |
| 6,634,155 B2 | 10/2003 | Smith |
| 6,672,026 B2 | 1/2004 | Sumerak |
| 6,684,596 B2 | 2/2004 | Rastegar |
| 6,701,690 B2 | 3/2004 | Deschenes |
| 6,708,459 B2 | 3/2004 | Bodnar |
| 6,749,709 B1 | 6/2004 | Krishnawswamy et al. |
| 6,755,003 B1 | 6/2004 | McGrath et al. |
| 6,826,884 B2 | 12/2004 | Pabedinskas et al. |
| 6,844,040 B2 | 1/2005 | Pabedinskas et al. |
| 7,213,379 B2 | 5/2007 | Carlson et al. |
| 2002/0146541 A1 | 10/2002 | Fried |
| 2003/0014938 A1 | 1/2003 | Deschenes |
| 2003/0059577 A1 | 3/2003 | Morrison et al. |
| 2004/0031230 A1 | 2/2004 | Pabedinskas et al. |
| 2004/0045847 A1 | 3/2004 | Fairbank |
| 2004/0062915 A1 | 4/2004 | Pabedinskas et al. |
| 2004/0062922 A1 | 4/2004 | Sunde |
| 2004/0137212 A1 | 7/2004 | Ochoa et al. |
| 2004/0250503 A1 | 12/2004 | Bigelow |
| 2004/0265568 A1 | 12/2004 | Crane |
| 2005/0108983 A1 | 5/2005 | Simko et al. |
| 2006/0032182 A1 | 2/2006 | Carlson et al. |
| 2006/0035069 A1 | 2/2006 | Hanai |
| 2007/0141282 A1 | 6/2007 | Chang et al. |
| 2007/0281133 A1 | 12/2007 | Smith et al. |

FOREIGN PATENT DOCUMENTS

| | | |
|---|---|---|
| DE | 3045389 | 7/1982 |
| DE | 9206272 | 9/1992 |
| FR | A2760478 | 9/1998 |

OTHER PUBLICATIONS

U.S. Appl. No. 11/675,587, filed Feb. 15, 2007 by Carlson et al.
U.S. Appl. No. 11/696,629, filed Apr. 4, 2007 by Carlson et al.
U.S. Appl. No. 11/696,122, filed Apr. 3, 2007 by Carlson et al.
U.S. Appl. No. 11/777,930, filed Jul. 13, 2007 by Carlson.
"TJI Joist Specifier's Guide #2027"; Trus Joist; Feb. 2005; 23 pages.
Leaversuch "Close-Up on Technology—Welding New Approach to IR Welding Bonds Mor Engineering Plastics" Plastics Technology Online, Available at http://www.plasticstechnology.com/articles/200404cu5.html, Apr. 2004, 2 pages.
"Kubota Research and DuPont-Toray Develop Breakthrough Fiber Reinforced Thermoplastic Composite: Ru® BAC" Kubota Research Associates, Inc., Press Release Sep. 28, 2005, 2 pages.
"PE Materials", Plastics Engineering, Apr. 2005, pp. 6-13.
"A New Approach to Joining & Manufacturing Advanced materials . . . From a New Company . . . With a New Perspective!" Kubota Research Associates, Inc., Available at http://www.kubotaresearch.com/index.html, 2005, 2 pages.
PCT International Search Report for International Application No. PCT/US05/27522, mailing date: Jan. 29, 2007. (4 pages).
PCT Written Opinion of the International Searching Authority for International Application No. PCT/US05/27522, mailing date: Jan. 29, 2007. (4 pages).
PCT International Preliminary Report on Patentability for International Application No. PCT/US05/27522, mailing date: Apr. 19, 2007. (6 pages)

Non-Final Office Action, mailed Apr. 29, 2009, in U.S. Appl. No. 11/777,930, filed Jul. 13, 2007, by Barry Carlson, et al.

Non-Final Office Action, mailed Nov. 21, 2006, in U.S. Appl. No. 11/194,973, filed Aug. 2, 2005 by Barry Carlson et al.

Non-Final Office Action, mailed Mar. 9, 2009, in U.S. Appl. No. 11/696,629, filed Apr. 4, 2007 by Barry Carlson et al.

* cited by examiner

REINFORCED STRUCTURAL MEMBER AND FRAME STRUCTURES

CROSS REFERENCE TO RELATED APPLICATION

This application is based upon and claims the benefit of U.S. Provisional Application No. 60/980,423, filed Oct. 16, 2007, and U.S. Provisional Application No. 60/980,427, filed Oct. 16, 2007. The present application is also a continuation-in-part application of U.S. patent application Ser. No. 11/777,930, filed Jul. 13, 2007, now U.S. Pat. No. 7,721,496, which application is a continuation-in-part application of U.S. patent application Ser. No. 11/675,587, filed Feb. 15, 2007, now U.S. Pat. No. 7,930,866, which is a continuation-in-part application of U.S. patent application Ser. No. 11/194,973, filed Aug. 2, 2005, now U.S. Pat. No. 7,213,379, which claimed the benefit of U.S. Provisional Application No. 60/598,014, filed Aug. 2, 2004, U.S. Provisional Application No. 60/644,451, filed Jan. 14, 2005, and U.S. Provisional Application No. 60/686,870, filed Jun. 1, 2005. In addition, U.S. patent application Ser. No. 11/675,587, filed Feb. 15, 2007, now U.S. Pat. No. 7,930,866, claimed the benefit of U.S. Provisional Application No. 60/774,105, filed Feb. 15, 2006, U.S. Provisional Application No. 60/791,301, filed Apr. 12, 2006, and U.S. Provisional Application No. 60/822,048, filed Aug. 10, 2006. In addition, U.S. patent application Ser. No. 11/777,930, now U.S. Pat. No. 7,721,496, also claimed the benefit of U.S. Provisional Application No. 60/807,294, filed Jul. 13, 2006. The present application is also a continuation-in-part application of U.S. patent application Ser. No. 11/696,629, filed Apr. 4, 2007, now U.S. Pat. No. 7,882,679, which application is a continuation of U.S. patent application Ser. No. 11/194,973, filed Aug. 2, 2005, now U.S. Pat. No. 7,213,379 (which claims the benefit of other applications listed above). The present application is also a continuation-in-part application of U.S. patent application Ser. No. 12/233,523, filed Sep. 18, 2008, now U.S. Pat. No. 8,065,848 which application claimed the benefit of U.S. Provisional Application No. 60/973,425, filed Sep. 18, 2007. The entire disclosures of all of these applications are specifically incorporated herein by reference for all that they disclose and teach.

BACKGROUND OF THE INVENTION

Use of engineered materials, such as wood composites and various plastics, including recyclable thermoplastic, such as high-density polyethylene (HDPE), is becoming increasingly popular in the construction industry. These uses encompass various horizontal and vertical applications that meet a range of present decorative and/or structural construction needs. Structural members, such as joists, beams and the like, are currently available as wood lumber, a valuable yet limited resource with no recycling capability, as plastic lumber, and as reinforced or composite lumber. Composites often include wood fiber or fiberglass in a plastic matrix, or wood composites such as I-joist products.

SUMMARY OF THE INVENTION

An embodiment of the present invention may therefore comprise a frame structure comprising: a reinforcing member having an outer surface and at least a portion having a substantially hollow interior, a plurality of lobes formed in the reinforcing member that have an interior lobe that is larger than a waist opening; a first plastic layer that is extruded into the lobes and extends into the waist opening; an exterior plastic layer that is extruded over substantially all of the outer surface of the reinforcing member while the first plastic layer is sufficiently hot to knit the exterior plastic layer to the first plastic layer to form a substantially unitary plastic coating structure comprising the first plastic layer and the exterior plastic layer that is held securely to the reinforcing member by the first plastic layer that is disposed in the lobes, the exterior plastic layer creating an inward force on the reinforcing member as the exterior plastic layer cools and contracts to further hold the exterior plastic layer securely to the reinforcing member; a recess formed in the reinforcing member that is covered by the substantially unitary plastic coating structure that secures an insert to the frame structure.

An embodiment of the present invention may further comprise a frame structure comprising: a reinforcing member having an outer surface and at least a portion that has a substantially hollow interior, a plurality of lobes formed in the reinforcing member that have an interior lobe dimension that is larger than a lobe waist opening; a first plastic layer that is extruded into the lobes and extends into the lobe waist opening; an exterior plastic layer that is extruded over substantially all of the outer surface of the metal reinforcing member while the first plastic layer is sufficiently hot to knit the exterior plastic layer to the first plastic layer to form a substantially unitary plastic coating structure comprising the first plastic layer and the exterior plastic layer that is held securely to the reinforcing member by the first plastic layer that is disposed in the lobes, the exterior plastic layer creating an inward force on the reinforcing member as the exterior plastic layer cools and contracts to further hold the exterior plastic layer securely to the reinforcing member; a recess formed in the reinforcing member that is covered by the substantially unitary plastic coating structure that secures an insert to the frame member; a removable bracket that is attached to the support structure that supports the insert and allows the insert to be removed from the frame structure whenever the removable bracket is removed from the reinforcing member.

An embodiment of the present invention may further comprise a method of making a frame structure comprising: providing a reinforcing member having an outer surface and at least a portion having a substantially hollow interior; forming a plurality of lobes in the reinforcing member having an interior lobe size that is larger than a lobe waist opening; extruding a first plastic layer into the plurality of lobes until the plastic extends into the lobe waist opening; extruding an exterior plastic layer over substantially all of the outer surface of the reinforcing member while the first plastic layer is sufficiently hot to knit to the exterior plastic layer to form a substantially unitary plastic coating structure comprising the first plastic layer and the exterior plastic layer that is securely held to the reinforcing member by the first plastic layer that is disposed in the lobes, the exterior plastic layer creating an inward force on the reinforcing member as the exterior plastic layer cools and contracts to further hold the exterior plastic layer securely to the reinforcing member.

An embodiment of the present invention may further comprise a method of forming a structural member comprising: providing a reinforcing member that has a predetermined shape, the reinforcing member providing structural rigidity to the structural member; working at least a portion of the reinforcing member to form worked portions of the reinforced member; passing the reinforced member through a crosshead die extruder that utilizes crosshead dies; extruding a thermoplastic using the crosshead die extruder over an outer surface of the reinforcing member at a temperature within a predetermined temperature range so that the thermoplastic adheres to the worked portions of the reinforcing member to form the structural member.

An embodiment of the present invention may further comprise a structural member comprising: a reinforcing member that forms a structural support for the structural member, the reinforcing member having a predetermined shape and worked portions; a thermoplastic layer that is extruded over at least a portion of the reinforcing member using a crosshead die extruder at a temperature in a predetermined temperature range to cause a thermoplastic material, that has a viscosity that is sufficiently low, to engage and adhere to the worked portions of the reinforcing member.

DETAILED DESCRIPTION OF THE EMBODIMENTS

Figure 1:
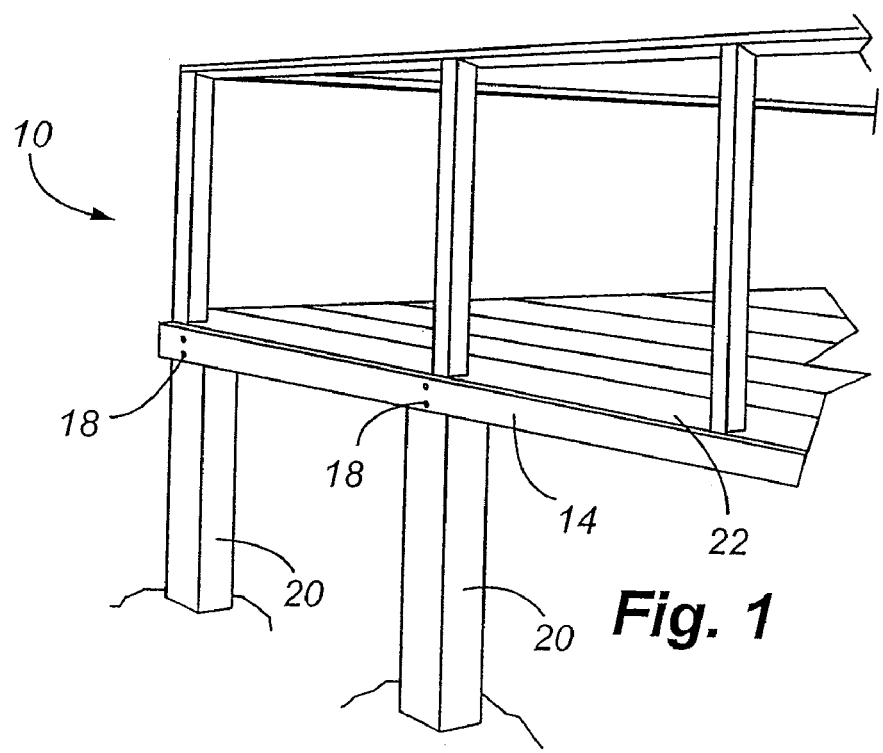
FIG. 1 shows a perspective view of a thermoplastic structural member according to one embodiment of the invention, configured as a post for supporting additional structural members such as a beam.

FIG. 1 discloses a load bearing assembly 10 that includes a pair of structural members 20 shown supporting decking 22, and further supporting a beam 14 attached to structural member 20 by screws 18. As discussed in further detail below, these structural members 20 shown in FIG. 1 as posts, are comprised of an interior reinforcing member, which extends longitudinally through the structural member, and are further comprised of a thermoplastic outer layer or casing. Structural member 20 is thus protected from outside elements such as rain, snow and exposure to other corrosive materials by way of the thermoplastic casing surrounding the interior reinforcing member.

In accordance with the various embodiments disclosed, the interior reinforcing member may comprise a variety of materials. More particularly, and by way of example and not limitation, the reinforcing member may be made of metal or a metal alloy, including aluminum, or aluminum alloy, steel, or stainless steel. Alternatively, the reinforcing member may comprise carbon fiber, glass-reinforced polyurethane, and/or fiberglass. In addition, a combination of one or more of the previously listed materials may be used to make the interior reinforcing member.

Reinforced structural members are designed to withstand varying modes of deformation and failure. Structural members such as columns or posts often fail in direct compression, but may also buckle by bending or deflecting laterally due to stress on the member. As the buckling stress increases, the lateral deflection will increase and eventually the column will collapse. Individual components within the column, such as reinforcing members or the walls of a hollow columnar cross member, may experience local buckling or wrinkling under these stresses.

Cross members such as posts or columns are designed to support a critical load. The critical load for an ideal elastic column is often referred to as the Euler load. The critical load of a column is proportional to the flexural rigidity and inversely proportional to the square of the length of the column. The strength of the material itself does not necessarily affect the critical load; however, the load can be increased by using a stiffer material (a material with a larger modulus of elasticity). Also, the load may be increased by distributing the material in such a way as to increase the moment of inertia about the cross-section of area. The moment of inertia may be increased by distributing the material away from the centroid of the cross-section of the cross member. Hollow tubular members are more economical for columns than are solid members having the same cross-sectional areas. This is due in part to the fact that hollow sections are more efficient than solid sections because they provide a larger moment of inertia for the same cross-sectional area. For this reason, increasingly the design of posts and columns incorporates either a hollow rectangular or circular cross-section, which may further include a variety of reinforcing cross members contained therein.

For a hollow member, reducing the wall thickness and increasing the lateral dimension, while keeping the cross-sectional area constant, tends to increase the critical load as the moment of inertia is increased. This has a practical limit, however, because eventually the wall itself will become unstable, and as localized buckling occurs small wrinkles will occur on the surface of the columnar member. If the cross-section of the support is square or circular, all centroidal axes have the same moment of inertia, and therefore buckling may occur in any longitudinal plane. Therefore, the symmetry of the column, and the symmetry of the reinforcing members contained therein, has an important role in designing and accounting for the critical load and thereby preventing any buckling or deformation of the structural member.

The interior reinforcing members are configured such that additional cross members may be attached thereto, as shown in FIG. 1 as beam 14. Attachments of additional structural members may take several forms, for example, but not by limitation, by screws, nails, bolts, rivets, or other fastening mechanisms or attachment means for coupling two or more members together. In the exemplary configuration shown in FIG. 1, the structural members 20 may not only support lateral or transverse loads, but may also support loads in compression, such as by supporting decking 22 or another type of platform or structure. In this manner, structural member 20 may serve as a column, post or pier for providing load-bearing support of additional members.

Embodiments include structural members formed with a resin, such as a thermoplastic. Various types of thermoplastic may be used. In at least one embodiment of the present invention, structural members comprise HDPE and a reinforcing member that acts as a strengthened interior for the HDPE. The HDPE is preferably without cellular fiber content, such as wood fiber, and at least to the extent that any such content should not seriously impact resistance to moisture of the resulting structural member. Also, the HDPE is without fiberglass to the extent that the ability of the structural member can remain easily cut and/or drilled without tool damage. However, unless otherwise specified, any thermoplastic and/or thermoplastic composite materials are collectively herein referred to as simply "HDPE" or "thermoplastic," and it is to be understood that reference herein to "HDPE" and "thermoplastic" includes other possible thermoplastics other than HDPE, such as, but not limited to, polypropylene (PP), as well as blends, composite/amended thermoplastic materials, and/or coated thermoplastic members, and further includes substantially virgin or recycled HDPE. Furthermore, other materials other than thermoplastics are within the scope of the invention, including polyvinyl chloride. Thus, a structural member, such as a column or post that utilizes a non-thermoplastic (non-HDPE) material to form its outer casing is within the scope of the present invention.

Figure 2:
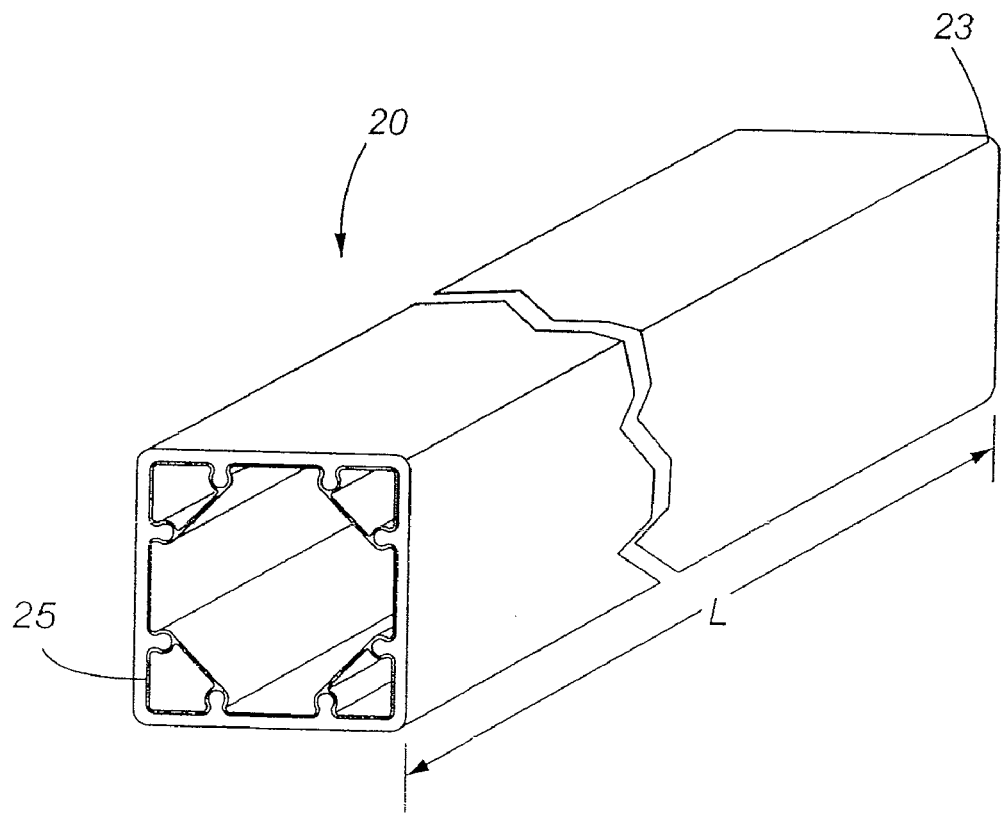
FIG. 2 shows a perspective view of the thermoplastic structural member of FIG. 1.

FIG. 2 discloses a structural member 20 in a perspective view. Structural member 20 is comprised of component parts, some of which extend from a first end 23 to a second end 25 of structural member 20, such that the component parts may be said to extend the longitudinal length L of the structural member. In this manner, structural member 20 may serve as a column, post or pier for providing load-bearing support of additional members, or may serve as a beam to support transverse loads.

Figure 3:
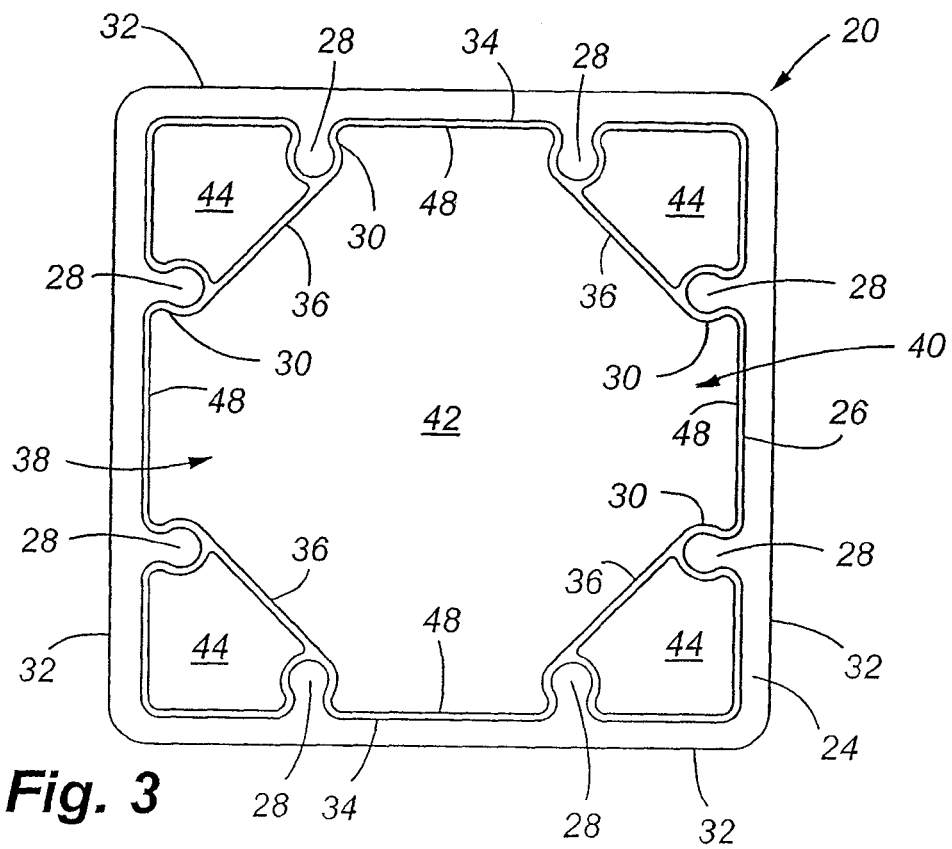
FIG. 3 shows an end-on view of the thermoplastic structural member of FIG. 1, depicting a series of reinforcing cross-supports in one embodiment of the present invention.

FIG. 3 discloses a structural member 20 in an end-on view. Structural member 20 is comprised of an interior reinforcing member 26, which is continuous throughout the longitudinal length L of the structural member 20, and may be configured in varying embodiments to provide reinforcement of structural member 20 to prevent crushing, bending, buckling, wrinkling, or other deformation. According to one embodiment, structural member 20 has a reinforcing member 26 in a symmetrical pattern that includes channels 28 which extend inwardly towards the center of structural member 20 and which further define lobes about the exterior of the structural member. As discussed below with reference to FIG. 14, the channels 28, according to one embodiment, are formed as saddle portions of recessed areas in the exterior surface of the reinforcing member 26 such that the saddle portions comprise a narrowed or tapered neck section and then gradually taper outwards to a larger cross-sectional diameter, thus creating a lobe, which has several desirable benefits. First, the channels 28 are provided to secure the thermoplastic casing 24 and hold the thermoplastic casing 24 in place after the casing material has been formed around the reinforcing member 26 and has fully cooled. As appreciated by one of ordinary skill in the art, thermoplastic and thermosetting materials are subject to deformation during manufacture and transport. In addition, these materials are further subject to expansion and contraction due to fluctuations in temperature. The channels 28 formed along the exterior 34 of the reinforcing member 26 allow the thermoplastic casing 24 to be located within a portion of the channel 28 such that it becomes securely engaged with the reinforcing member 26 despite possibly undergoing future expansion and/or contraction. This is achieved by having a larger diameter in the lobe section of the channels 28 than the diameter of the neck or waist section of the channels 28, as described in greater detail with regard to FIG. 14 below.

Channels 28 also provide multiple surfaces along the interior 40 of the reinforcing member 26 for connecting cross members 36 within the interior 40 of reinforcing member 26. As shown in FIG. 3, multiple cross members 36 are shown connecting adjacent pairs of channels 28 to form a generally octagonal pattern 38. Thus, the channels 28 provide multiple locations for connecting internal cross members 36. The interior surfaces 30 of the channels 28 extend inwardly toward interior 40 and therefore provide convenient points for connecting cross members 36 within the interior 40 of the reinforcing member 26, to increase the critical load of structural member 20, and thereby prevent crushing, buckling, warping, wrinkling, or other deformations. In various embodiments, the cross members 36 may be arranged between the interior surfaces of channels 28 such as to improve the support from one side of the reinforcing member 26 to another side, so as to prevent deformation between those two sides of the reinforcing member 26. In other configurations, the arrangement of cross members 36 within the interior 40 of the structural member 20 may prevent additional deformations or modes of failure such as by torsional and/or shear forces.

Reinforcing member 26 is encased by thermoplastic casing 24 and preferably includes a metal, such as steel, aluminum or an aluminum alloy, or alternatively, the reinforcing member may comprise carbon fiber, glass-reinforced polyurethane, and/or fiberglass. In accordance with several embodiments of the present invention, interior 40 is preferably hollow. That is, the central interior area 42 and peripheral interior areas 44 may be hollow. Alternatively, one or more cells or interior areas 42 and 44 of the interior 40 may be filed with a different material such as, by way of example and not limitation, a thermoplastic, foam, concrete and/or earthen material. Such optional filling of the interior areas of the reinforcing members applies to all embodiments described herein. Reinforcing member 26 and cross members 36 preferably extend the entire longitudinal length L of structural member 20.

In accordance with embodiments of the present invention, cross members 36 may further include a thermoplastic material casing (not shown in FIG. 3) for providing additional protection and/or support to structural member 20. In at least one embodiment, such material preferably comprises HDPE. Surficial features such as divots and other texturing, such as scarification, may be provided. Various embodiments may not require surficial feature for certain types of plastic material, such as glass-reinforced polyurethane, because sufficient chemical bonding between the material types is provided. Where appropriate, divots, scarification, or other surficial features assist in limiting or removing sliding tendencies between the HDPE and cross members 36 when structural member 20 is under loaded conditions. In an alternative embodiment, the cross members 36 may include apertures along their longitudinal length that act as openings for receiving at least some HDPE when the HDPE is introduced around the cross members 36

The presence of interior cross members 36 improves the structural performance of the structural member 20, and allows the structural member 20 to provide adequate load carrying capacity with tolerable deflection, while maintaining a relatively small profile. Preferably, the reinforcing member 26 and cross members 36 include a metal or metal alloy, as for example, an aluminum alloy, with the dimensions and thickness of the reinforcing member 26 and cross members 36 capable of being customized and selected based on intended use of the structural member 20. The reinforcing member 26 and cross members 36 may also include or comprise carbon fiber, glass-reinforced polyurethane and/or fiberglass. The use of an aluminum alloy material as compared to steel for the reinforcing member 26 can enable a lighter weight structural member 20 and can enable the structural member 20 to be cut relatively easily using standard construction equipment. That is, an aluminum alloy provides attractive reinforcing characteristics, while at the same time not unduly dulling cutting blades of saws that are used to dimension to length the structural member 20. Carbon fiber provides yet a lighter weight structural member 20, but would potentially require the use of diamond-bit blades for successful repeated cutting and dimensioning the structural member 20. Glass-reinforced polyurethane provides another option for the reinforcing material, as does fiberglass.

Figure 4:
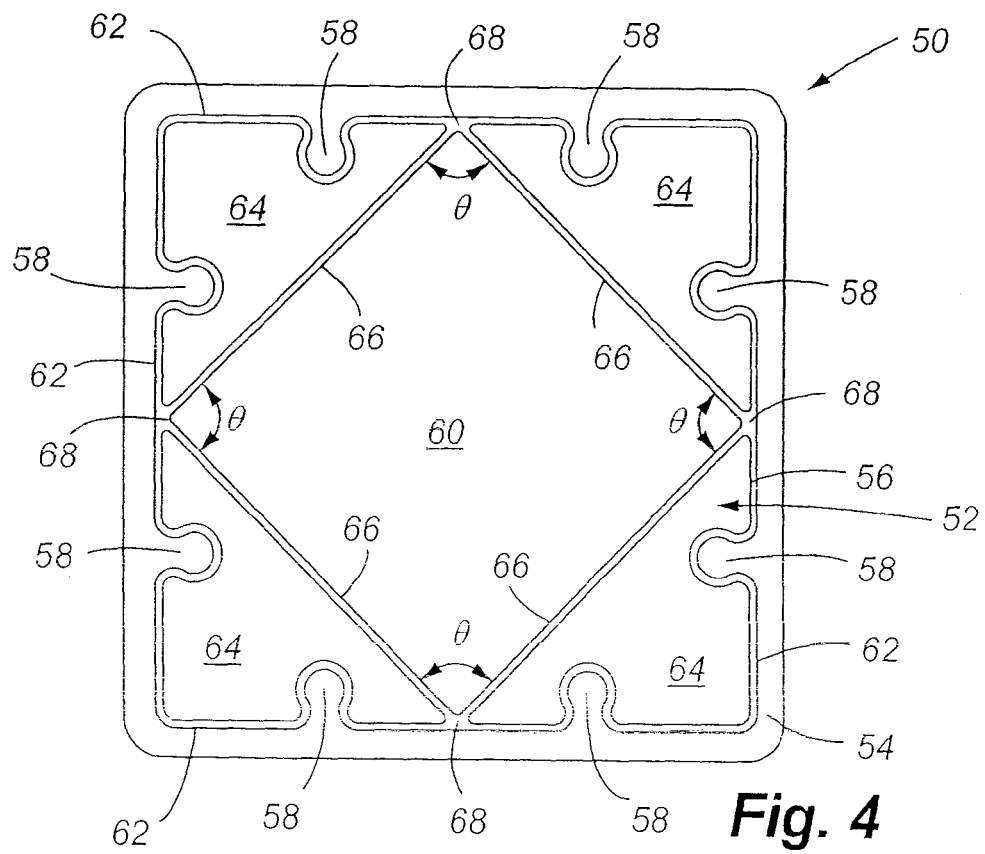
FIG. 4 shows an end-on view of the thermoplastic structural member of FIG. 1, according to another embodiment of the present invention.

FIG. 4 discloses another configuration for the cross members 66. The cross members 66 of FIG. 4 extend diagonally from an intermediate point 68 along each of the four faces 62 of the reinforcing member 56, so as to form a generally diamond-shaped pattern in a cross-sectional view of the structural member 50. For the embodiment shown in FIG. 4, the cross member angle Θ formed between the cross members 66 is preferably between about 30 and 150 degrees, and more preferably, between about 60 and 120 degrees, and/or more preferably yet, about 90 degrees. The actual cross member angle Θ that is used may vary depending upon the shape of the structural member, the reinforcing member, and the interior cross members. For the embodiment shown in FIG. 4, this configuration provides additional structural support for loads in compression, as well as loads in the lateral direction, including but not limited to loads created by attaching additional structural members to the structural member 50 by way of a screw, a nail, a bolt, or other attachment means which extend laterally through the structural member 50.

The various configurations of the reinforcing member 56 comprising a plurality of cross members 66 enhances the strength of the entire structural member 50. This is achieved under loading conditions when the pattern of cross members 66 tends to provide a secondary column or reinforcing member within reinforcing member 56. Likewise, the channels 58 are coupled to the HDPE and thereby further reinforce the structural member 50 under loading conditions. In addition, the channels 58 keep the HDPE from traversing along the longitudinal axis of the reinforcing member 56 when under loading conditions. The interior 52 of reinforcing member 56 includes central interior area 60 and peripheral interior areas 64.

Figure 5:
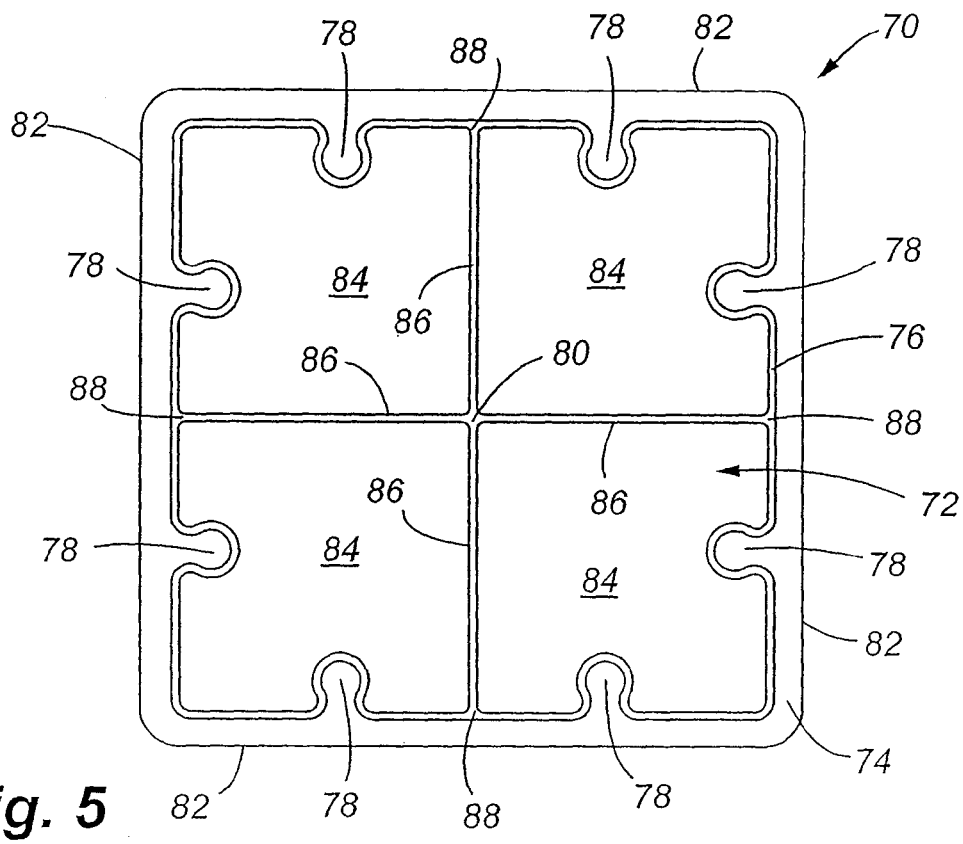
FIG. 5 shows an end-on view of a thermoplastic structural member in another embodiment of the present invention.

FIG. 5 discloses another pattern for arranging the cross members 86 within the interior of the structural member 70 for preventing deformation of the reinforcing member 76. In this embodiment, the cross members 86 extend from an intermediate point 88 of each of the four sides 82 of the reinforcing member 76 and are joined in the center 80 of the structural member 70 to make a generally cross shaped pattern as shown in FIG. 5. The interior 72 of reinforcing member 76 includes peripheral interior areas 84.

Figure 6:
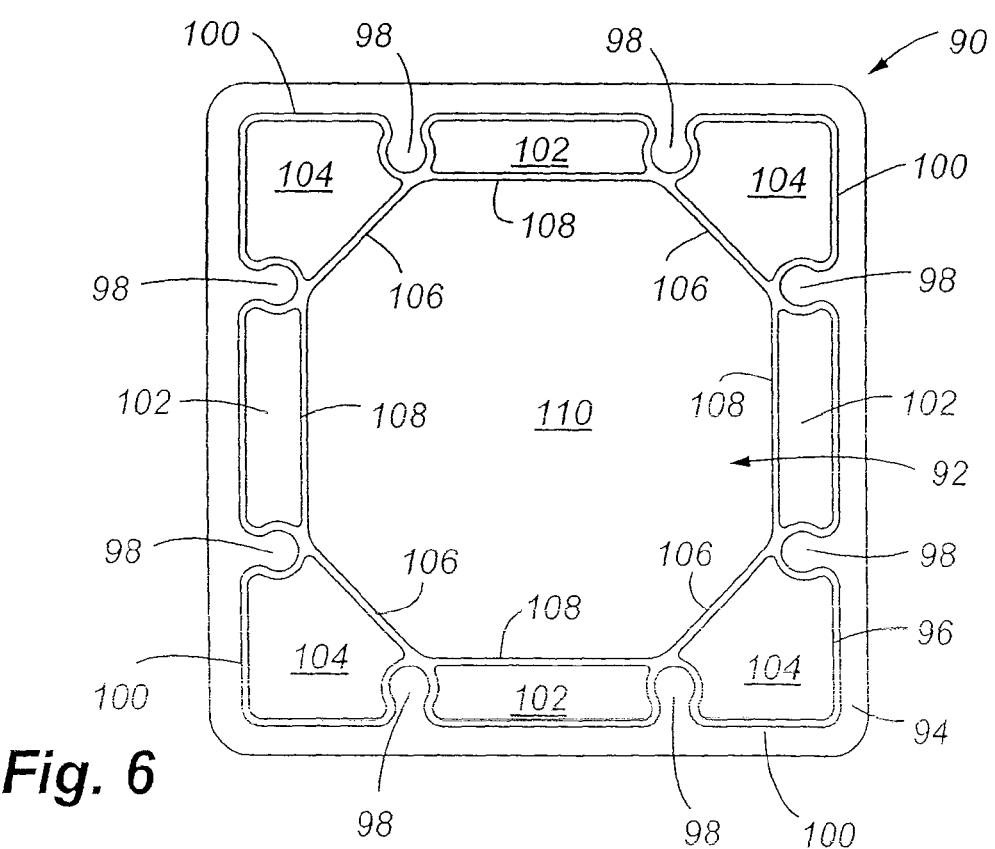
FIG. 6 shows an end-on view of a thermoplastic structural member in another embodiment of the present invention.

FIG. 6 discloses another pattern for arranging the cross members 106, 108 within the interior 92 of the reinforcing member 96 of structural member 90. In the embodiment of FIG. 6, a pattern similar to that shown in FIG. 3 is further reinforced by additional cross members 108 attaching two channels 98 paired on each lateral side 100 of the reinforcing member 96, forming a total of eight individual interior cross members 106, 108 to provide further reinforcement of the structural member 90. Additional peripheral interior areas 102, 104 are also formed by this pattern, which in a preferred embodiment are hollow, but may be filled with a foam or other material as desired.

Figure 7:
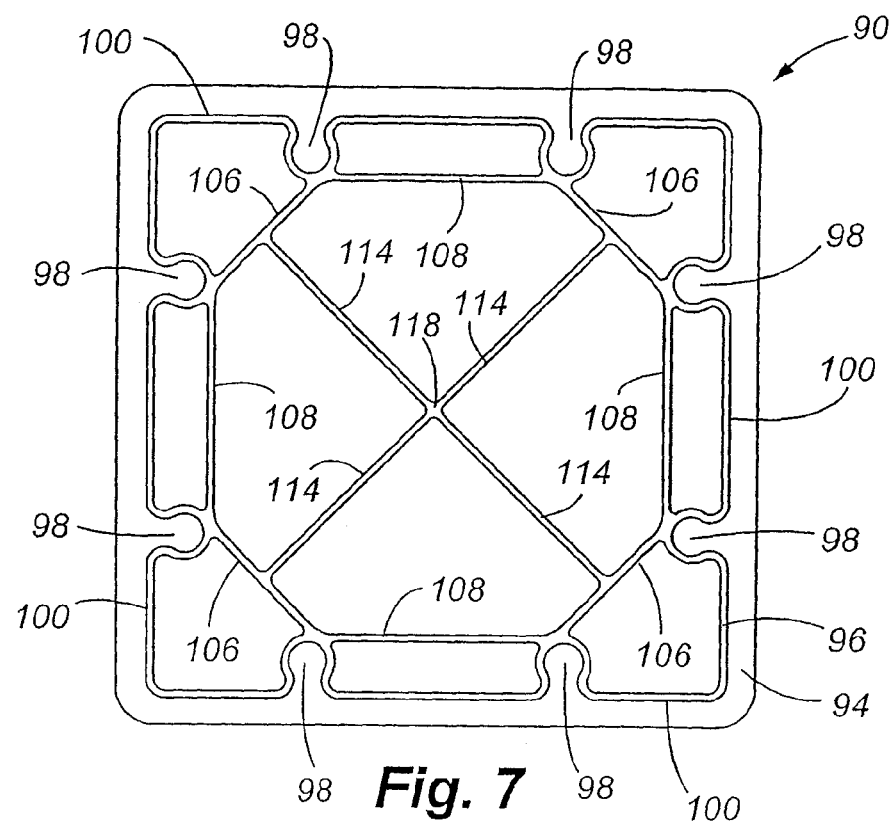
FIG. 7 shows an end-on view of a thermoplastic structural member in another embodiment of the present invention.

FIG. 7 discloses another embodiment comprising two additional cross members 114 from those described in relation to FIG. 6. Two cross members 114 extend from an intermediate portion of the diagonal cross members 106 on each corner of the reinforcing member 96 and extend towards the center 118 of the structural member 90 as shown in FIG. 7. This forms a generally "X"-shaped pattern for providing additional support and reinforcement to prevent bending and/or buckling.

Figure 8:
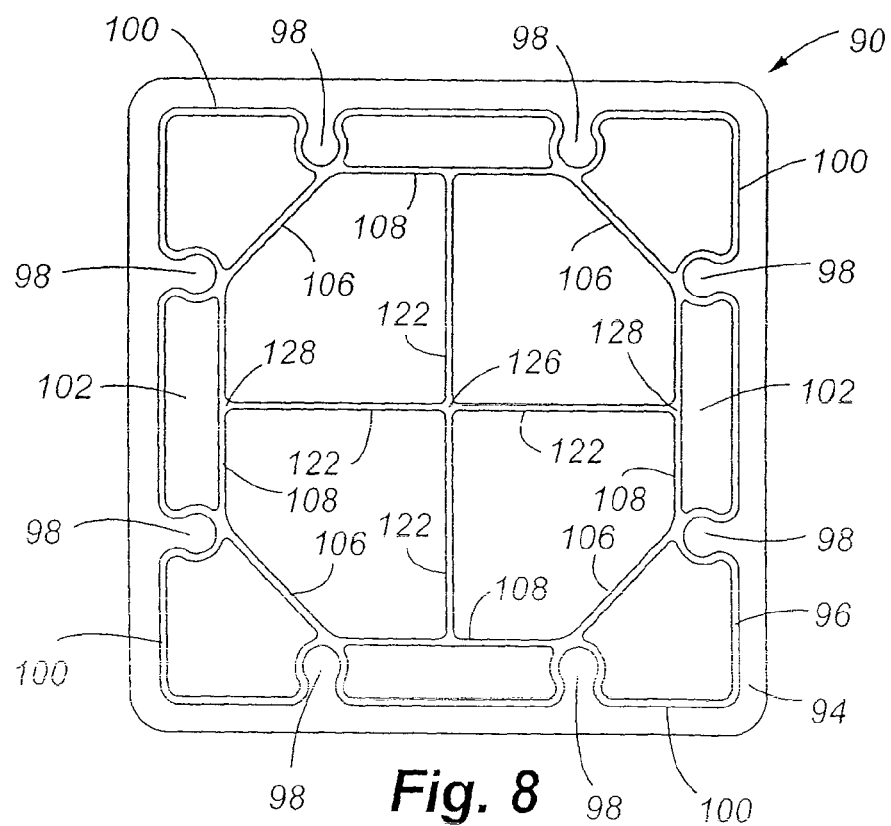
FIG. 8 shows an end-on view of a thermoplastic structural member in another embodiment of the present invention.

FIG. 8 discloses another embodiment in which the pattern for arranging cross members 106, 108, 122 within the structural member 90 is oriented to connect two interior cross members 122 to four of the cross members 108 adjacent each side 100, forming a generally cross-shaped pattern as shown in FIG. 8. In this embodiment, the support pattern as shown in FIG. 6 is combined with the pattern of FIG. 5 to form additional reinforcement of the reinforcing member.

Figure 9:
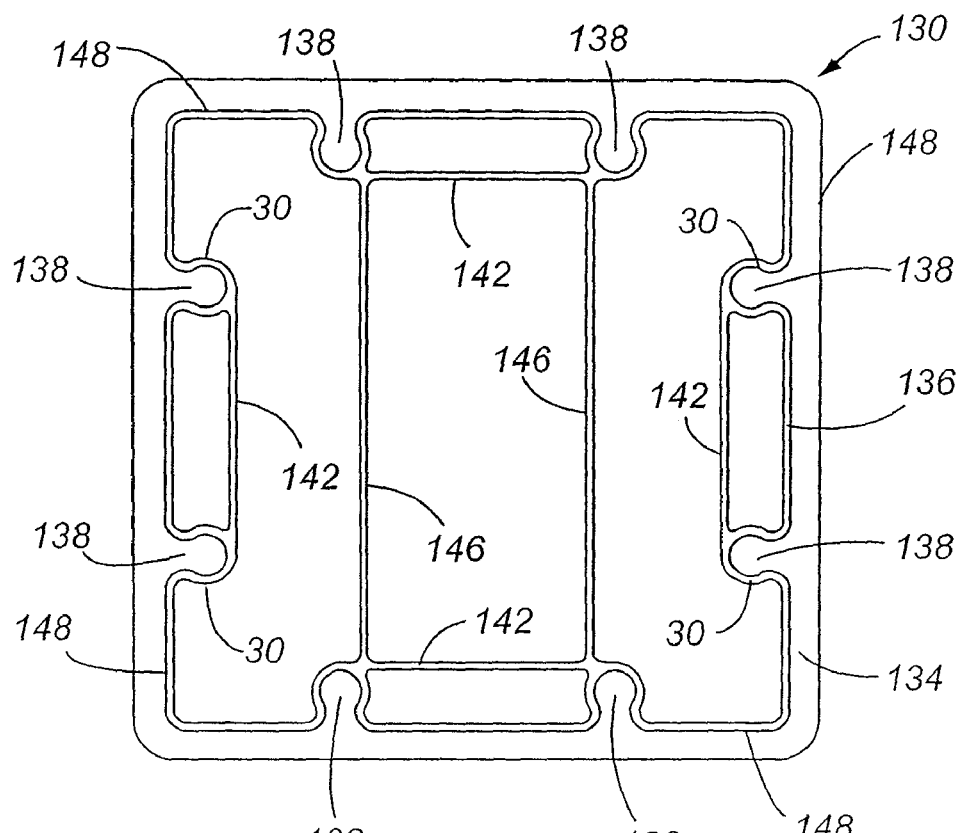
FIG. 9 shows an end-on view of the thermoplastic structural member in another embodiment of the present invention.

FIG. 9 discloses another embodiment depicting configurations for interior cross members 142, 146. According to this embodiment, cross members 142, 146 are arranged primarily in a single planar direction extending from one lateral face 148 of the reinforcing member 136 to another face 148 of the reinforcing member 136, and also between two of the interior surfaces 30 of the channels 138 paired along the remaining face 148 of the reinforcing member 136, so as to provide support in that lateral direction. Thus, the configuration of cross members 142, 146 as depicted in FIG. 9 accommodates insertion of a bolt or other attachment means to prevent bending, crushing, or buckling of the reinforcing member 136 in the lateral direction perpendicular to the direction the cross members 142, 146 are oriented within the structural member 130.

Figure 10:
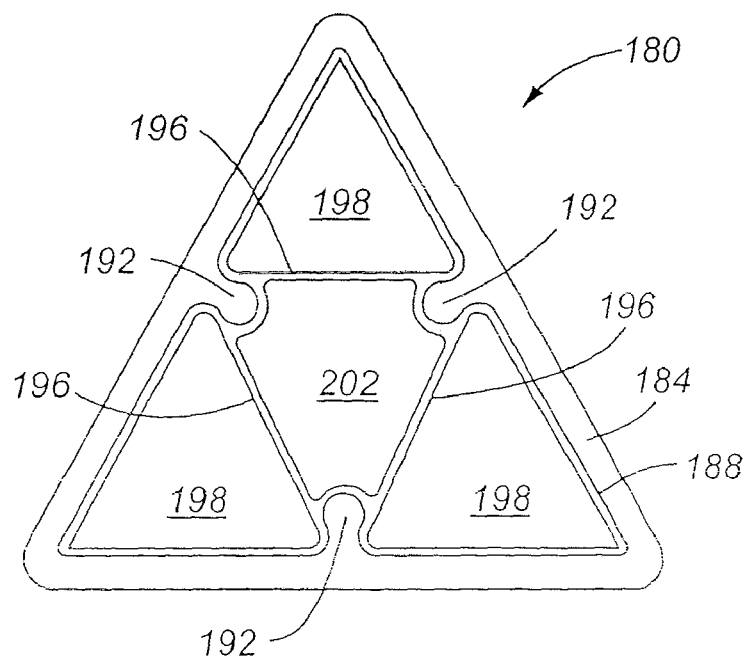
FIG. 10 shows an end-on view of the thermoplastic structural member in another embodiment of the present invention.

FIG. 10 discloses another embodiment depicting configurations for interior cross members 196. According to this embodiment, cross members 196 are arranged extending from an interior surface 30 of each channel 192 of the reinforcing member 188 to form a generally triangle shaped cross support configuration within the interior of the reinforcing member 188 so as to provide support in that lateral direction. In one embodiment, the generally triangle shape is substantially in the shape of an equilateral triangle, as is the shape of the structural member 180. Peripheral interior areas 198 are formed surrounding a central interior area 202, which in a preferred embodiment are hollow, but may be filled with a foam or other material as desired.

Figure 11:
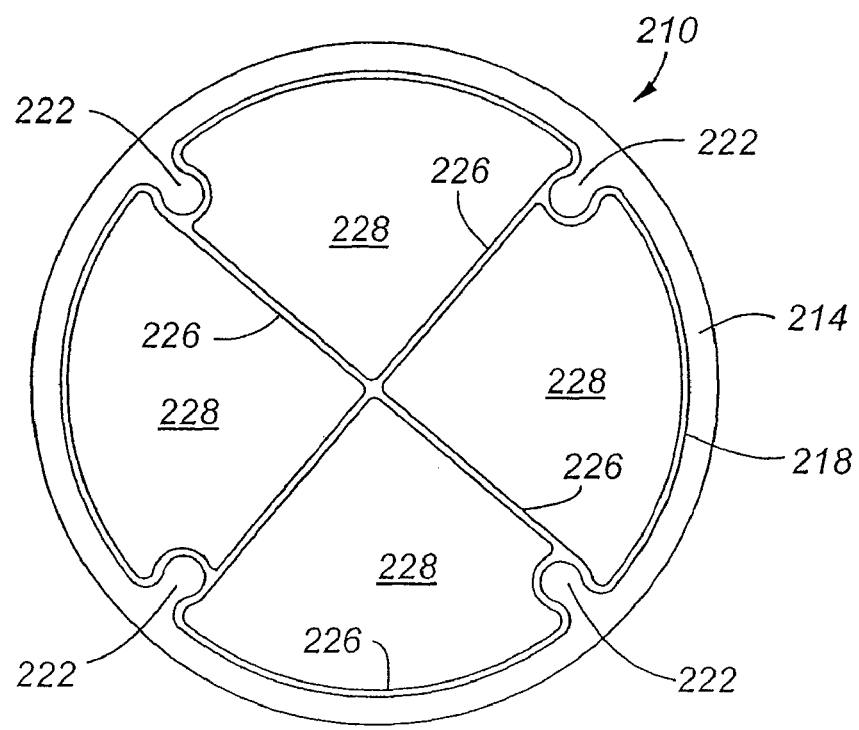
FIG. 11 shows an end-on view of the thermoplastic structural member in another embodiment of the present invention.

FIG. 11 discloses another embodiment comprising two cross members 226 extending from the interior surface 30 of one channel 222 to an interior surface 30 of an opposite channel 222. Two cross members 226 extend through the center of the structural member 210 as shown in FIG. 11. This forms a generally "X"-shaped pattern for providing additional support and reinforcement to prevent bending and/or buckling. This further creates four independent peripheral interior areas 228, which are hollow, but may be filled with a foam or other material as desired. This circular structural member 210 also comprises a reinforcing member 218 encased in a thermoplastic casing 214, and may be sized to replace commonly specified cylindrical support elements for supporting load-bearing members.

Figure 12:
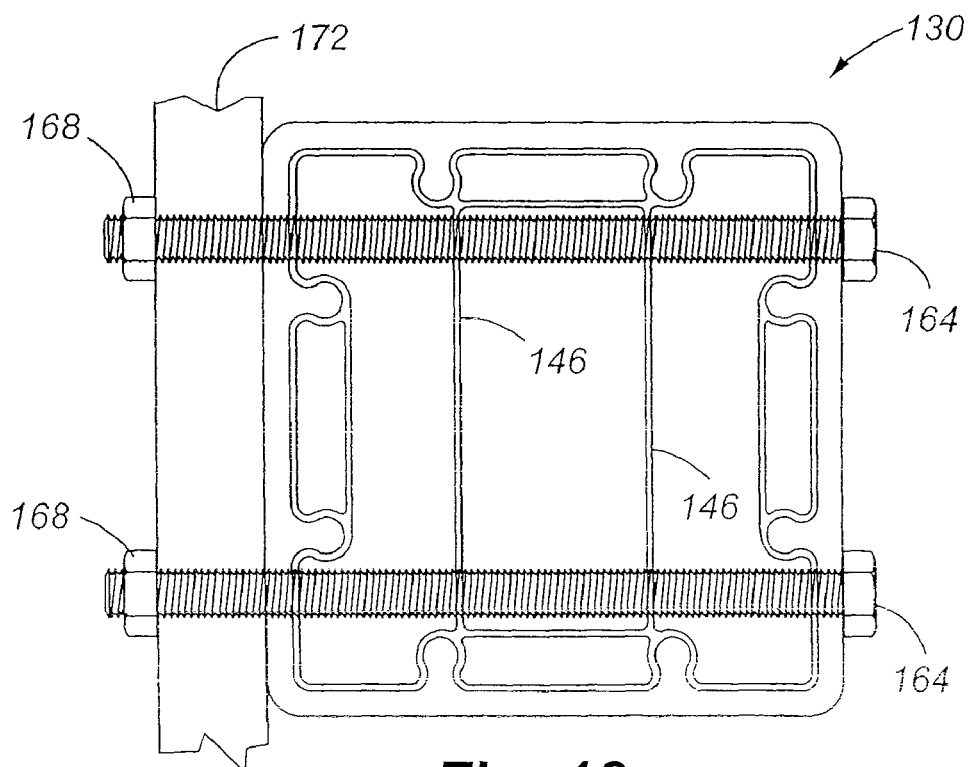
FIG. 12 shows an end-on view of the thermoplastic structural member according to one embodiment of the present invention, showing a pair of bolts connected therein.

FIG. 12 discloses a thermoplastic structural member 130 with two bolts 164 extending through the interior of the thermoplastic structural member 130 and attached by nuts 168 on the opposite side to accommodate attachment of an additional cross member 172, such as a beam 172. In the embodiment of FIG. 12, the cross members 146 provide additional points of attachment for the bolts 164, and further provide reinforcement against bending, crushing, buckling or other deformation caused by the attachment of the bolts 164 to the walls of the structural member 130.

Figure 13:
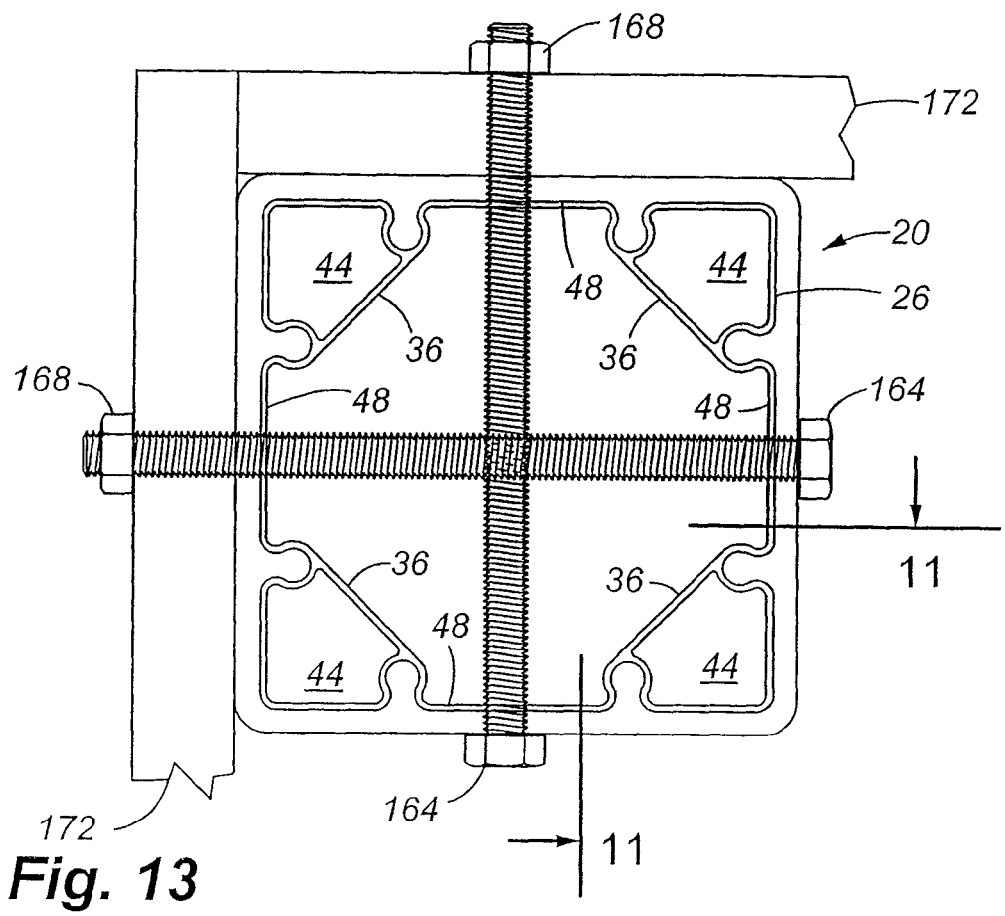
FIG. 13 shows an end-on view of the thermoplastic structural member according to one embodiment of the present invention, showing a pair of bolts connected therein.

FIG. 13 discloses another configuration for attaching two bolts 164 to the structural member 20. Bolts 164 are aligned spaced apart or offset in the longitudinal direction (into the page of FIG. 10) so as to allow attachment of multiple cross members 172 on two of the four lateral faces of the structural member 20. According to the embodiment of FIG. 13, the diagonally placed cross members 36 extend in the four corners of the reinforcing member 26, thus providing reinforcing support to prevent bending and/or buckling of the structural member caused by attachment and tightening of the bolts 164 to the structural member 20.

The structural member and its component parts may be provided in standard sizes to accommodate substitution with existing structural members. For example, structural member may generally be in the shape of a square, which, including the HDPE casing, measures approximately 5.5 inches by 5.5 inches. The HDPE measures approximately 0.250 inches in thickness around the reinforcing member, thereby making the dimensions of reinforcing member in a preferred embodiment 5.0 inches by 5.0 inches. The thickness of the extruded reinforcing member is approximately 0.06 inches, and similarly the thickness of cross members are also 0.06 inches. In another example where two channels are formed on each lateral side, the two channels are spaced at approximately 2.174 inches on center. The distance between the facing surfaces of two channels is approximately 1.722 inches, and the distance between the opposite face and the corner of the reinforcing member is approximately 1.187 inches. Additional dimensions for the structural member are described in relation to FIG. 14 in greater detail below.

As one skilled in the art will appreciate, the values described are one example of dimensions that may be used and are not intended to be limiting. The shapes, thicknesses and dimensions of the various features of the reinforcing member and surrounding HDPE are provided by way of example, and such dimensions allow for the reinforcing member to deflect under loading, thereby confining the HDPE or other thermoplastic material surrounding the reinforcing members. However, other dimensions and shapes are possible and are within the scope of the present invention. For example, cross-sectional shapes for structural cross members such as circles, triangles, including equilateral triangles, rectangles, octagons (and other polygons), and other shapes both symmetrical and non-symmetrical are contemplated for use in the present invention. Thus, it is to be understood that the dimensions given herein are for purposes of enablement, and as one skilled in the art will appreciate, other dimensions are possible. Thus, other dimensions for elements of the present invention are encompassed by the scope of the claims.

Figure 14:
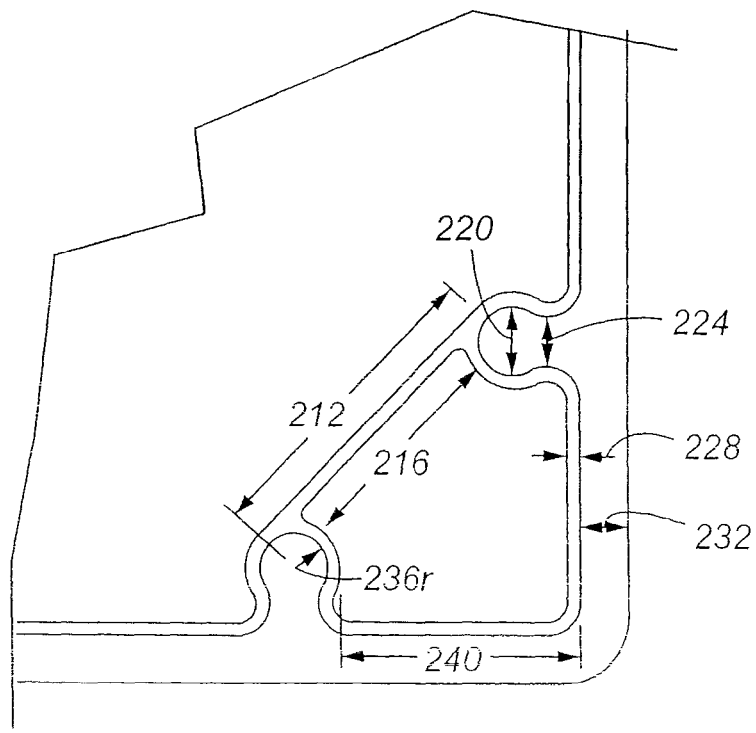
FIG. 14 shows a detailed view of a portion of the thermoplastic structural member according to one embodiment of the present invention. The drawings are not necessarily to scale.

FIG. 14 discloses additional dimensions for a structural member in a partial detailed view of structural member 20. As described above, the thickness 228 of reinforcing member is approximately 0.06 inches. The thickness 232 of the outer thermoplastic is approximately 0.25 inches. The distance between the corner of reinforcing member and the near face of channel 240 is approximately 1.187 inches. In addition to these dimensions, FIG. 11 shows additional dimensions of the structural member depicted in FIG. 10. Those dimensions include a distance between the neck of the channel 224, and the distance between the lobe of the channel 220. In one embodiment, the neck 224 measures approximately 0.226 inches, and the lobe 220 measures approximately 0.332 inches across. The approximate length of cross member 212 is approximately 1.525 inches, and the distance between the two adjacent channels along this direction 216 is approximately 1.043 inches. The radius 236 of channel 220 is approximately 0.166 inches, forming a nearly uniform semicircular area within the lobe or channel formed along reinforcing member. The values described in this paragraph are but one example of dimensions that may be used, and are not intended to be limiting.

During manufacture of the reinforcing members, or prior or during forming a structural cross member such as a column, post, or beam, the reinforcing member may be textured to provide improved adhesion between the surface of the reinforcing member and the outer thermoplastic. Surface texturing is anticipated to provide better bonding between the thermoplastic material and the reinforcing member, and thus better structural performance.

Embodiments include variety of configurations. By way of example and not limitation, reinforcing members of the various embodiments described herein may comprise a hollow configuration as described above as interior, center interior area, and/or peripheral interior areas. Other embodiments may comprise a first material forming the reinforcing member, with a second material filling the first material. For example, the reinforcing member may comprise a hollow aluminum reinforcing member, or the reinforcing member may be filled with another material, such as foam. In at least one embodiment, the reinforcing member may comprise a hollow (or substantially hollow) glass-reinforced polyurethane structure. In at least one embodiment, the reinforcing member may comprise a hollow foamed or unfoamed glass-reinforced polyurethane material. In at least one embodiment, the reinforcing member may comprise a solid (or substantially solid) member, such as a foamed or an unfoamed glass-reinforced polyurethane material. The reinforcing members may also comprise a metal, a metal alloy, steel, aluminum, an aluminum alloy, glass-reinforced polyurethane, carbon fiber, foamed and unfoamed glass-reinforced polyurethane, fiberglass, and combinations thereof.

In accordance with various embodiments, where the structural member is comprised of a composite glass-plastic reinforcing member, a member may further comprise a continuous liquid glass (CLG) and polyurethane material. The CLG material has a liquid-like viscosity upon extrusion during the manufacturing process, but hardens as it cools. In at least one embodiment, the CLG and polyurethane material is foamed during manufacture. In at least one embodiment, the CLG and polyurethane material is not foamed during manufacture. In accordance with various embodiments, the composite glass-plastic reinforcing member forms a chemical bond when co-extruded with the surrounding thermoplastic material so that reinforcing member remains integrally secured to the surrounding thermoplastic material, even under loading conditions. In accordance with the various embodiments, the thermoplastic material surrounding the reinforcing member(s) comprises a polypropylene (PP), wherein the PP may further comprise one or more fillers such as calcium carbonate and/or talc. Talc can e included in amounts of up to 50%, but preferably up to 40%, to add strength to the plastic material. When co-extruded, the thermoplastic structural member with the CLG polyurethane core/reinforcing member demonstrates attractive engineering properties, such as a significant modulus of elasticity.

In accordance with various embodiments, the reinforcing member may comprise one or more features for promoting the mechanical bonding or coupling of the thermoplastic material to the material of the reinforcing member. Thus, in at least one embodiment, the thermoplastic is extruded around the reinforcing member, wherein no adhesives or tape are used to facilitate bonding between the thermoplastic and the reinforcing member, which may comprise an variety of materials, such as carbon fiber, glass-reinforced polyurethane, aluminum or a metal alloy, such as an aluminum alloy. For the reinforcing member, scarification or indentations may be provided along its longitudinal length. The indentations of reinforcing member may provide for mechanical bonding between the thermoplastic and the reinforcing member. In accordance with at least one embodiment of the present invention, the indentations may be spaced apart along the longitudinal length of the reinforcing member.

In general, the configuration of the reinforcing member with channels acts to interlock the thermoplastic to the reinforcing member when not loaded, and further acts to allow the reinforcing member to pinch on the thermoplastic when under load, thereby making the combined materials collectively stronger than the two independently. This provides for mechanical bonding. In addition, in accordance with various embodiments, the horizontal and added vertical bonding of the two materials is also achieved by providing indentations or scarification of one or more surfaces of the reinforcing member, thereby allowing the thermoplastic to enter the indentations and/or scarifications during extrusion, and subsequently harden to mechanically bond the two together. Adhesives and other materials may also be used if necessary, although such use is optional and depends upon the particular characteristics and intended use of the structural member being considered. That is, the use of adhesives and other materials is not necessarily required or even preferred, however, their use in various embodiments of the present invention is not necessarily precluded either.

One method of manufacturing the reinforcing members comprises debossing at least a portion the reinforcing member to form the indentations. Debossing is the process of causing a depression in an object, such as forming a depressed shape below the normal surface of a material. Alternatively, the reinforcing members may be subjected to a process known as coining to provide surficial features along at least a portion of the longitudinal length of the reinforcing members. Coining is the squeezing of metal while it is confined in a closed set of dies. Therefore, in accordance with various embodiments, the reinforcing member includes indentations that are spaced apart along the longitudinal length of the reinforcing member, wherein the indentations are caused by applying a force to the exterior of the reinforcing member.

The columns, piers, or pylons have particular application to use in large structures, including bridge structures or pier supports. Depending upon the use, the hollow center area may be filled with a variety of materials, including by way of example and not limitation, water, reinforcing supports extending from one interior surface to another, concrete, reinforced concrete, aggregate and/or other earthen materials such as sand, rock or rip rap.

Combining a thermoplastic with a metal alloy, such as an aluminum alloy, or steel, or carbon fiber, or glass-reinforced polyurethane in the configurations shown and described herein provides functionality by increasing loading strength. Under compression or tension, the integral configuration of the structural members serves to resist movement from either, thereby improving load ratings. Hollow cores/reinforcing members enable achieving structurally sound members with some reduction of weight.

In accordance with various embodiments, at least one method of manufacture is also provided, the method comprising a unique process. As one example, the method of manufacture may comprise a dual extrusion in-line fabrication process. It will be appreciated that the various structural assemblies are described herein which generally may be referred to as structural members or load members, and are preferably formed in a sequence of separate steps.

In accordance with another embodiment, an illustrative method of manufacturing a structural cross member having a rated deflection loading includes: (a) preparing a reinforcing member of at least length L for bonded integration into a structural member of at least length L; (b) forming a structural support preform by feeding the reinforcing member into a thermoplastic extruder and extruding the structural member with a thermoplastic, wherein the thermoplastic is bonded to the surface of the reinforcing member along the length of at least L; and (c) controlledly cooling the extrusion-formed structural member preform wherein the thermoplastic is bonded to the reinforcing member along the length of at least L and wherein the bonded thermoplastic and reinforcing member share the loading of the structural member without separating along the at least length L when the structural member is loaded at or below critical.

In accordance with at least one embodiment, at least portions of the thermoplastic outer layer may comprise a foaming agent. By way of example and not limitation, such lighter-weight material comprises a thermofoamed thermoplastic with an elastomer. The foaming is provided by foaming agents, or otherwise by microspheres that include a polymer shell encapsulating glass. Thus, as those skilled in the art will appreciate, a variety of foaming agents exist, and such foaming agents may optionally be used to form at least a portion of the thermoplastic outer layer. The foamed layer may include, but is not limited to, a thermoplastic with expand cells, and thermoplastic elastomers also known as "TPE." In yet another embodiment, a thermofoamed thermoplastic may be used to fill at least a portion of an interior space of the reinforcing member, such as the center interior space or a peripheral interior space, where such spaces are originally hollow.

The thermoplastic outer layer may include a resin, and more preferably, the outer interior may be made of HDPE, PPE, another thermoplastic material, or a combination of materials. Thus, the outer layer preferably comprises as a thermoplastic, and may or may not further include additives, such as talc and/or $Ca_2CO_3$ that acts as a both a filler and strengthening material or reinforcement (e.g., crushed limestone). In at least one embodiment of the invention, an additive such as talc is added to the thermoplastic to improve brittleness and/or modulus characteristics. Embodiments include 0 to 45 percent by weight talc, and more preferably, 20 to 40 percent by weight talc, and more preferably yet, 25 to 35 percent by weight talc, and still more preferably yet, 30 to 33 percent by weight talc. The extrusion process aligns and orients the talc to greatly increase modulus characteristics.

Practice of the invention may further include preparing the structural reinforcing member, to include forming an aluminum alloy extrusion with a non-uniform surface, the surface extending a length of at least L. The method may further include forming an aluminum alloy with a non-uniform surface that includes providing surface attributes that improve the bonding of the thermoplastic (or thermoplastic composites, such as amended HDPE) to the structural reinforcing member. The method may further include preparing the structural reinforcing member to include forming an aluminum alloy extrusion with a non-uniform surface, the surface extending a length of at least L. Furthermore, the method may include preparing the structural reinforcing member to include extruding the structural reinforcing member and adjusting its temperature by cooling.

As otherwise noted herein, and in accordance with various embodiments of the present invention, the exterior surface of the reinforcing member may optionally comprise surficial features to assist in the mechanical bonding of the surrounding resin with the exterior surface of the reinforcing member. By way of example and not limitation, the exterior surface of the reinforcing member may comprise one or more of a deboss, scarification and surface texturing. More particularly, a deboss of the exterior surface of the reinforcing member may comprise an indention in the exterior surface. The indentation may be formed, for example, by a mechanical tool impacting or pressing against the exterior surface of the reinforcing member to cause the indentation, wherein the indentation causes a localized change in the planar surface of the exterior surface of the reinforcing member in the vicinity of the indentation. The deboss is preferably a plurality of such indentations, wherein the deboss extends along at least a portion of the longitudinal length of the reinforcing member.

In accordance with at least one embodiment, to form the glass-reinforced polyurethane interior material, liquid or molten glass is added to the tooling downstream of the extruded polyurethane to blend the two materials together. In accordance with various embodiments, the glass-reinforced polyurethane may be entrained with air or otherwise foamed to provide a lighter material that still exhibits advantageous engineering properties. By way of example and not limitation, one possible blend for the glass-reinforced polyurethane comprises 70% glass by weight and 30% polyurethane by weight. This blended material comprises the reinforcing member of various structural members as described herein, and for example, can serve as a substitute material for an aluminum alloy reinforcing member. The glass-reinforced polyurethane is then fed through a crosshead die to the surrounding thermoplastic comprising, for example, HDPE or PP, with or without fillers of calcium carbonate or talc. Engineering property assessments have been made on this core, with values of 6.5-7.2 Mpsi modulus, simulating properties of aluminum. The glass-reinforced polyurethane core/reinforcing member material also offers advantages over other materials, such as a metal alloy reinforcing core. More particularly, mechanical bonding between the reinforcing member and the surrounding thermoplastic is less significant of an issue because bonding between the glass-reinforced polyurethane interior and the surrounding thermoplastic is achieved sufficiently through chemical bonding between the two materials, that is, the reinforcing member and the surrounding thermoplastic.

By way of example and not limitation, for reinforcing members comprising a metal, such as steel, aluminum or an aluminum alloy, the reinforcing member may be heated or cooled to improve bonding of the thermoplastic material around the reinforcing member. In addition, in at least one embodiment, one or more streams of air or gas are can be directed at one or more parts of the column, post or structural member during manufacturing to prevent the thermoplastic material from pulling away from the reinforcing member. In at least one embodiment, one or more streams of air or gas are thermally adjusted to promote controlled heating or cooling of the thermoplastic material against the reinforcing member. In addition, in at least one embodiment of the invention, the die used to form portions of the structural member are heated and/or cooled to control heating and/or cooling of the thermoplastic plastic material and/or reinforcing member, thereby helping to control shrinkage and/or swelling of the thermoplastic material relative to the reinforcing member. An air pocket may be used in certain areas during the manufacturing process to avoid contraction of the thermoplastic material away from the arms of the reinforcing member. Thus, during one possible method of manufacture, as the reinforcing member enters die, such a crosshead thermoplastic extrusion die, the reinforcing member may be either heated or cooled to assist in a more even cooling and distribution of the thermoplastic material around the reinforcing member. The die itself may also be either heated or cooled to further assist in a more even cooling and distribution of the thermoplastic material around the reinforcing member. In addition, sonic vibration of the reinforcing member or the die may be applied to increase thermoplastic throughput, and thus increase overall production. In general, sonic vibration acts to keep the thermoplastic flowing and in liquid form and from reaching a solid condition prematurely. In addition, to assist even distribution of the thermoplastic in certain thicker sections, and air port providing air pressure may be added to assist in keeping the thermoplastic flow at more equal velocity and extend and maintain the contact with the reinforcing member.

To assist in the understanding of the present invention the following list of components and associated numbering found in the drawings is provided herein:

| Number | Component |
|---|---|
| 10, 50, 70, 90, 130, 180, 210 | load bearing assembly |
| 20, 50, 70, 90, 130, 180, 210 | structural member |
| 14, 172 | beam |
| 18 | screws |
| 22 | decking |
| 23 | first end of structural member |
| 25 | second end of structural member |
| 26, 56, 76, 96, 136, 188, 218 | reinforcing member |
| 28, 58, 78, 98, 138, 192, 222 | channels |
| 24, 54, 74, 94, 134, 184, 214 | thermoplastic casing/HDPE |
| 30 | interior surface of channels |
| 32, 62, 82, 100, 148 | faces of reinforcing member |
| 34 | exterior of reinforcing member |
| 36, 66, 86, 106, 108, 114, 122, 142, 146, 196, 226 | cross members |
| 38 | octagonal pattern of reinforcing member |
| 40, 72, 92 | interior of reinforcing member |
| 42, 60, 110, 202 | central interior area |
| 44, 64, 84, 102, 104 | peripheral interior areas |
| 48 | interior faces of reinforcing member |
| 68, 88 | intermediate point of interior faces |
| 80, 118 | center of structural member |
| 100 | lateral side of reinforcing member |
| 164 | bolt |
| 168 | nut |
| Θ | angle between cross members |
| L | Longitudinal length of structural member |

Figure 15A:
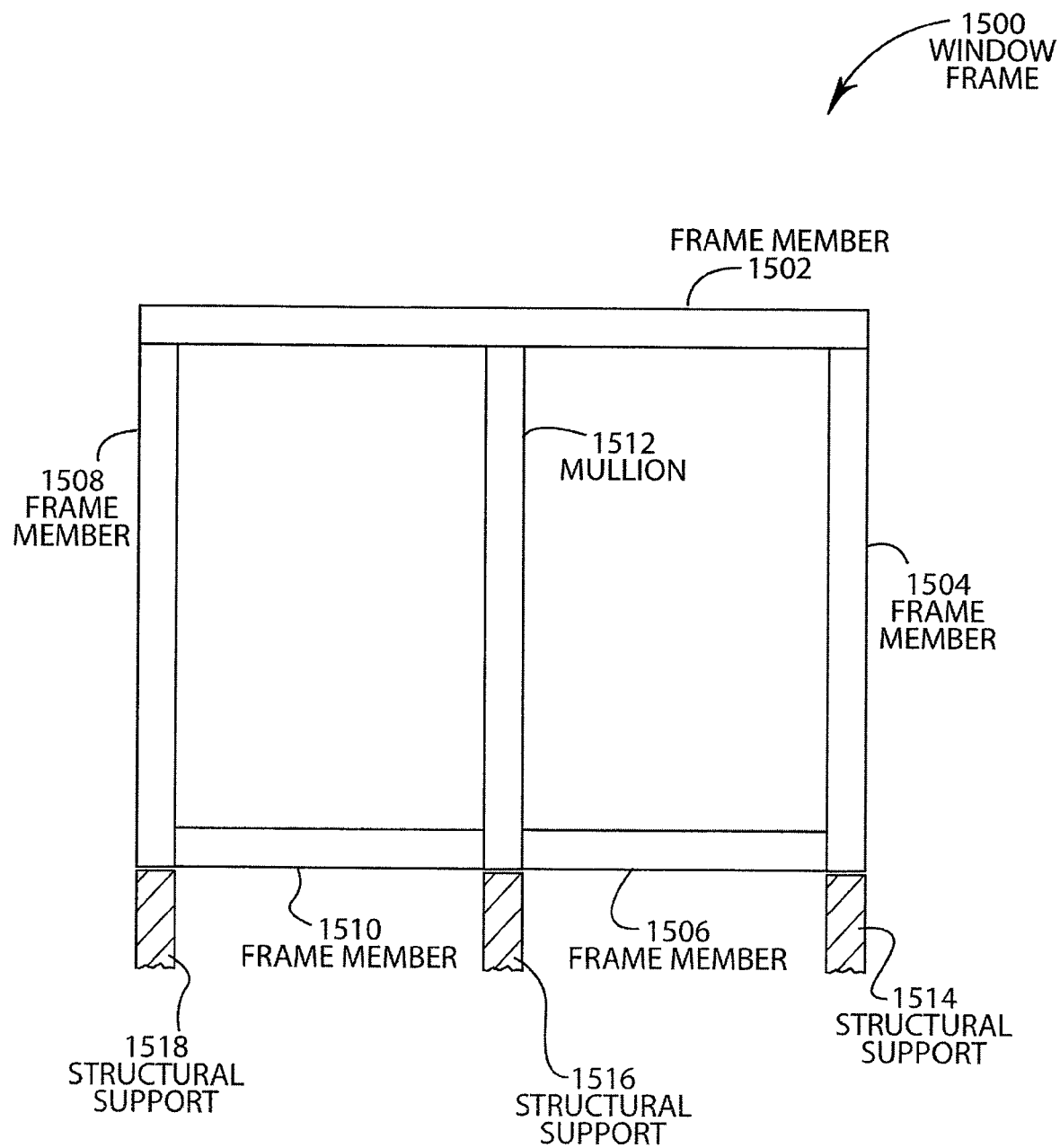
FIG. 15A is a schematic side view of an embodiment of a window frame.

FIG. 15A is a schematic side view of an embodiment of a window frame 1500. As shown in FIG. 15A, the window frame 1500 includes frames members 1502, 1504, 1506, 1508 and 1510. In addition, a center mullion 1512 is disposed between frame number 1502 and a structural support 1516. The window frame 1500, that is illustrated in FIG. 15A, uses structural supports for the frame members 1502-1510 and mullion 1512. The frame members can be constructed as described below and in the manner set forth above with respect to the beams disclosed in FIGS. 1-14. Since the frame members 1502-1510 are structural members, they are capable of providing a self-supporting window frame 1500. As shown in FIG. 15A, structural supports 1514, 1516, 1518 are aligned with frame member 1504, mullion 1512 and frame member 1508, respectively. In this fashion, the frame member 1502 is supported by frame member 1504, mullion 1512 and frame member 1508 so that forces are transferred from the frame member 1502 to the structural supports 1514-1518.

Figure 15B:
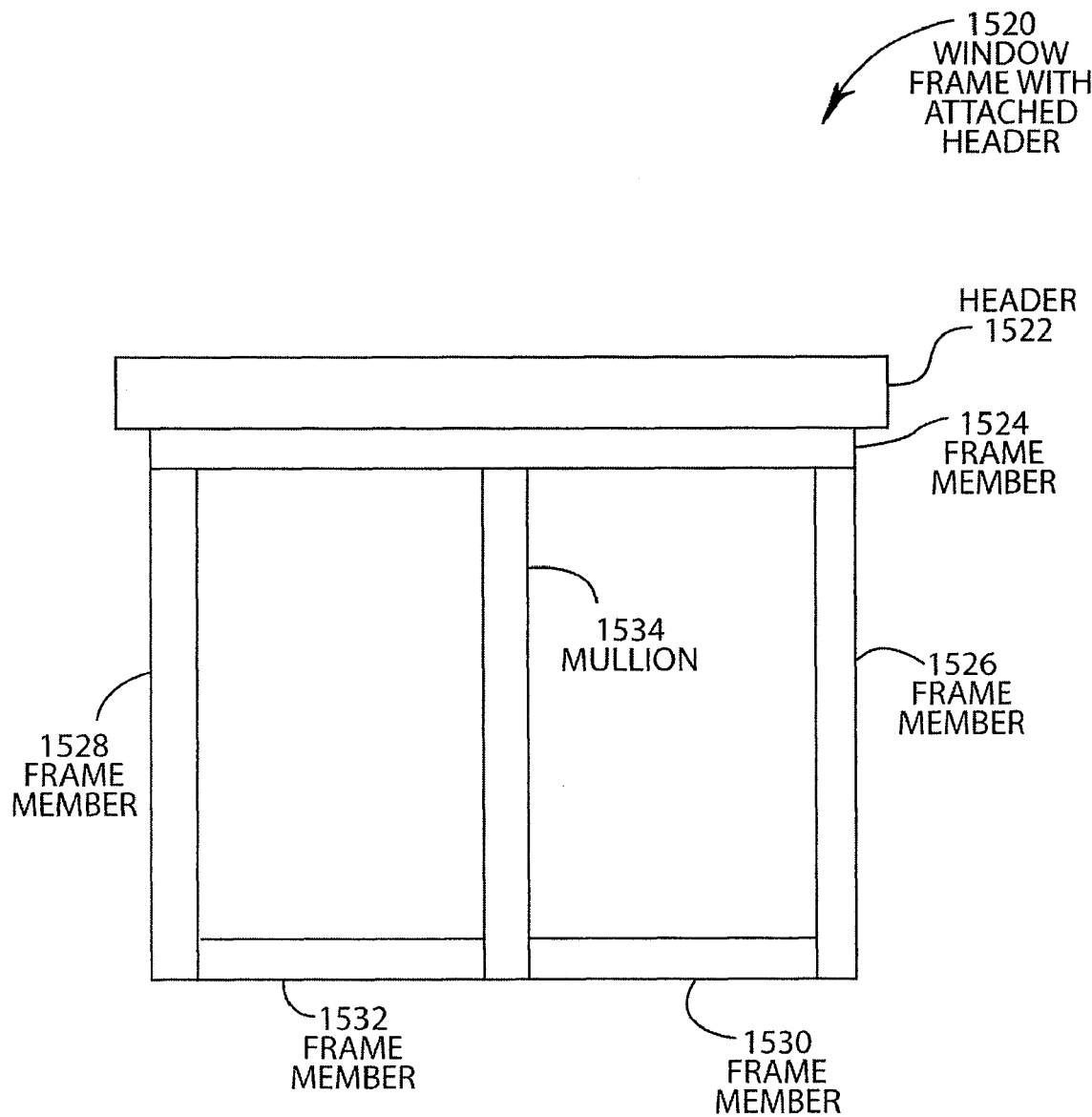
FIG. 15B is a schematic illustration of an embodiment of a window frame with an attached header.

FIG. 15B is a schematic illustration of an embodiment a window frame 1520 with an attached header 1522. Header 1522 provides structural support for the window frame 1520. Frame members 1524, 1526, 1528, 1530, 1532 can be constructed as structural members or frame members that are not structural members since header 1522 provides structural support.

Figure 15C:
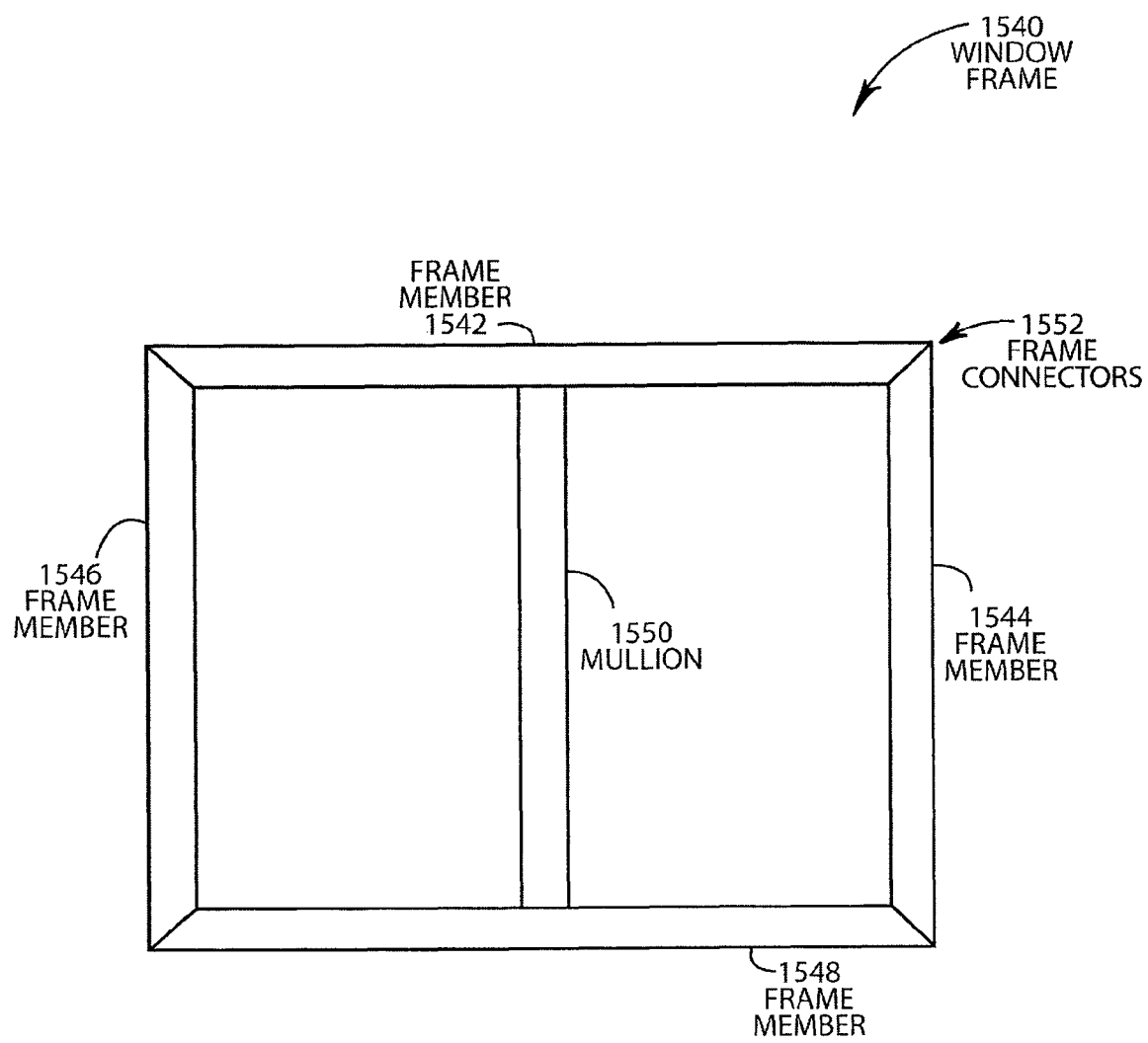
FIG. 15C is a schematic illustration of another embodiment of a window frame.

FIG. 15C is a schematic illustration of another embodiment of a window frame 1540. As shown in FIG. 15C, the window frame 1540 has frame members 1542, 1544, 1546, 1548 and mullion 1550 that are not structural members. Frame members 1542-1548 and mullion 1550 can be constructed as disclosed in accordance with the disclosure relating to FIGS. 17-25 below in a fashion that may or may not require that the frame members be structural members. As shown in FIG. 15C, the frame members 1542-1548 are joined together at 45 degree angles with frame connectors 1552.

Figure 16:
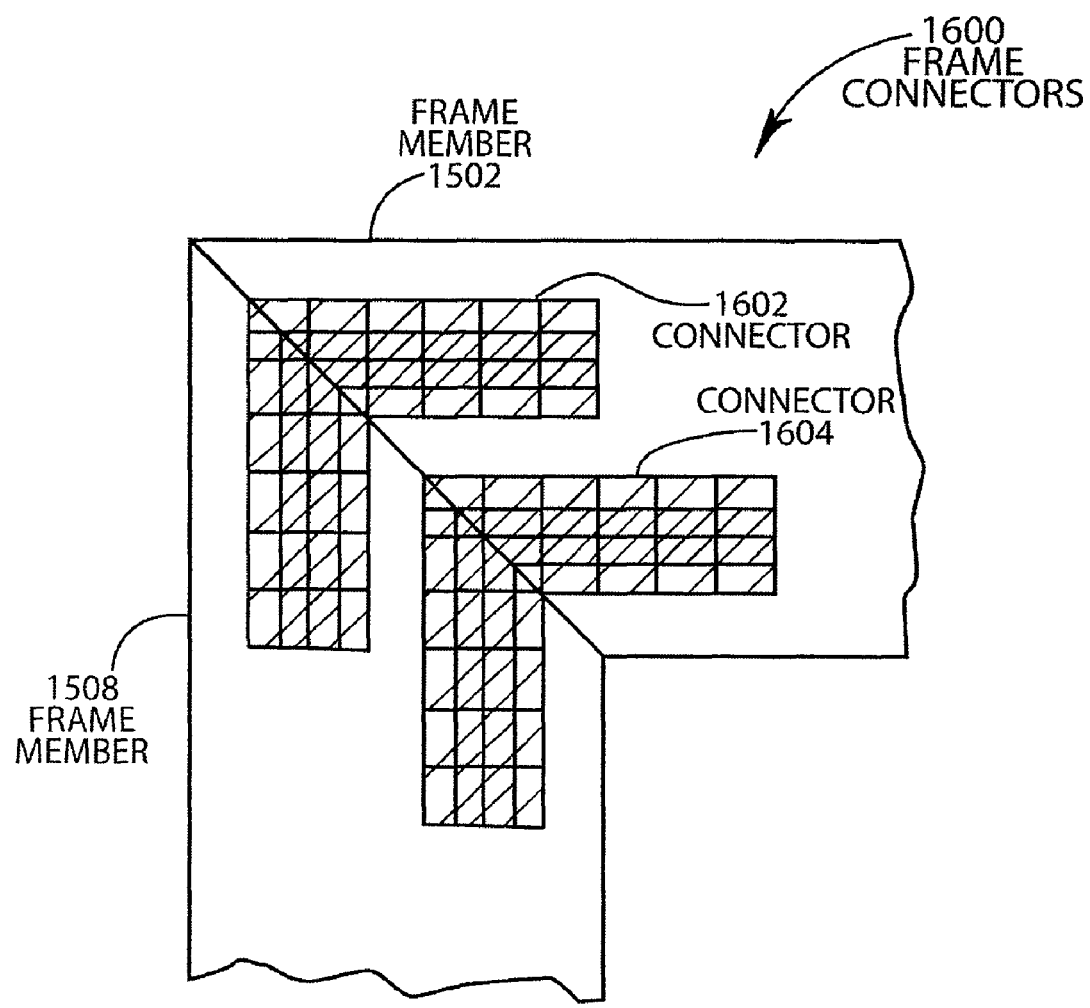
FIG. 16 is a schematic illustration of frame connectors that are used to join frame members.

FIG. 16 is a schematic illustration of the frame connectors 1600 that can be used to join the frame members such as frame member 1502 and frame member 1508 at a 45 degree angle. As shown in FIG. 16, connectors 1602, 1604 comprise angle connectors that connect the two frame members 1502, 1508 at a beveled 45 degree angle. Connectors 1602, 1604 comprise standard connectors that are typically used to join frame members, together to form a window frame.

Figure 17:
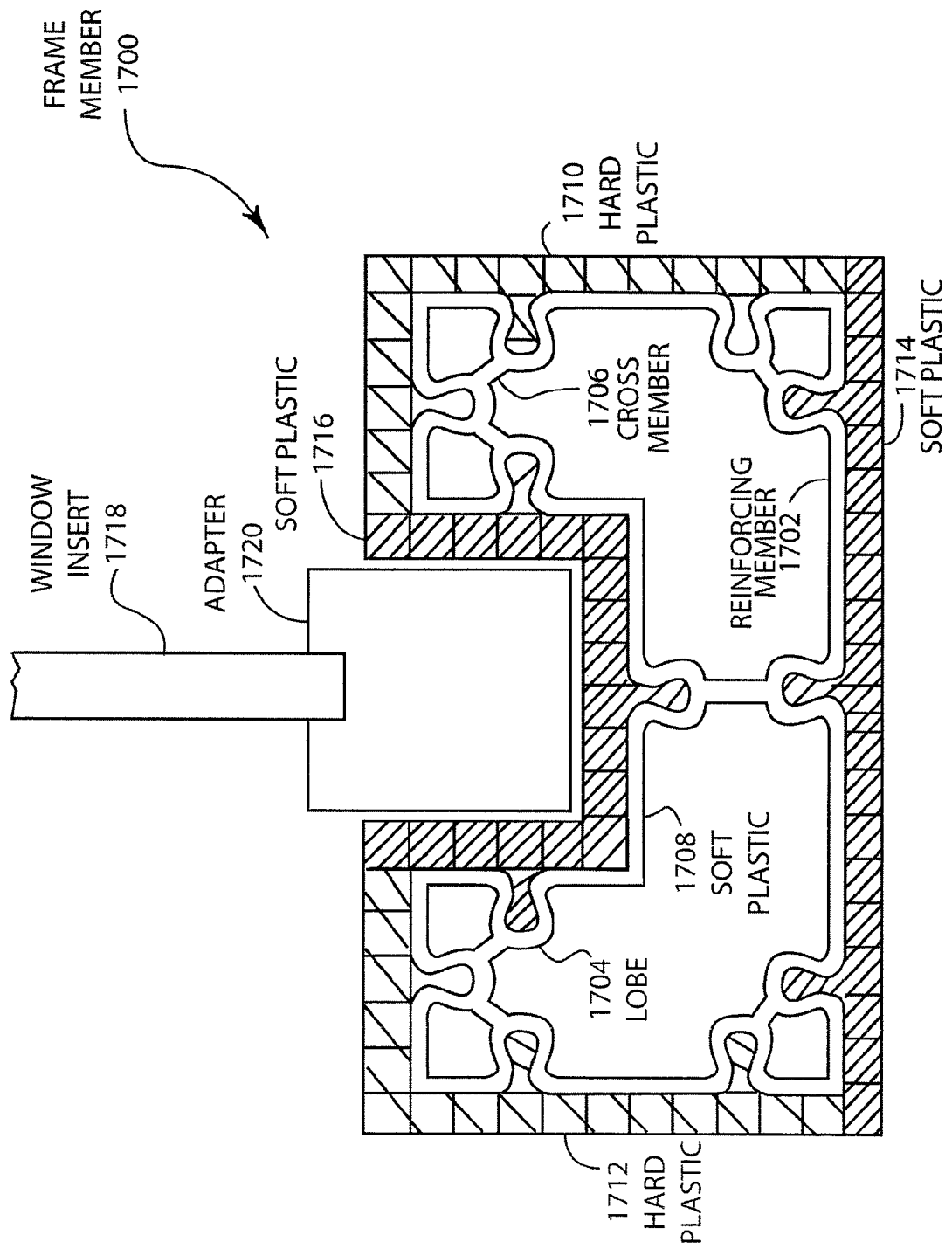
FIG. 17 is a schematic top view of a frame member for a window.

FIG. 17 is a schematic top view of an embodiment of frame member 1700 that can be used in a window frame. As shown in FIG. 17, the frame member 1700 includes an internal reinforcing member 1702 that may comprise an extruded metal frame that includes a number of lobes, such as lobe 1704. The plastic material that is disposed within the lobes, such as lobe 1704, is married to and knitted with the hard plastic outer layers 1710, 1712 and soft plastic layers 1714, 1716. The lobes, such as lobe 1704, help to hold the outer plastic layers 1710-1716 securely to the reinforcing member 1702 so that the plastic coverings 1710-1716 do not become separated from the reinforcing member 1702. The plastic material that is disposed within the lobes, such as lobe 1704, and the plastic layers 1710-1716 that are disposed on the outer surface of the reinforcing member 1702, are extruded in a two-step die as disclosed in more detail below. The outer plastic layers 1710-1716 are extruded at a high temperature onto the reinforcing member 1702 and are allowed to cool in a relatively slow manner to ensure that there is no separation between the outer plastic layers 1710-1716 and the reinforcing member 1702. As the outer plastic layers 1710-1716 cools, it shrinks and creates a waist banding effect around the reinforcing member 1702 and squeezes the reinforcing member 1702 in an inward direction. This waist banding effect holds the outer plastic layers 1710-1716 securely on the reinforcing member 1702.

As also shown in FIG. 17, reinforcing member 1702 includes additional cross members, such as cross member 1706, to provide additional support to the reinforcing member 1702. The reinforcing member 1702 is surrounded by a plastic coating that includes hard plastic layers 1710, 1712 and soft plastic layers 1714, 1716. The hard plastic materials 1710, 1712 are married to and knitted with the soft plastic materials 1714, 1716 to form a unitary enclosed structure that encloses the reinforcing member 1702. Soft plastic material 1716 provides a moisture seal with the adapter 1720 that holds the window insert 1718. Window insert 1718 may include a single pane window, double pane window, triple pane window, a photovoltaic collector or other device. Adapter 1720 allows the window insert 1718 to be removed and replaced if the window insert 1718 becomes broken. Further, soft plastic 1714 provides a moisture seal between the frame member 1700 and any supporting structure for the frame member 1700, such as the opening for a window frame. Of course, hard plastic materials can be used in place of the soft plastics 1714, 1716, as desired.

Figure 18:
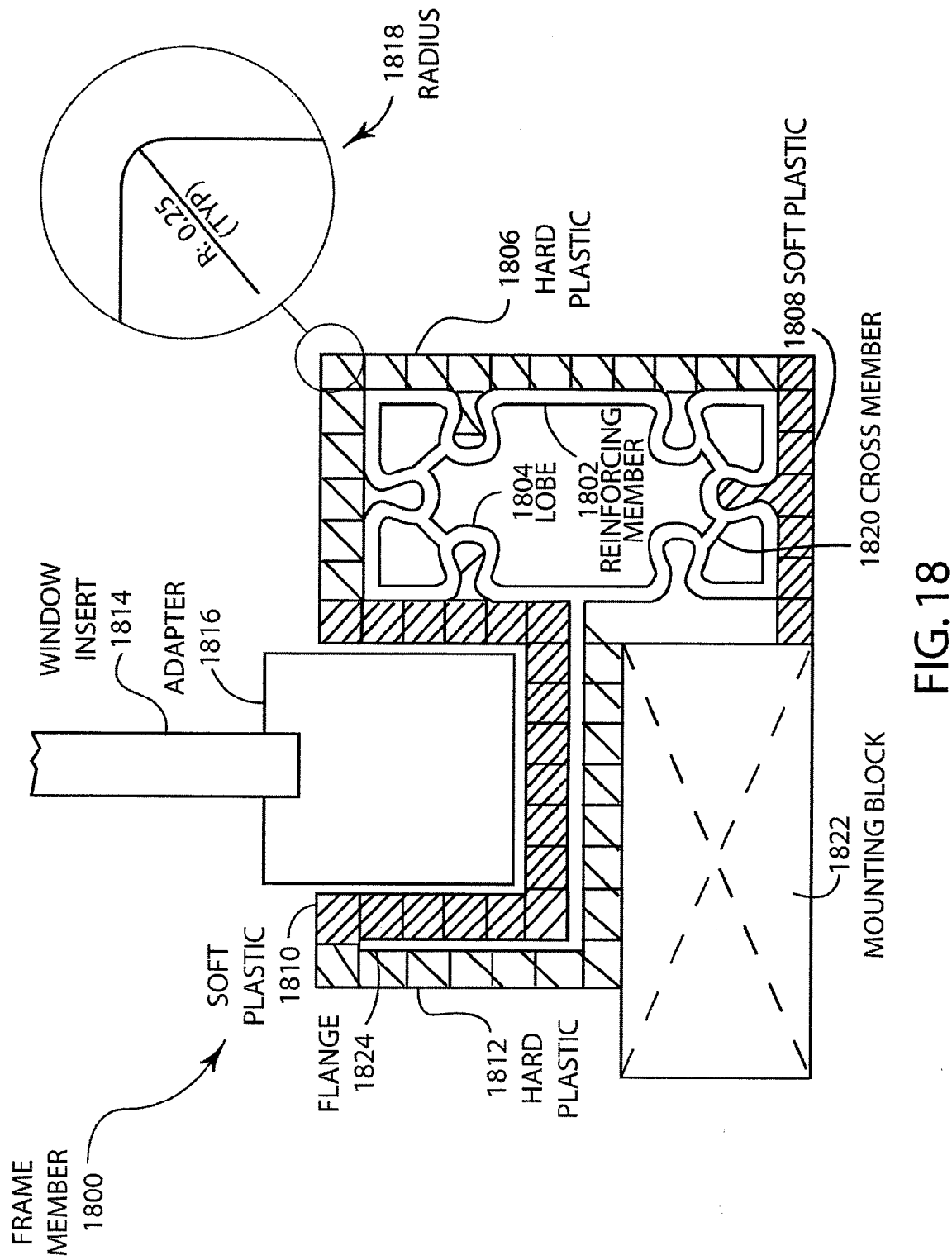
FIG. 18 is a schematic top view of an embodiment of a frame member.

FIG. 18 is a schematic top view of an embodiment of a frame member 1800. As shown in FIG. 18, the frame member 1800 includes a reinforcing member 1802 that has a number of lobes such as lobe 1804. As disclosed above, the plastic material that is extruded in the lobes, such as lobe 1804, is knitted with the outer plastic layers 1806, 1808, 1810, 1812. Cross members adjacent to the lobes, such as cross member 1820, add additional strength to the reinforcing member 1802. Again, waist banding occurs that tightly couples the outer plastic layers 1806-1812 to the reinforcing member 1802 to hold the outer plastic layer to the reinforcing member 1802. The waist banding effect, in conjunction with the lobes, such as lobe 1804, securely holds the plastic coverings 1806-1812 to the reinforcing member 1802. As also shown in FIG. 18, a flange 1824 is connected to the reinforcing member 1802, which is covered by a soft plastic layer 1810 and a hard plastic layer 1812. Flange 1824 creates a U-shaped opening in which an adapter 1816 is disposed that holds a window insert 1814. The adapter 1816 allows the window insert 1814 to be replaced without disassembling the window frame. Soft plastic layer 1810 provides a moisture seal for the adapter 1816. Of course, the soft plastic layer 1810 can be replaced by a hard plastic layer as desired. Olefin materials, such as HDPE or polypropylene, can be used for the outer plastic layer. In addition, PVC can also be used for the outer plastic layer. Materials, such as TPE or similar material, can be added to reduce the brittleness of the Olefin or PVC materials. In addition, additional TPE or similar material can be added in greater percentages to produce the soft plastic material 1810 that is disclosed in the various embodiments. FIG. 18 also illustrates the manner in which a mounting block 1822 is disposed adjacent to the frame member 1800 for mounting the frame member 1800. Radius 1818 illustrates the radius of the corners of the outer plastic coatings 1806-1812.

Figure 19:
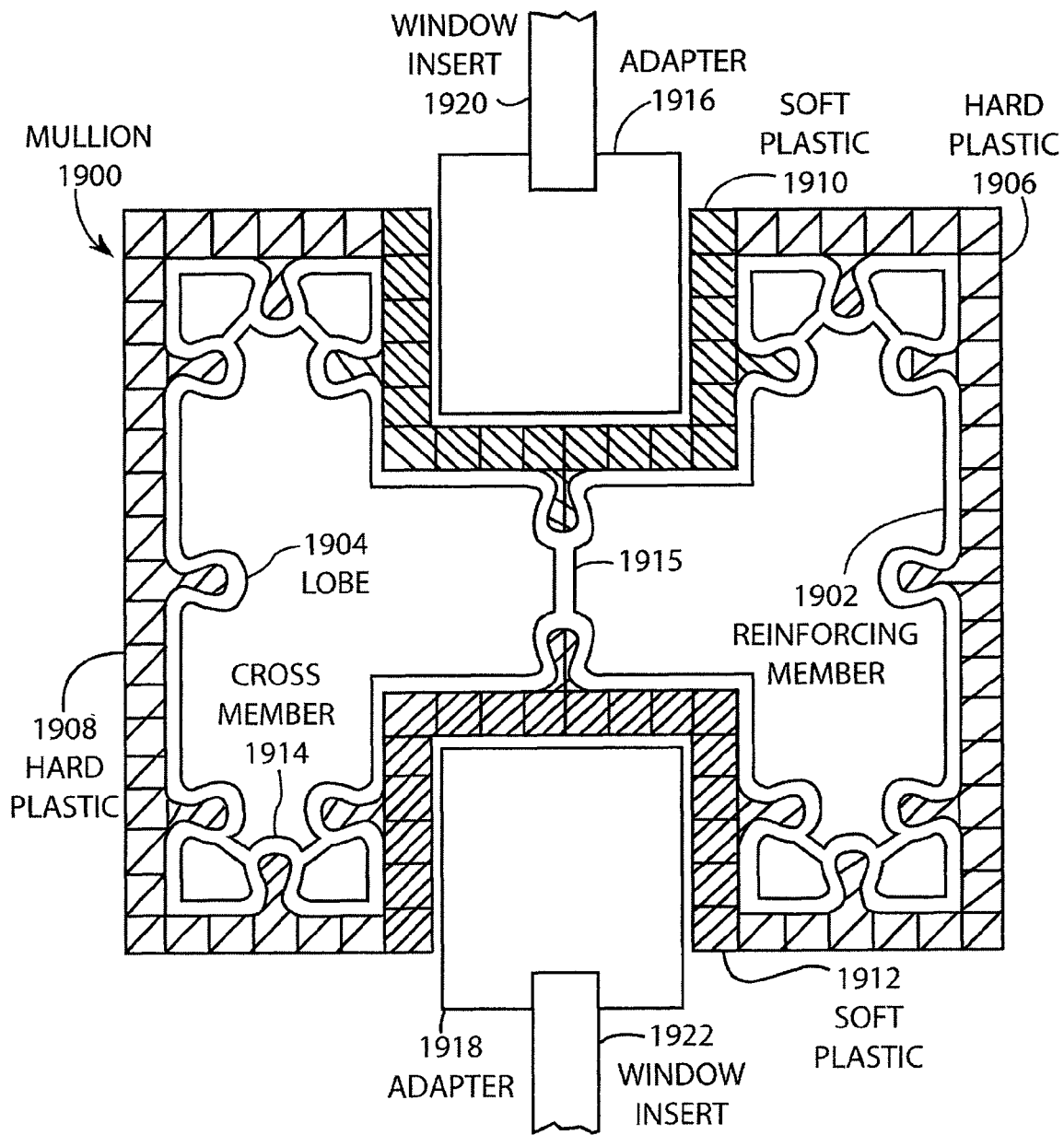
FIG. 19 is a schematic top view of an embodiment of a mullion.

FIG. 19 is a schematic top view of an embodiment of a mullion 1900. As shown in FIG. 19, a reinforcing member 1902 is surrounded by a plastic layer comprising hard plastic layers 1906, 1908 and soft plastic layers 1910, 1912. Reinforcing member 1902 includes cross members, such as cross members 1914, 1915, that increase the strength of the reinforcing member 1902. Mullion 1900 is disposed within the window frame and supports two windows. As shown in FIG. 19, adapters 1916, 1918 support window inserts 1920, 1922. Again, adapters 1916, 1918 provide a structure for replacing the window inserts 1920, 1922. Window inserts 1920, 1922 can comprise any desired window insert, such as single pane, double pane, triple pane window or other devices such as photovoltaic collectors. Because of the lightweight, durable and weather-resistant nature of the mullion 1900 and the frame member 1700 disclosed in FIG. 17, and frame member 1800 disclosed in FIG. 18, the frame members and mullions disclosed are ideally adapted to hold photovoltaic devices and to provide other resistant coverings for photovoltaic devices. The soft plastic layers 1910, 1912 provide a moisture seal around adapters 1916, 1918, respectively. The soft plastic materials 1910, 1912 automatically provide the moisture control and provide a convenient way of sealing window inserts 1920, 1922, as well as other devices such as photovoltaic collectors. Of course, all of the embodiments disclosed herein can be used to support photovoltaic devices.

Figure 20:
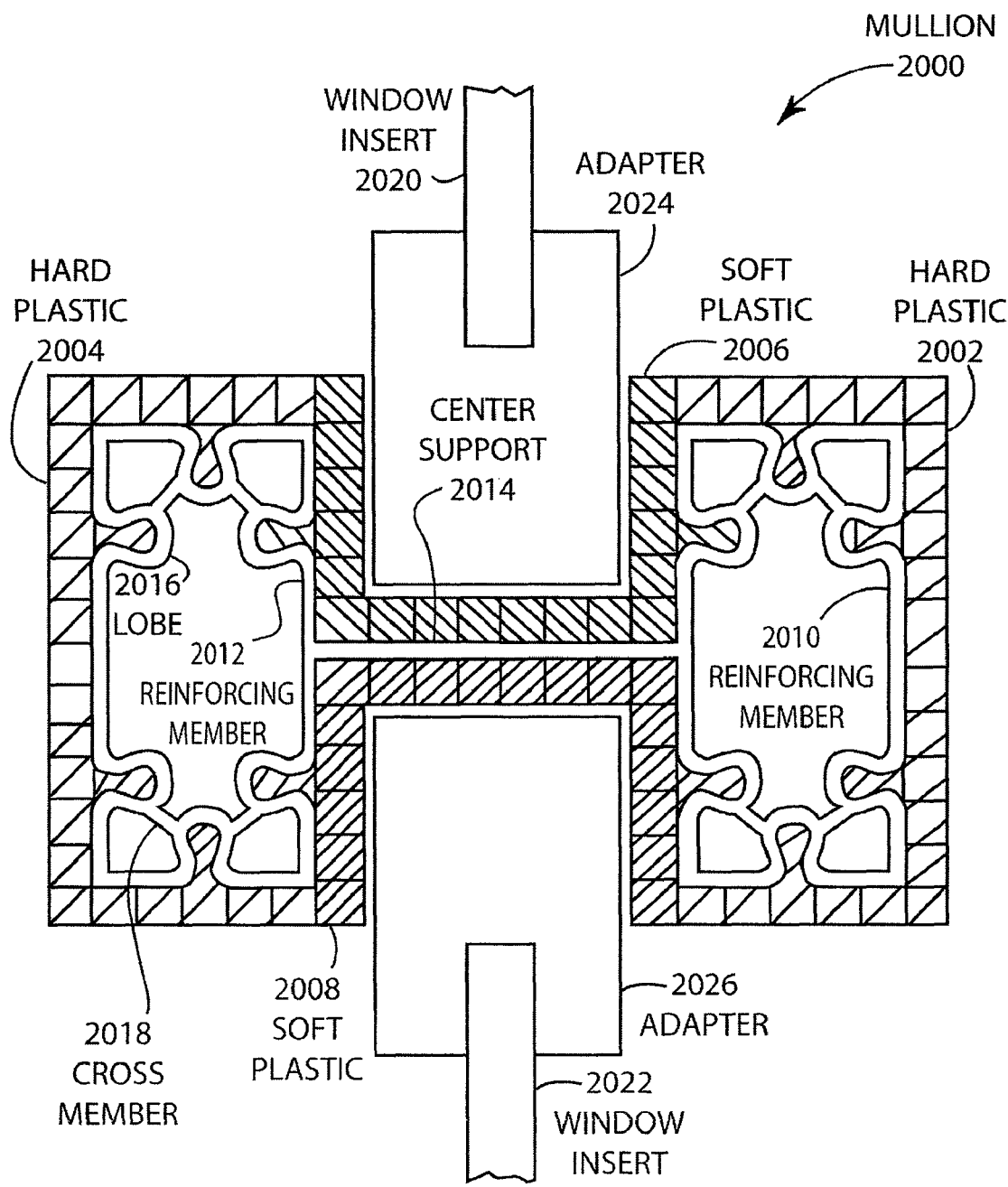
FIG. 20 is a schematic top view of another embodiment of a mullion.

FIG. 20 is a schematic top view of another embodiment of a mullion 2000. As illustrated in FIG. 20, an outer plastic coating comprising hard plastic layers 2002, 2004 and soft plastic layers 2006, 2008 surround the reinforcing members 2010, 2012. A center support 2014 connects the reinforcing members 2010, 2012 and is also surrounded by soft plastic layers 2006, 2008. The reinforcing members 2010, 2012 include a series of lobes, such as lobe 2016, that secure the outer plastic layer to the reinforcing members. Cross members, such as cross member 2018, add additional structural support to the reinforcing members 2010, 2012. The soft plastic layers 2006, 2008 provide a moisture seal between the mullion 2000 and the adapters 2024, 2026, respectively. Adapters 2024, 2026 hold window inserts 2020, 2022, respectively. Adapters 2024, 2026 provide a device for removing the window inserts 2020, 2022, respectively, if one of the window inserts 2020, 2022 becomes damaged. The embodiment disclosed in FIG. 20 can also be used for holding photovoltaic panels, as well as the embodiments disclosed in FIGS. 21-25, and all of the embodiments disclosed herein.

Figure 21:
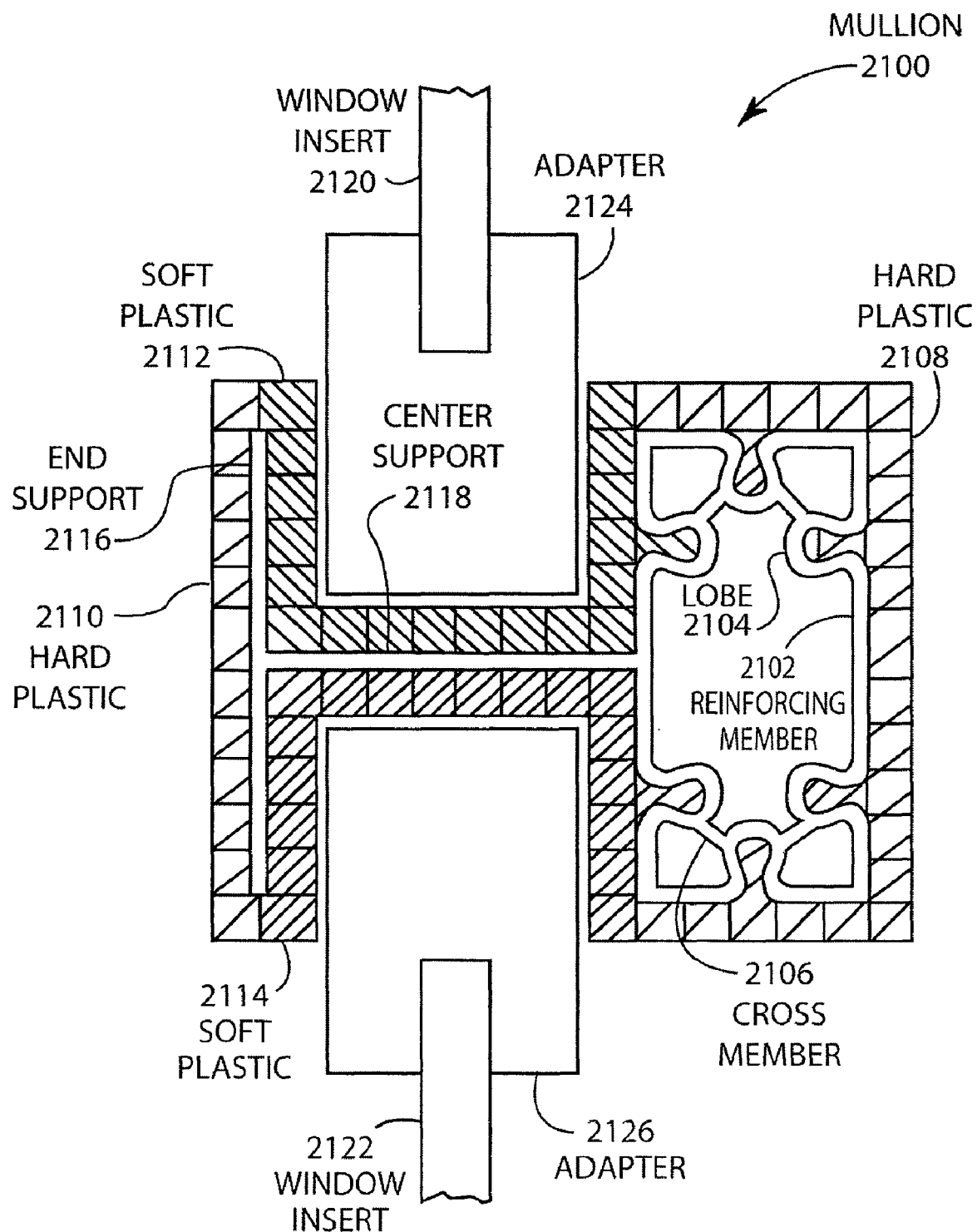
FIG. 21 is a schematic top view of another embodiment of a mullion.

FIG. 21 is a schematic top view of another embodiment of a mullion 2100. As shown in FIG. 21, the outer plastic coating comprises hard plastic layers 2108, 2110 and soft plastic layers 2112, 2114. The outer plastic layer substantially covers the reinforcing member 2102, as well as the center support 2118 and the end support 2116. In this fashion, the entire metal structure is substantially enclosed in the outer plastic layer. The reinforcing member 2102 includes a number of lobes, such as lobe 2104, that are filled with the plastic material and knitted to the outer plastic layer to hold the outer plastic securely against the reinforcing member 2102. Cross member 2106, as well as other cross members, provide structural support for the reinforcing member 2102. Adapters 2124, 2126 are disposed in the U-shaped openings formed by the center support 2118 and end support 2116. Adapters 2124, 2126 engage the plastic layers 2112, 2114, respectively, which creates a moisture seal between the adapters 2124, 2126 and the mullion 2100. Adapter 2124 holds the window insert 2120 and provides a device for changing the window insert 2120. Similarly, adapter 2126 holds the window insert 2122 and provides a device for changing the window insert 2122.

Figure 22:
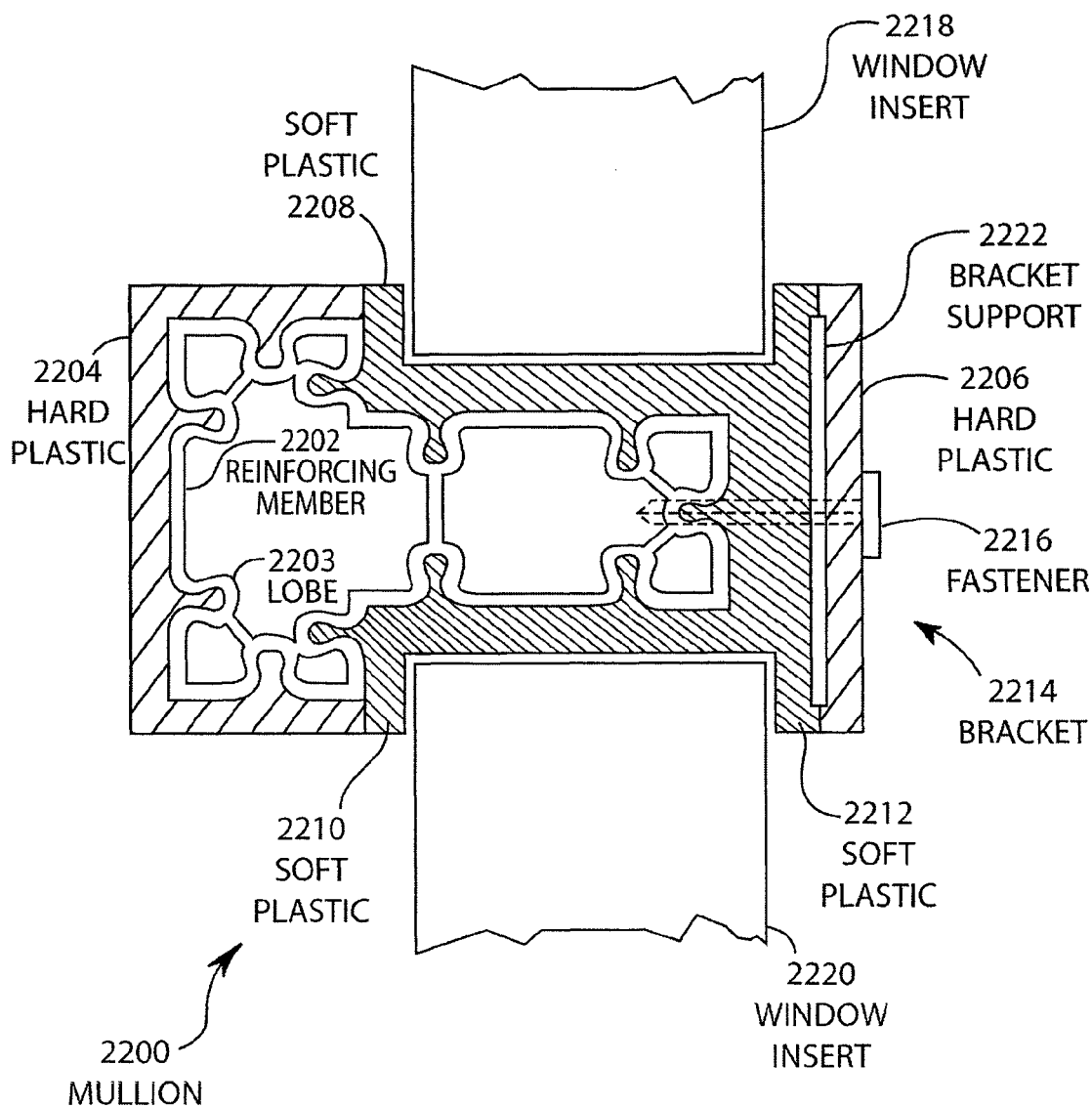
FIG. 22 is a schematic top view of another embodiment of a mullion.

FIG. 22 is a schematic top view of another embodiment of a mullion 2200. As shown in FIG. 22, the mullion 2200 includes a reinforcing member 2202 that is surrounded by an outer plastic layer that comprises hard plastic layer 2204, soft plastic layer 2208 and soft plastic layer 2210. These plastic layers are knitted together to form a unitary outer plastic layer that generates an inward waist banding force around the reinforcing member 2202 as the outer plastic layer cools. Reinforcing member 2202 includes a number of lobes, such as lobe 2203, that hold the outer plastic layer securely to the reinforcing member 2202. Bracket 2214 is held to the reinforcing member 2202 by way of a fastener 2216. Fastener 2216 can be a decorative screw, such as a metal screw, that engages the metal of the reinforcing member 2202. Bracket 2214 comprises a bracket support 2222 that is made of a metal material, such as aluminum, that is covered with hard plastic 2206 on the outer surface and a soft plastic 2212 on the interior surface. Window inserts 2218, 2220 are held in place in U-shaped openings by the bracket 2214. All of the surfaces that are engaged by the window inserts 2218, 2220 are soft plastic material that provides a moisture seal. Again, in this embodiment, and all of the embodiments disclosed, the soft plastic materials can be replaced with hard plastic materials. The bracket 2214 can be easily removed by loosening the fastener 2216 to replace the window inserts 2218, 2220.

Figure 23:
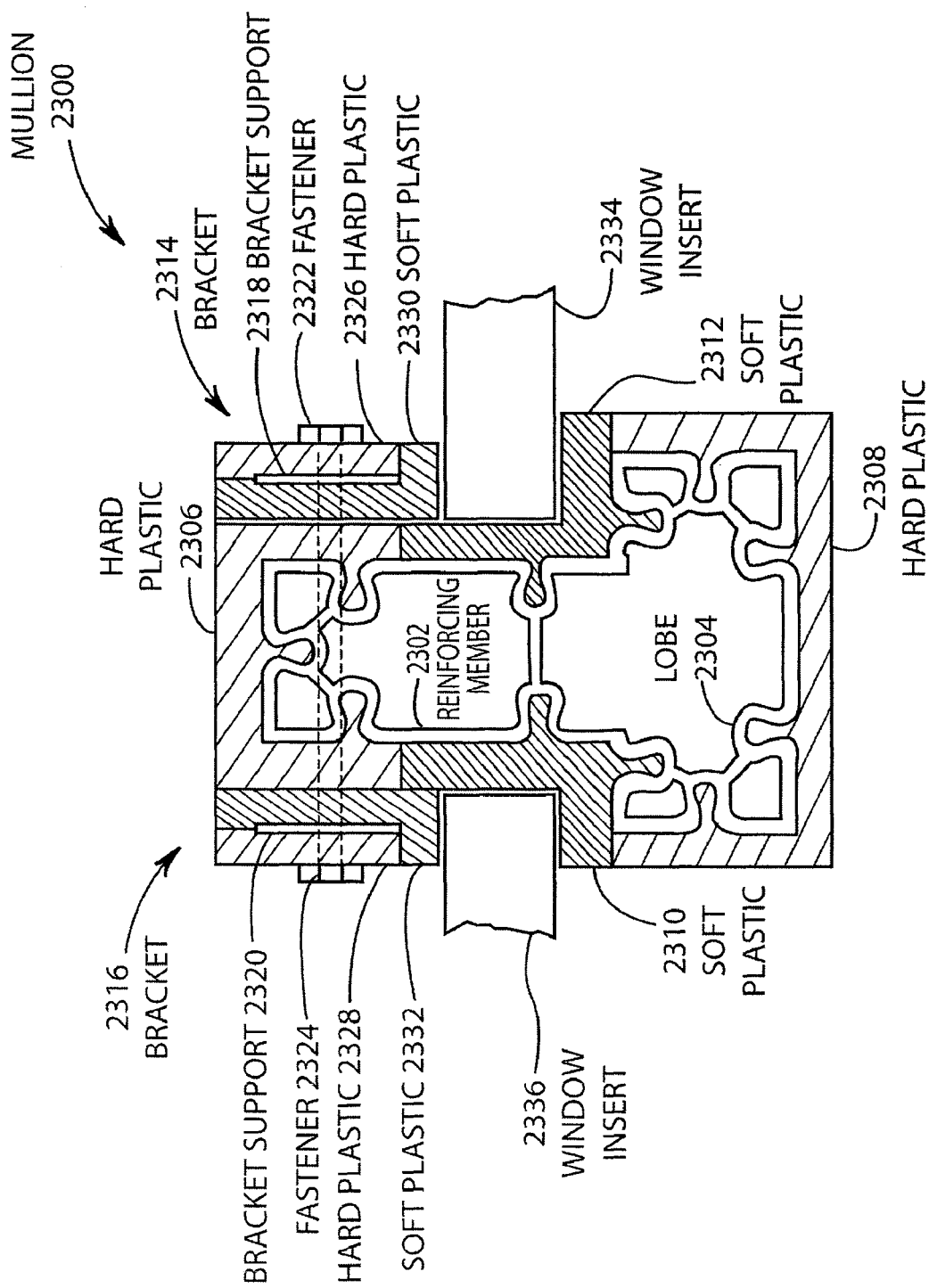
FIG. 23 is a schematic top view of another embodiment of a mullion.

FIG. 23 is a schematic top view of another embodiment of a mullion 2300. As shown in FIG. 23, a reinforcing member 2302 is surrounded by an outer plastic layer comprising hard plastic 2306, 2308 and soft plastics 2310, 2312. The plastic layers 2306-2312 are knit together to form a solid outer plastic layer that shrinks and generates a force on the reinforcing member 2302 as the plastic outer layer cools. This assists in holding the outer plastic layer to the reinforcing member 2302. In addition, lobes, such as lobe 2304, assist in holding the outer plastic layer to the reinforcing member 2302. The mullion 2300 includes removable brackets 2314, 2316. Fasteners 2322, 2324 hold brackets 2314, 2316 to the reinforcing member 2302. Fasteners 2322, 2324 allow the brackets 2314, 2316 to be removed to replace the window inserts 2334, 2336. Bracket 2314 includes a bracket support 2318 that is surrounded by a hard plastic layer 2326 and a soft plastic layer 2330. Similarly, bracket 2316 includes a bracket support 2320 that is surrounded by a hard plastic layer 2328 and a soft plastic layer 2330. Window insert 2334 is surrounded by the soft plastic layer 2312 and soft plastic layer 2330 to provide a moisture seal. Similarly, window insert 2336 is surrounded by soft plastic layer 2310 and soft plastic layer 2332 to also provide a moisture seal. Brackets 2314, 2316 can be removed and replaced as needed to replace the window inserts 2334, 2336.

Figure 24:
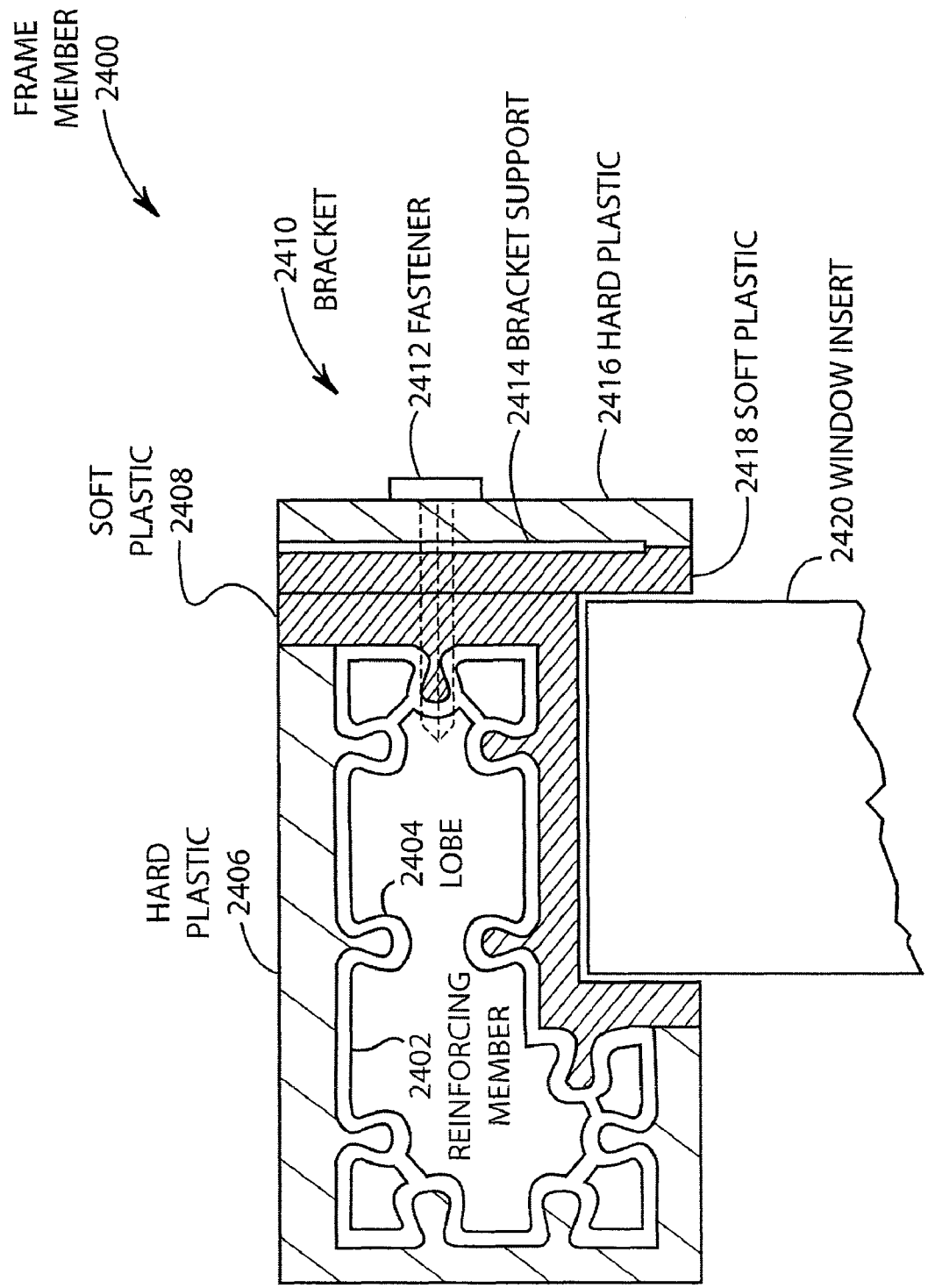
FIG. 24 is a schematic top view of another embodiment of a frame member.

FIG. 24 is a schematic top view of another embodiment of a frame member 2400. As shown in FIG. 24, frame member 2400 includes a reinforcing member 2402 that is surrounded by a plastic layer that protects the reinforcing member 2402 from the environment and provides additional support to the reinforcing member 2402. The outer plastic layer includes a hard plastic layer 2406 and a soft plastic layer 2408 that surround the reinforcing member 2402 and provide an inward waist banding force that holds the outer plastic layer to the reinforcing member 2402. In addition, there are a plurality of lobes, such as lobe 2404, that are formed in the reinforcing member 2402 that additionally help to hold the outer plastic layer to the reinforcing member 2402. The frame member 2400 also includes a bracket 2410 that is secured to the reinforcing member 2402 by a fastener 2412. Fastener 2412 can comprise a metal screw that engages the metal of the reinforcing member 2402. Bracket 2410 includes a metal bracket support 2414 that may also be made from aluminum or other metal that is covered by a hard plastic material 2416 and a soft plastic material 2418. The window insert 2420 engages the soft plastic material 2408 and the soft plastic material 2418, which provide a moisture seal for the window insert 2420. The window insert 2420 can be replaced by removing the bracket 2410 from the reinforcing member 2402.

Figure 25:
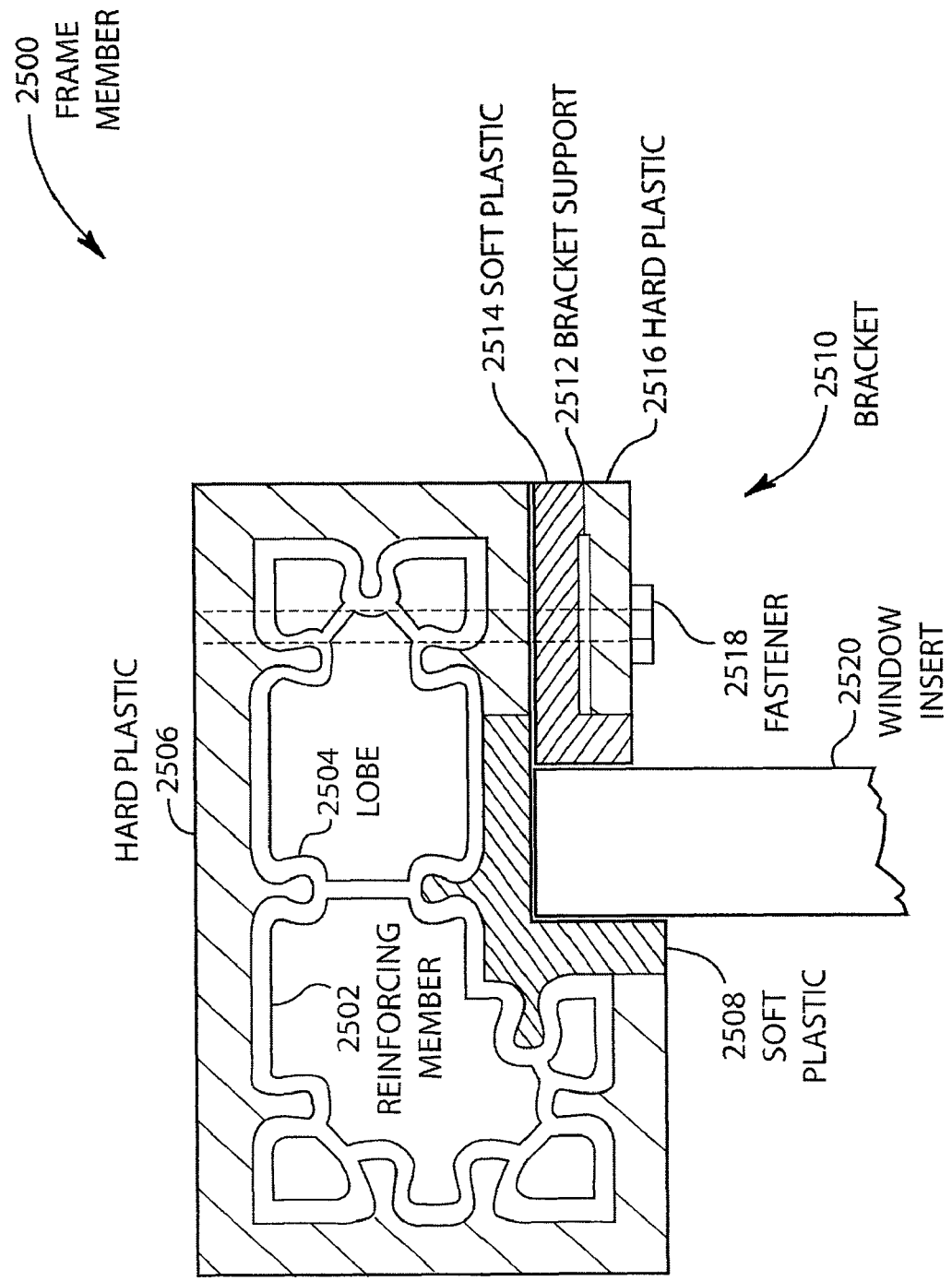
FIG. 25 is a schematic top view of another embodiment of a frame member.

FIG. 25 is a schematic top view of another embodiment of a frame member 2500. As shown in FIG. 25, reinforcing member 2502 is surrounded by an exterior plastic layer that comprises a hard plastic layer 2506 and a soft plastic layer 2508. Again, the hard plastic layer 2506 and the soft plastic layer 2508 are knitted together as a unitary exterior plastic layer that surrounds the reinforcing member 2502. As the exterior plastic layer cools, it generates an inward waist banding force that holds the outer plastic layer to the reinforcing member 2502. A plurality of lobes, such as lobes 2504 formed in the reinforcing member 2502, captures and holds the outer plastic layer securely to the reinforcing member 2502. The frame member 2500 also includes a removable bracket 2510. The removable bracket 2510 includes a metal bracket support 2512 that is surrounded by a soft plastic layer 2514 and a hard plastic layer 2516. Fastener 2518 engages the reinforcing member 2502 and securely holds the bracket 2510 to the reinforcing member 2502. Window insert 2520 engages the soft plastic layer 2508 and the soft plastic layer 2514 so that a moisture seal is created between window insert 2520 and the soft plastic layers 2508, 2514. The window insert 2520 can easily be removed and replaced by removing fastener 2518.

Hence, frame members and mullions have been disclosed that can be either structural supports or non-structural supports that hold window inserts in a window frame. In addition, the various embodiments can also be used to hold photovoltaic panels in a frame. The frame members include a reinforcing member that is protected by an encapsulated outer plastic layer that is held securely to the metal reinforcing member as a result of the waist banding effect of the outer plastic layer that contracts as it cools and completely surrounds the metal reinforcing member. Also, lobes are formed in the metal reinforcing member that holds the outer plastic layer to the metal reinforcing member. In addition, removable brackets or adapters can be used to replace window units or photovoltaic panels. Soft plastic material can be formed in the areas in which the window insert or photovoltaic panel engages the frame member or mullion to create a moisture seal.

Figure 26:
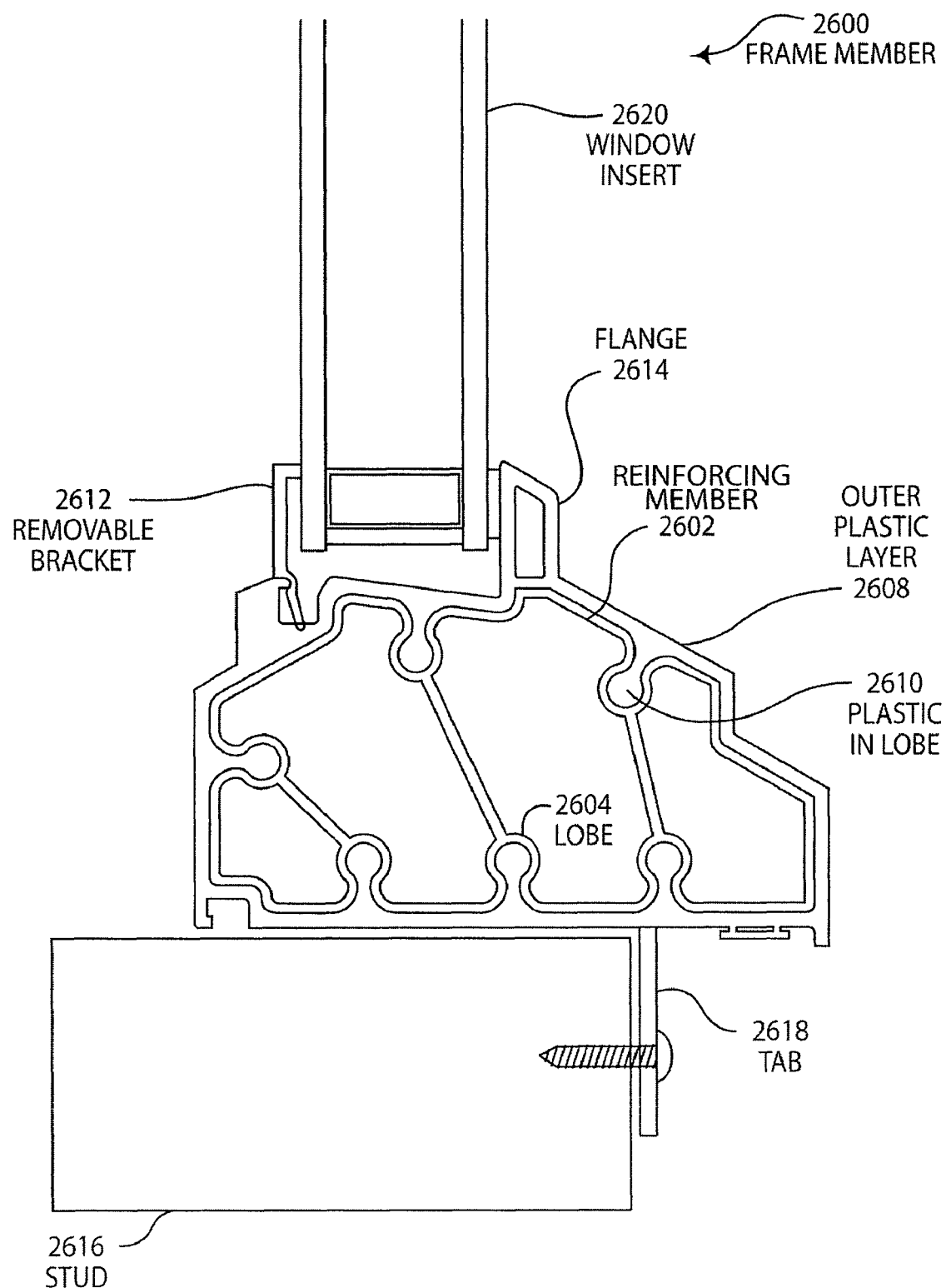
FIG. 26 is a schematic top view of another embodiment of a frame member.

FIG. 26 is a schematic top view of another embodiment of a frame member 2600. As shown in FIG. 26, the frame member 2600 includes a reinforcing member 2602 that can be made from any desired material, such as aluminum, steel, etc. The reinforcing member 2602 is formed to provide a plurality of lobes, such as lobes 2604. The lobes encapsulate a plastic material 2610 that is extruded in the first stage of an extruding device, as disclosed below. The outer plastic layer 2608 is extruded in a second stage of an extruding device and knits with the plastic 2610 in the lobes. The outer plastic layer 2608 and the plastic 2610 in the lobes knit together to form a unitary structure. The plastic 2610 in the lobes helps to secure the outer plastic layer 2608 to the reinforcing member 2602. In addition, as the outer plastic layer 2608 cools, it contracts and generates an inward waist banding force that secures the outer plastic layer 2608 to the reinforcing member 2602. The frame member 2600 also includes a flange 2614 that supports the window insert 2620. A removable bracket 2612 secures the other side of the window insert 2620 and holds the window insert 2620 securely to the frame member 2600. If the window insert 2620 is damaged, the removable bracket 2612 can be removed to remove the window insert 2620. A tab 2618 is used to secure the frame member 2600 to a stud 2616 that holds the frame member 2600 to the supporting structure around the frame member 2600.

Figure 27:
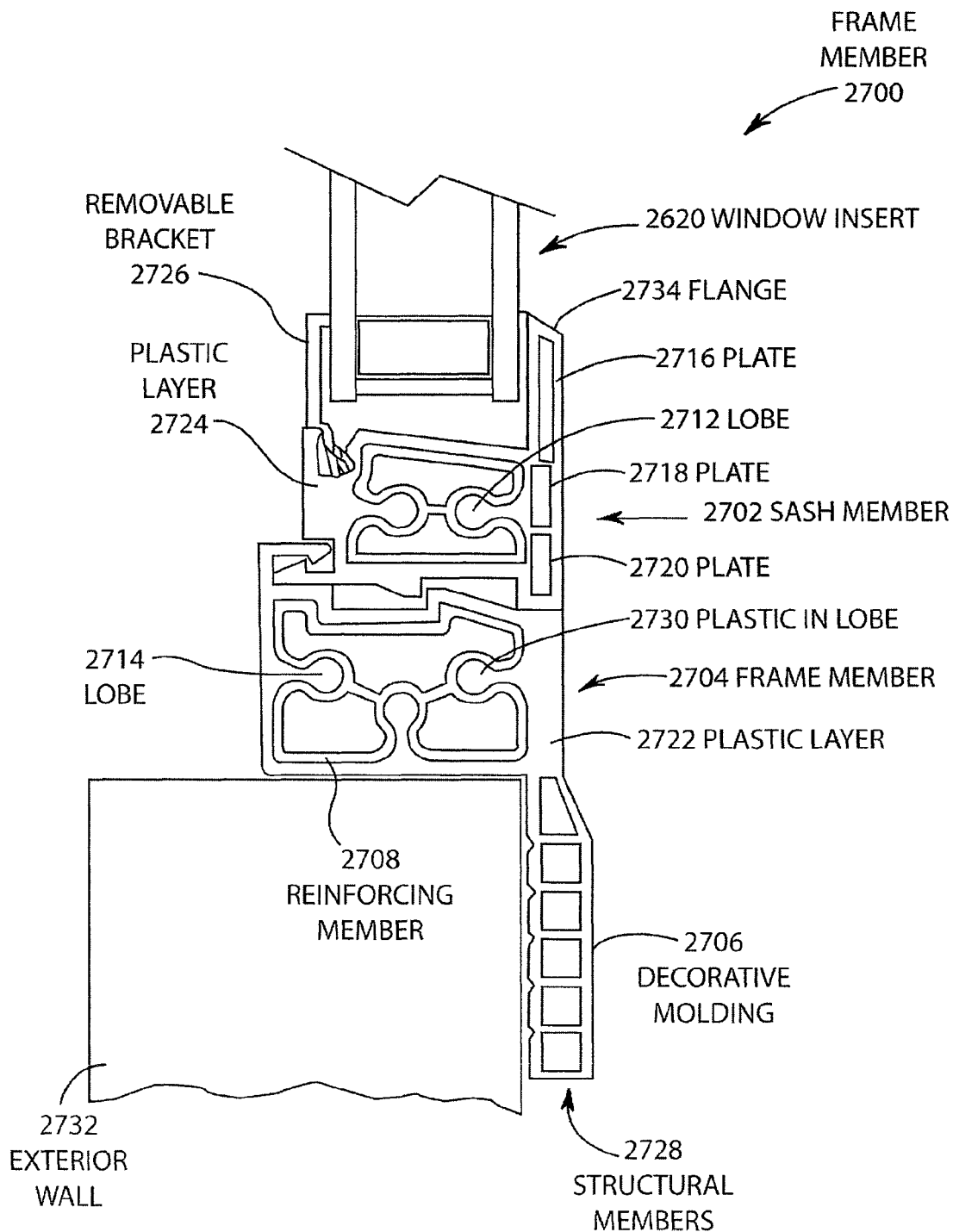
FIG. 27 is a schematic top view of another embodiment of a frame member.

FIG. 27 is a schematic top view of another embodiment of a frame member 2700. As shown in FIG. 27, the frame member 2700 includes a sash member 2702 and a frame member 2704. Frame member 2704 includes a decorative molding 2706 that has a series of structural members 2728 that allow some flexion of the decorative molding 2706. The decorative molding 2706 extends over the exterior wall 2732 to provide a decorative piece that covers the exterior wall 2732. Frame member 2704 includes a reinforcing member 2708 that includes a plurality of lobes, such as lobe 2714. Plastic 2730 is extruded in a first stage of an extrusion device into the lobes of the frame member 2704. Similarly, lobes in the sash member 2702, such as lobe 2712, are also filled with extruded plastic in a first stage of a two-stage crosshead die, as explained in more detail below. An outer plastic layer 2722 is extruded around the reinforcing member 2708 in a second stage of a two-stage crosshead die. Again, the outer plastic layer 2722 is held to the reinforcing member 2708 by the waist banding effect, as the plastic layer 2722 contracts during cooling. The plastic 2730 in the lobes also holds the plastic layer 2722 to the reinforcing member 2708. Sash member 2702 is constructed in a similar manner so that the plastic layer 2724 is securely held to the reinforcing member 2710. Plates 2716, 2718, 2720 add additional structure to the sash member 2702. Window insert 2720 is disposed between the flange 2734 of the sash member 2702 and the removable bracket 2726. The removable bracket 2726 can be removed to replace the window insert 2620 if it becomes damaged.

Figure 28:
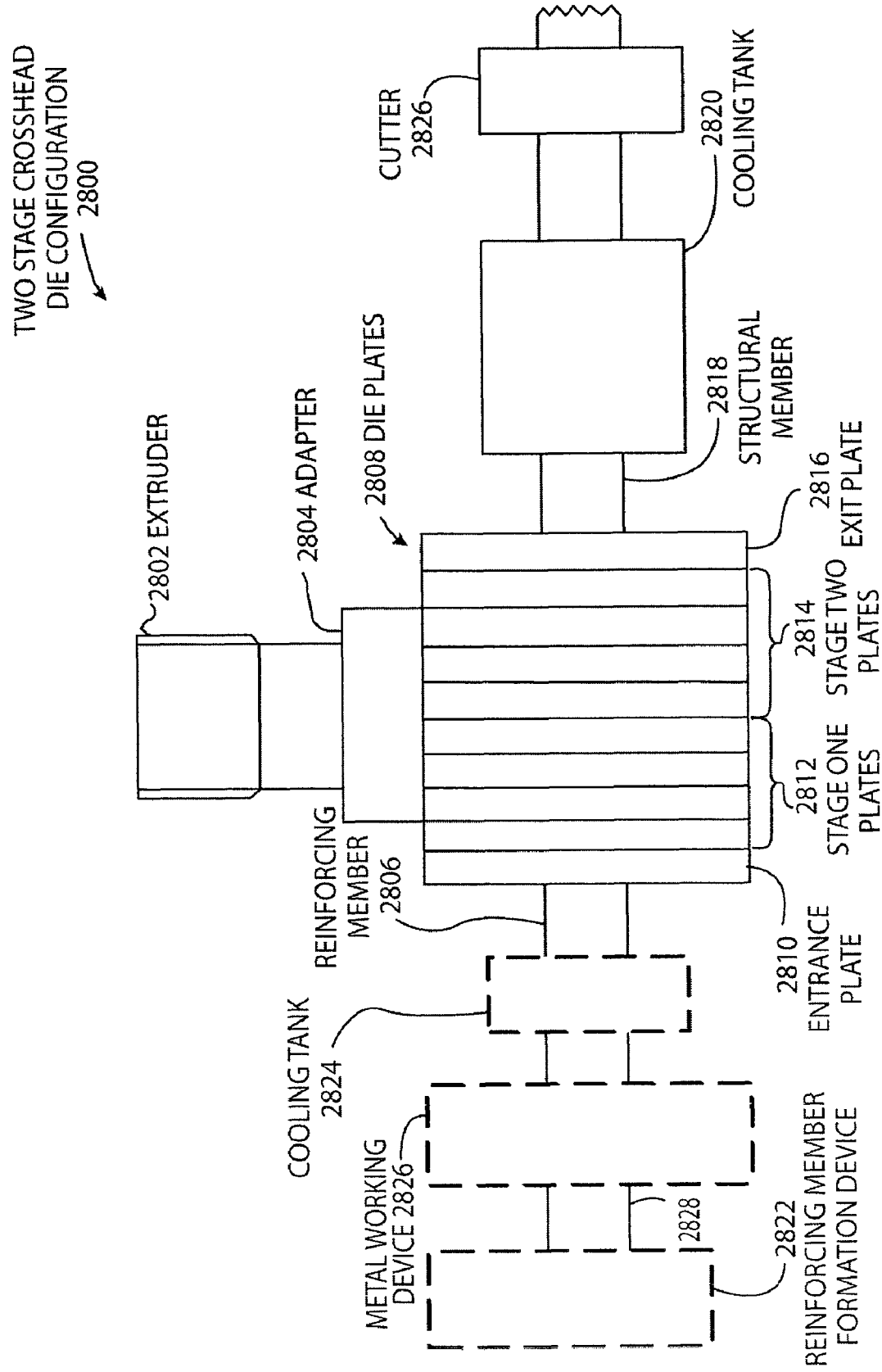
FIG. 28 is a schematic diagram of an embodiment of a two-stage crosshead die.

FIG. 28 is a schematic diagram of an embodiment of a two-stage crosshead die 2800. As shown in FIG. 28, a reinforcing member formation device 2822 may receive a roll of flat metal roll material, such as aluminum or aluminum alloy. The reinforcing member formation device 2822 bends the roll sheet material into the proper shape for the reinforcing member. The reinforcing member 2828 is then advanced to the metal working device 2826 that works the metal of the reinforcing member 2828. For example, the metal working device may form holes, divots, scarification and/or indentations in the reinforcing member, as more fully disclosed with respect to FIGS. 48 and 49, below. A cooling tank 2824 may also be used to cool the reinforcing member prior to insertion into the crosshead die. The metal working device 2826, the reinforcing member formation device 2822 and the cooling tank 2824 are all optional devices. A reinforcing member 2806 can be delivered to the two stage crosshead die configuration device 2800 ready for application of the resin without going through the process of forming the reinforcing device on location at the extrusion die site. As further shown in FIG. 28, the reinforcing member 2806 has a cross-sectional shape, such as the various shapes shown in the various figures disclosed herein. Reinforcing member 2806 is fed into the die plates 2808. The entrance plate 2810 has an opening that corresponds to the cross-sectional shape of the reinforcing member 2806 and prevents the backflow of plastic out of the entrance plate 2810. Extruder 2802 melts the plastic material and forces the plastic material at high pressure into the adapter 2804. A series of connecting channels extend through the die plates 2808 from the adapter 2804 to the various die plates comprising the stage one die plates 2812 and the stage two die plates 2814. The plastic material may be a subfractional melt HDPE or polypropylene material. Alternatively, PVC may be used, or other materials, as disclosed above. When a subfractional melt HDPE is used, it has low viscosity, so that the plastic must be extruded into the lobes in the stage one plates 2812 and then subsequently extruded, as the outer coating layer in the stage two plates 2814. Exit plate 2816 prevents the flow of plastic out of the exit of the die plates 2808. The coated reinforcing member, i.e., the structural member 2818, then exits from the die plates 2808 and travels through a cooling tank 2820. The structural member 2818 exits the die plates 2808 at a temperature in the range of 385° to 425° F. One or more cooling tanks or cooling water sprays may be used to cool the coated structural member 2818. The rate at which the structural member 2818 is cooled has an effect on the stress that is created in the thermoplastic layer. If the structural member 2818 is cooled too fast, stress relaxation will be exacerbated. In other words, to prevent separation of the outer plastic layer from the reinforcing member, it is important that the structural member 2818 is allowed to cool in air slowly over several days or weeks.

FIGS. 29-47 illustrate additional structural members. These structural members may be used in the manner similar to the manner in which standard dimensional lumber is used in construction, such as construction of buildings or other types of structures such as decks, docks and other structures that are exposed to weather, moisture and/or saltwater. These members may comprise beams, posts, columns, 1-joists, rim joists, trusses or portions of trusses and other types of structural members commonly used in construction. The reinforcing members throughout this application may comprise a metal or metal alloy material. For example, the reinforcing members may comprise an aluminum alloy material. Alternatively, the reinforcing members may comprise fiber glass, steel, carbon fiber, other types of fiber structures or any other type of reinforcing material that functions as a reinforcing element within the structural members illustrated.

The thermoplastic outer layers illustrated in all of the embodiments disclosed in this application may comprise any of a variety of types of thermoplastic materials which may include various types of fillers, such as talc, calcium carbonate or similar materials that increase the structural strength of the thermoplastic outer layers.

Figure 29:
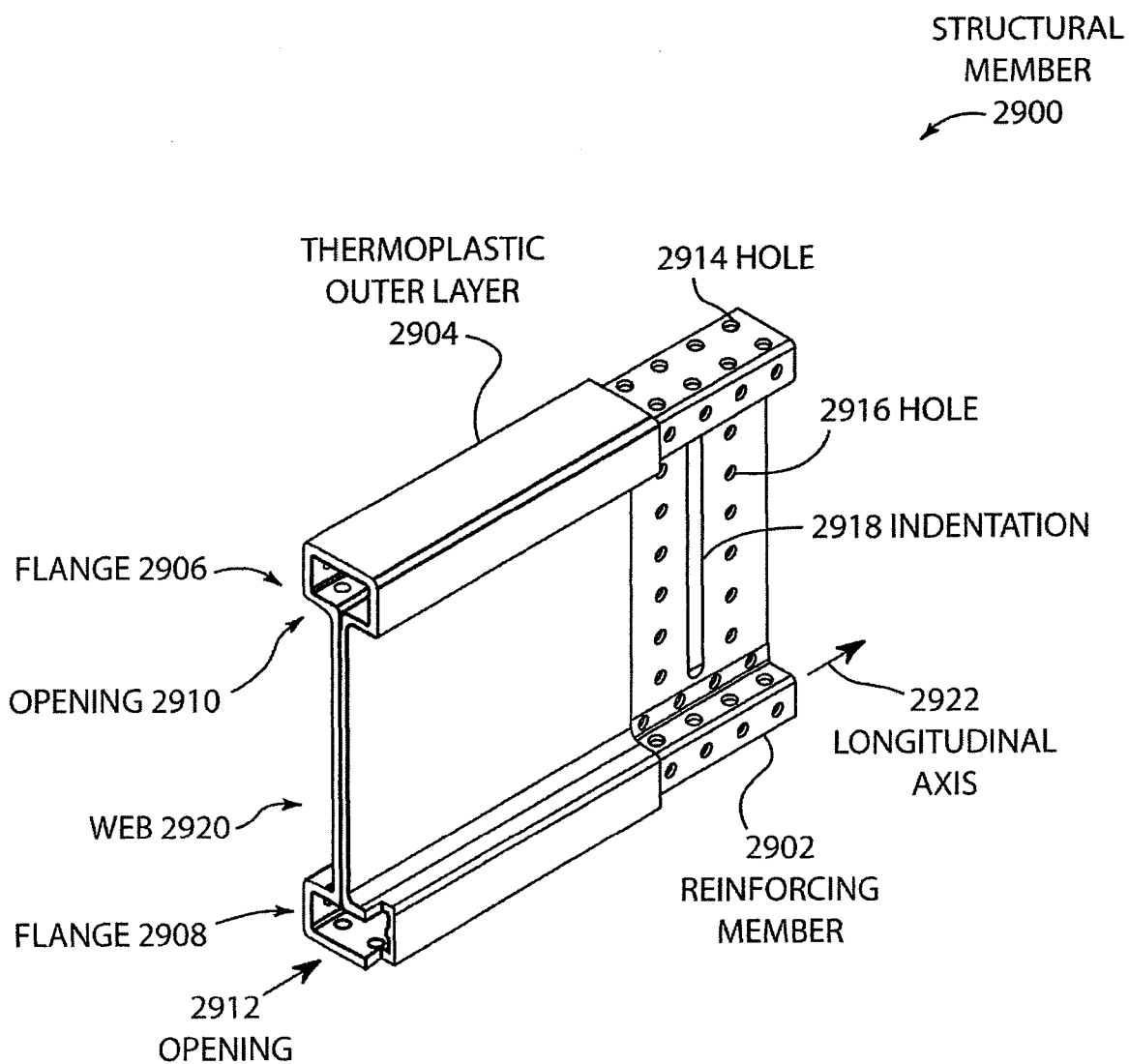
FIGS. 29-47 illustrate various embodiments of structural members.

FIG. 29 is a schematic perspective view of one embodiment of a structural member 2900 that is formed in the shape of an I-joist. The I-joist includes a reinforcing member 2902 which is covered by a thermoplastic outer layer 2904. FIG. 29 illustrates a portion of the thermoplastic outer layer 2904 removed from the reinforcing member 2902 so that portions of the reinforcing member 2902 can be viewed. The reinforcing member 2902 is formed to have two hollow flanges 2906, 2908 that are joined together by web 2920. The thermoplastic outer layer 2904 is extruded over the reinforcing member 2902, using a crosshead die extruder, such as illustrated in FIG. 28. The crosshead die extruder that extrudes thermoplastic material on the outer layer of the embodiment of FIG. 29, as well as all of the different embodiments illustrated in FIGS. 29 through 46, may use a single stage die. The embodiment of FIG. 47 may use a two-stage die.

Flanges 2906, 2908 of the structural member 2900, illustrated in FIG. 29, are formed with openings 2910, 2912, respectively, which reduces the overall weight of the structural member 2900. In addition, flanges 2906, 2908 provide additional strength to the structural member 2900 because of the structural features of the flanges 2906, 2908, especially when reinforcing member 2902 is covered with a thermoplastic outer layer 2904. Flanges 2906, 2908 define a longitudinal axis 2922 of the structural member 2900. Each of the structural members illustrated in FIGS. 29-46 may use a thermoplastic material that can include one or more fillers, such as calcium carbonate and/or talc. Talc can be included in amounts up to 50 percent, but preferably up to approximately 40 percent, to add strength to the plastic material. When the thermoplastic material is co-extruded onto the reinforcing member 2902, significant increases in the modulus of the elasticity occur. It is believed that the talc becomes oriented during the process of extrusion which results in these increases in the modulus of the elasticity.

As also shown in FIG. 29, a plurality of holes, such as holes 2914, 2916, are placed throughout the reinforcing member 2902. Extrusion of the thermoplastic outer layer 2904 over the reinforcing member 2902 causes the thermoplastic outer layer 2904 to penetrate the holes, such as 2914, 2916 that cause the thermoplastic outer layer 2904 to penetrate and securely attach to the structural reinforcing member 2902. Further, indentation 2918 also assists in securely attaching the thermoplastic outer layer 2904 to the reinforcing member 2902. In addition, when the thermoplastic outer layer 2904 cools, it shrinks and causes a waist banding effect that squeezes the thermoplastic layer 2904 onto the reinforcing member 2902 to further secure the thermoplastic outer layer 2904 to the reinforcing member 2902.

Figure 30:
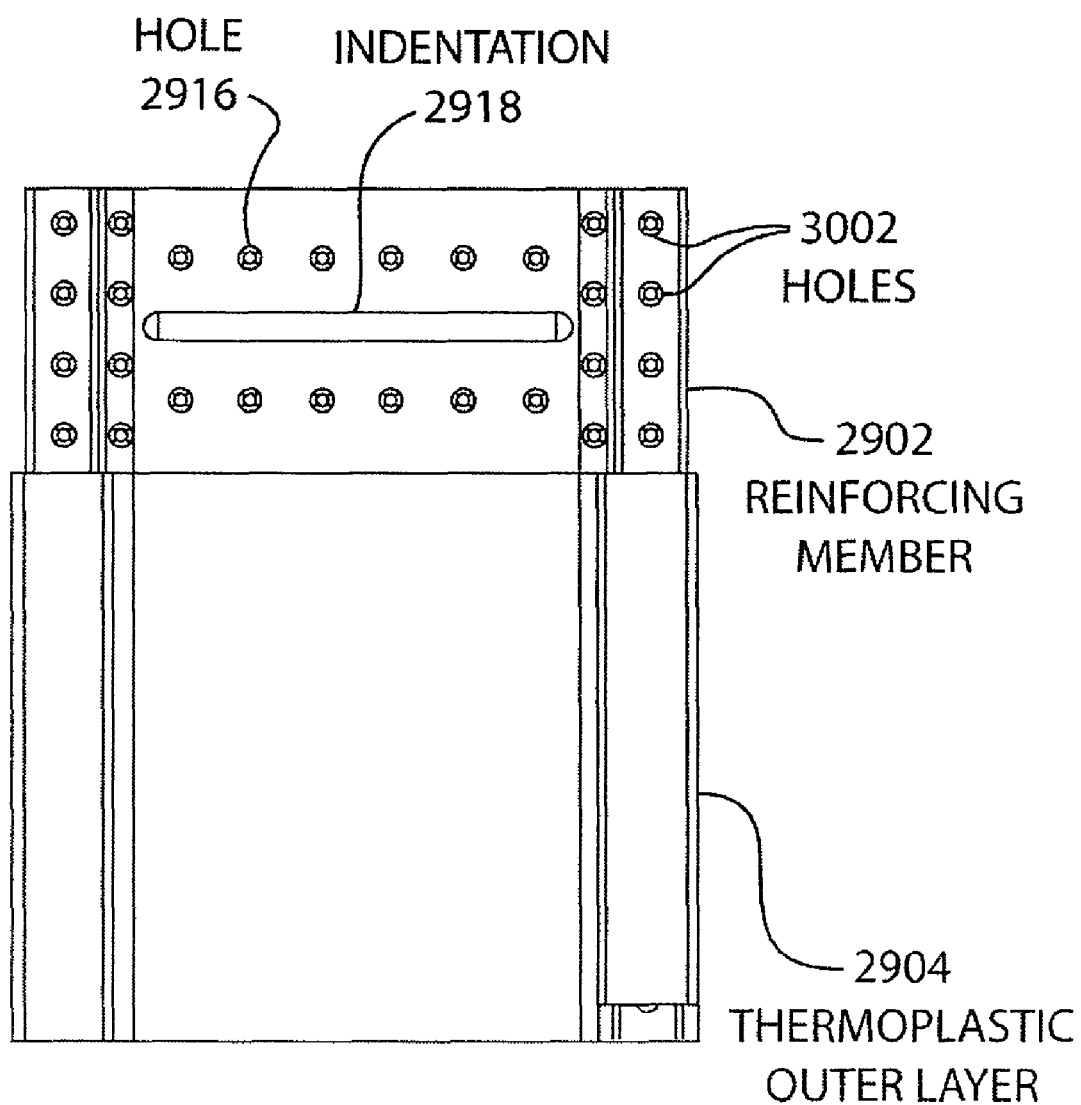
Figure 48:
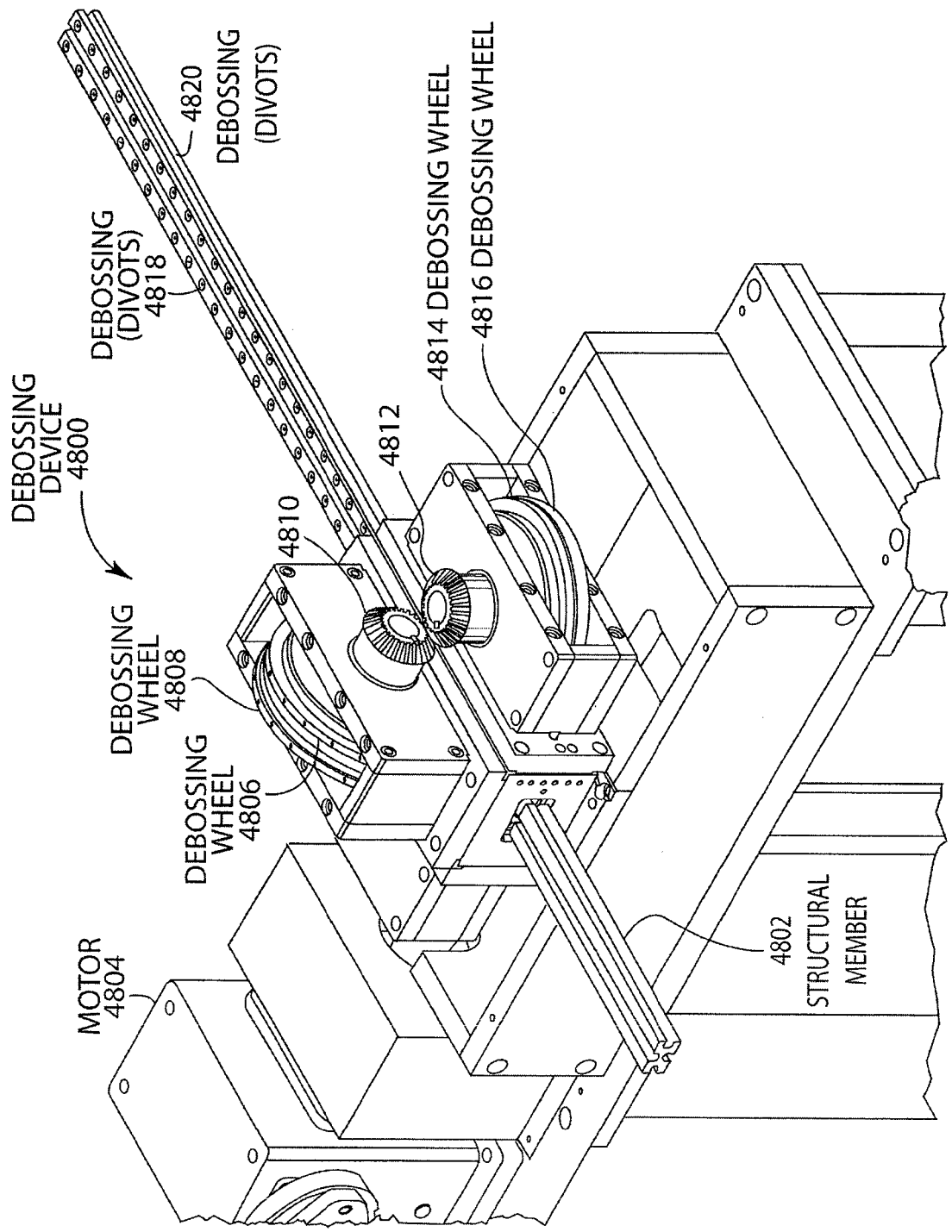
FIG. 48 is a schematic perspective view of a debossing device.
Figure 49:
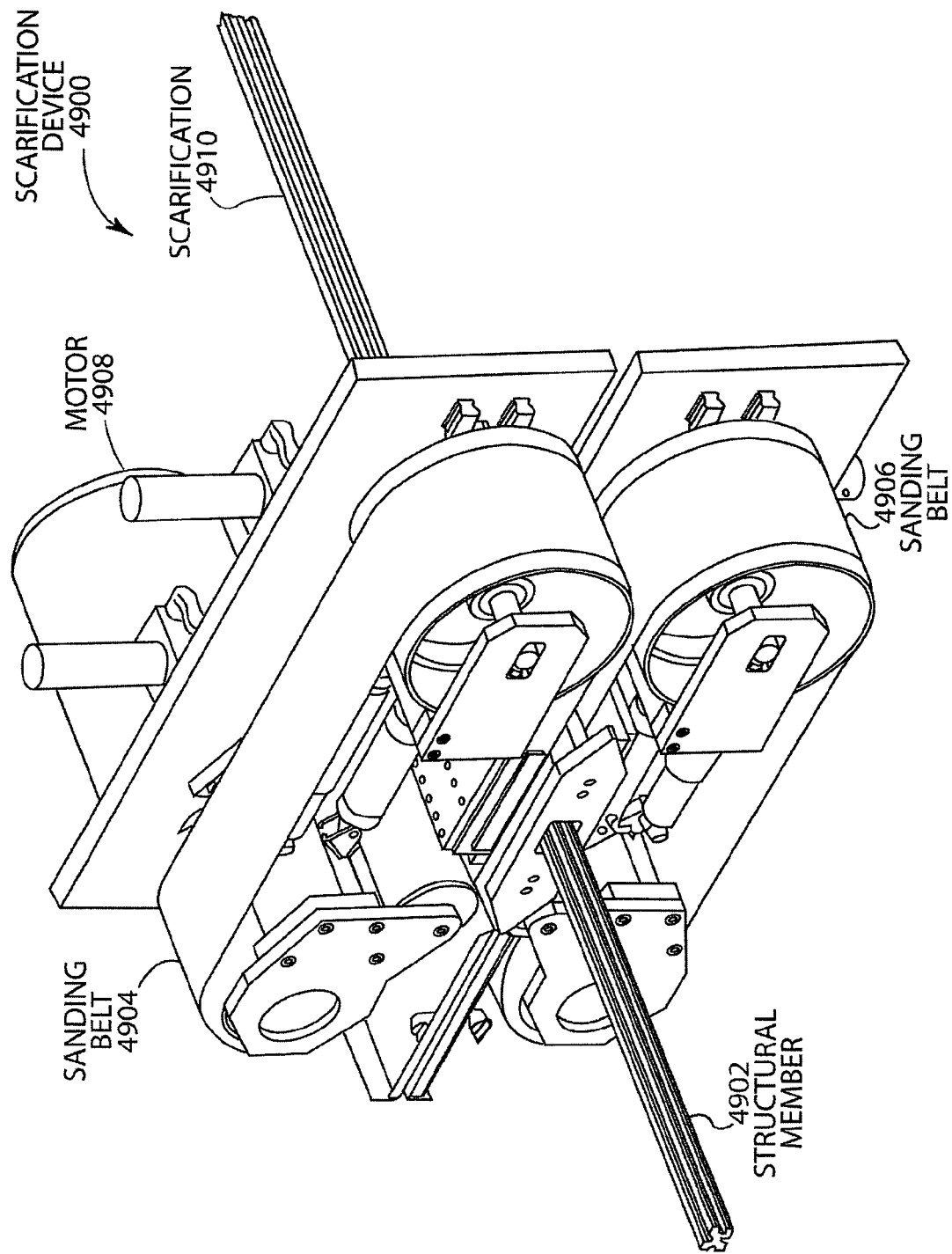
FIG. 49 is a schematic perspective view of a scarification device.

FIG. 30 is a side elevation view of the structural member 2900 that is illustrated in FIG. 29. FIG. 30 illustrates the holes that are formed in the reinforcing member 2902, such as holes 2916, 3002, as well as indentation 2918. Again, these holes assist in securing the thermoplastic outer layer 2904 to the reinforcing member 2902. The spacing of the holes also assists in distributing the stress of the thermoplastic outer layer 2904 over the surface of the structural member 2900 to prevent cracking. Although these holes are shown as being substantially circular in shape, these holes may take other shapes and can be made of different sizes. The holes can be formed using a stamping or contacting technique using stamping rollers or other stamping devices prior to formation of the structural shape illustrated in FIG. 29. For example, the reinforcing member 2902 may be provided in a roll sheet of an aluminum alloy material that is unrolled and sent through a stamping machine to form the openings illustrated in FIGS. 29 and 30. The stamped metal sheet can then be fed through a forming device to form the shape of the reinforcing member 2902 that is illustrated in FIG. 29. Alternatively, holes may be formed after the reinforcing member is formed using a hole punching device similar to the debossing devices illustrated in FIG. 48. In addition, the metal material that forms the reinforcing member 2902 can also be treated in other ways as disclosed below, such as scarification of the material, as shown in FIG. 49, and/or debossing of the metal, as illustrated in FIG. 48.

Figure 31:
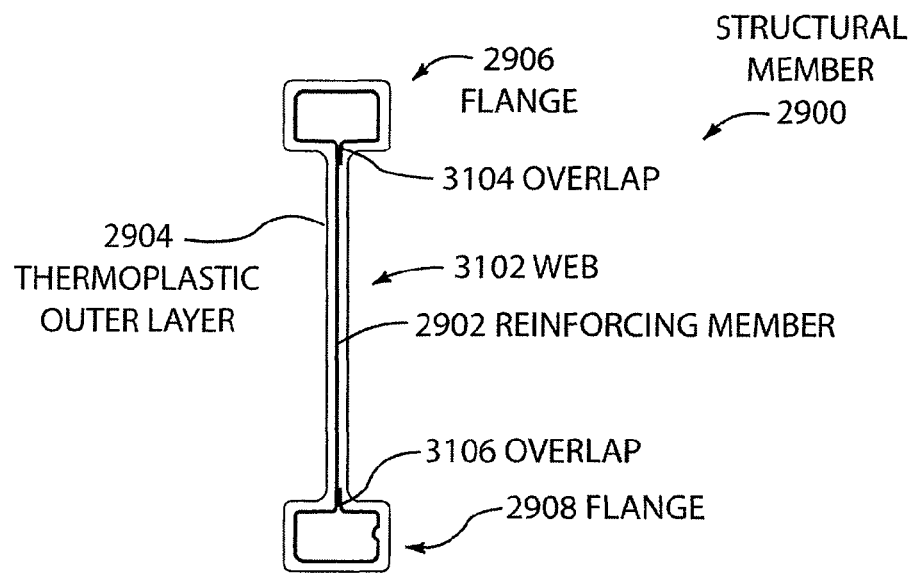

FIG. 31 is an end view of the structural member 2900 that is illustrated in FIGS. 29 and 30. As shown in FIG. 31, the reinforcing member 2902 is encapsulated by the thermoplastic outer layer 2904. As indicated above, the encapsulation of the reinforcing member 2902 by the thermoplastic layer 2904 in the holes, such as holes 2916, cause the thermoplastic outer layer 2904 to squeeze the reinforcing member 2902 as a result of shrinkage of the thermoplastic material during cooling which causes a waist banding effect. As a result, the thermoplastic layer is securely attached to the reinforcing member 2902. Flange 2906 and flange 2908 are connected by the web 3102. The reinforcing member 2902 is formed so that there is an overlapping portion 3104, 3106 in flanges 2906, 2908, respectively.

Figure 32:
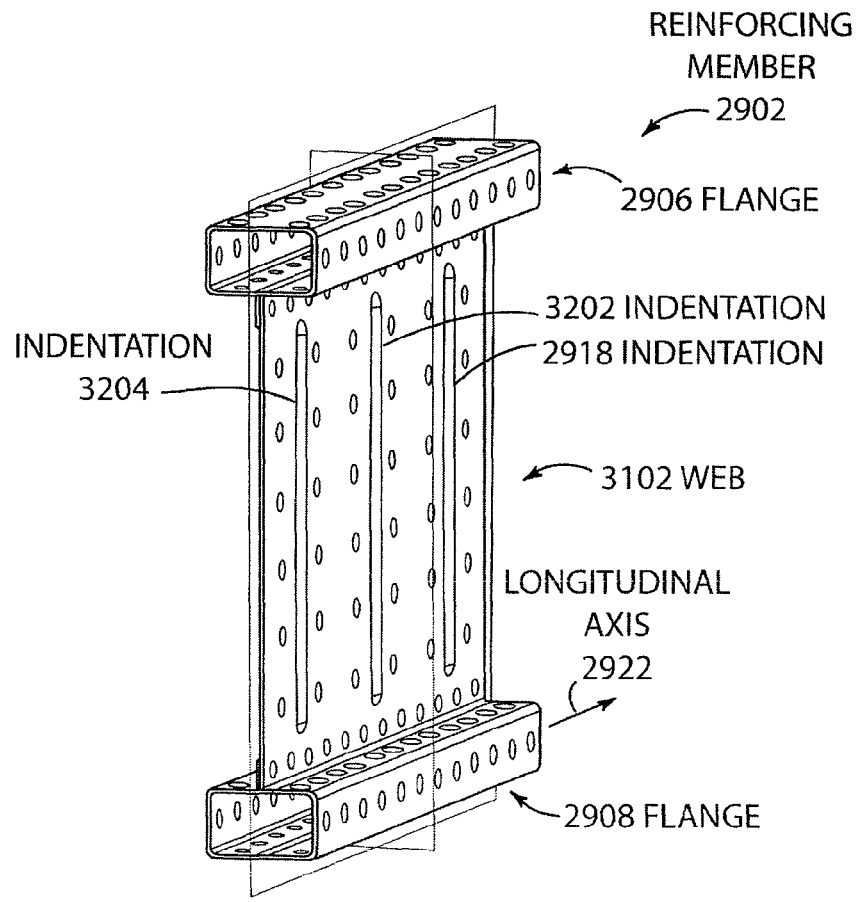

FIG. 32 is a perspective view of the embodiment of the reinforcing member 2902 that is illustrated in FIGS. 29-31. Again, the reinforcing member 2902 has two flanges 2906, 2908 that are connected by a web 3102. Both the flanges 2906, 2908, as well as the web 3102, have a plurality of holes that secure the thermoplastic layer to the reinforcing member 2902. The holes in the web 3102 allow the thermoplastic material on both sides of the web to communicate through the web 3102 and be securely held to the web as the thermoplastic material cools and shrinks. The thermoplastic material 2904 that is extruded over the flanges 2906, 2908 seeps into the openings 2910, 2912 (FIG. 29) through the holes in the flanges, such as holes 3002 (FIG. 30), so as to hook or secure the thermoplastic layer 2904 to the interior portions of the flanges 2906, 2908, that further secures the thermoplastic layer 2904 to the flanges 2906, 2908. FIG. 32 also illustrates indentations 2918, 3202 and 3204 that are formed transverse to the longitudinal axis 2922 of the reinforcing member 2902.

Figure 33:
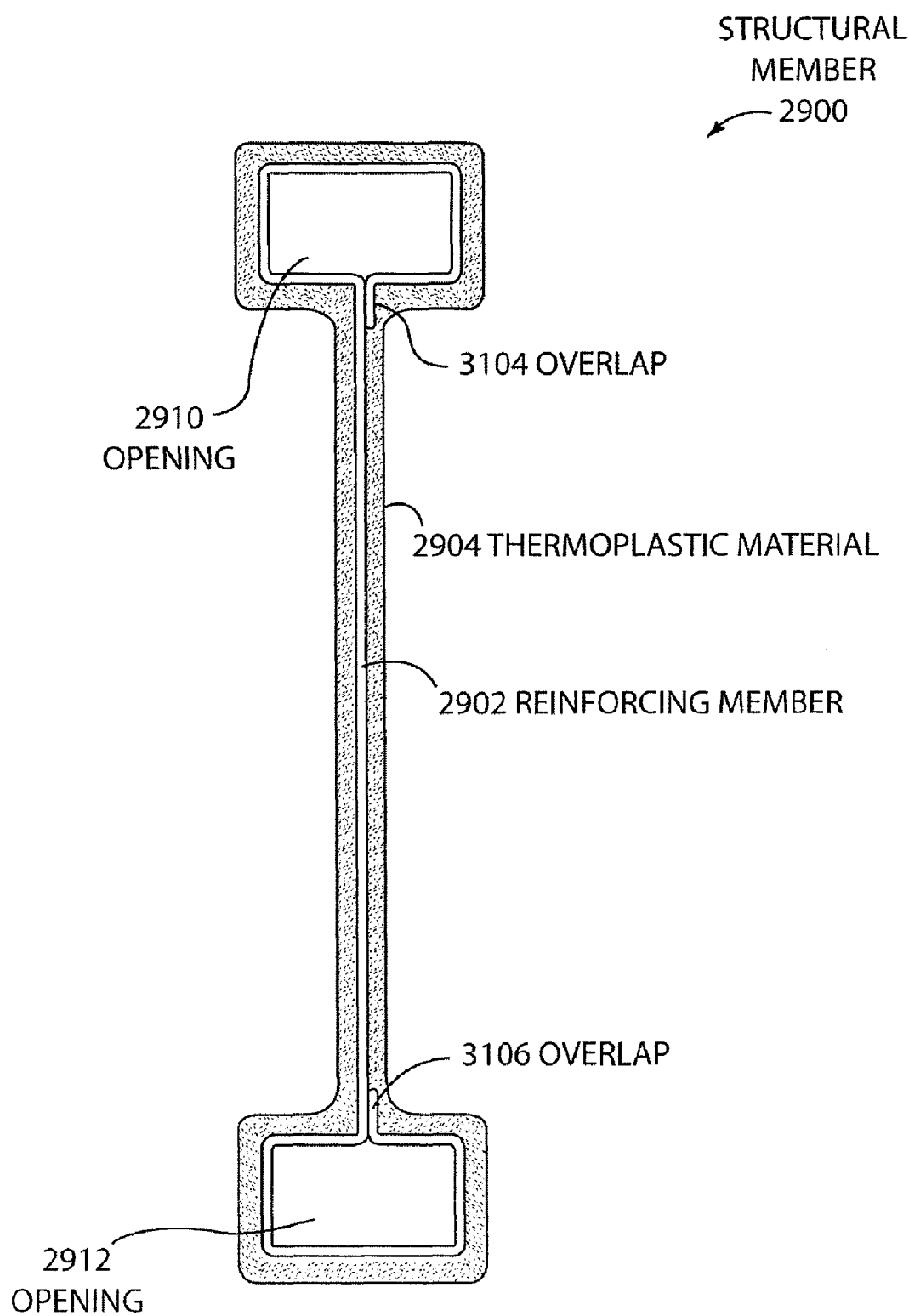

FIG. 33 is an end view of the structural member 2900. As shown in FIG. 33, openings 2910, 2912 can either be empty or filled with a material, such as foam or other reinforcing material. Overlaps 3104, 3106 are encapsulated within the thermoplastic material 2904 and help to secure the overlapped areas of the reinforcing member 2902.

Figure 34:
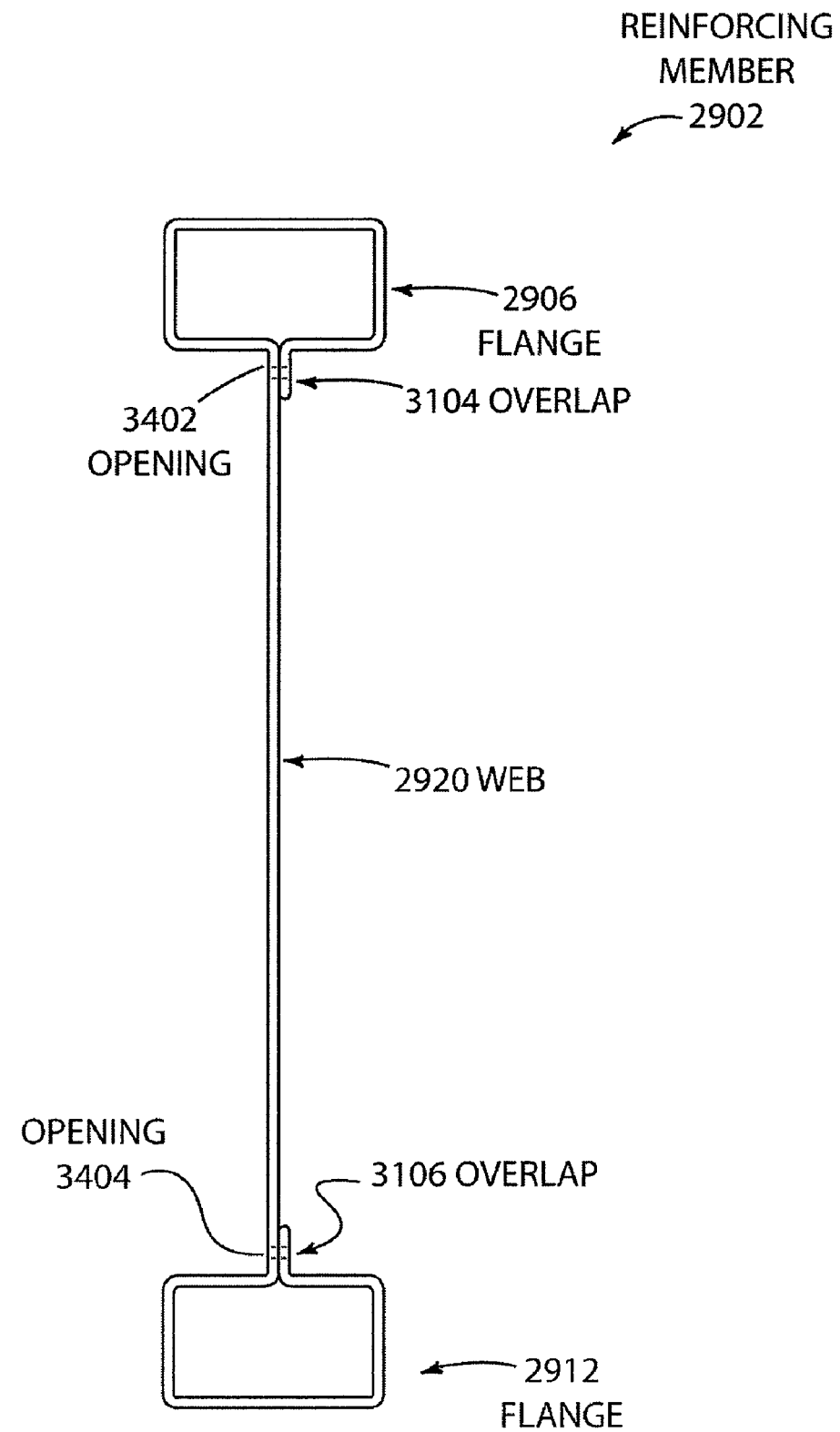

FIG. 34 is an end view of the reinforcing member 2902. As shown in FIG. 34, the overlapped area 3104 is placed at the transition between the flange 2906 and the web 2920. Similarly, the overlap area 3106 is placed at the transition between the flange 2912 and the web 2920. Placing the overlaps 3104, 3106 in these locations provides additional strength to the reinforcing member 2902. Further, openings can be placed through the overlap areas. For example, overlap area 3104 may have an opening 3402. The opening 3402 allows the thermoplastic layer 2904 to communicate through the opening 3402 and help to secure the overlap 3104 to the web 2920 and further strengthen the flange 2906. Similarly, opening 3404 may be placed in overlap 3106 to strengthen flange 2912. A series of openings, such as openings 3402, 3404, may be placed along the length of the reinforcing member 2902 in the overlap areas.

The reinforcing member 2902, illustrated in FIG. 34, may comprise an aluminum alloy that has a weight of between approximately 0.75 and 1.25 pounds per foot of longitudinal length. Other embodiments use an aluminum allow having a weight of approximately 0.90 to 1.15 pounds per foot, or 0.94 to 1.1 pounds per foot. The reinforcing member 2902 may have a cross-sectional area of between 1.3 and 1.5 square inches. These values are considered to be examples only and various sizes and weights of the reinforcing member can be employed as desired. Various weights, sizes and lengths can be used as a substitute for dimensional lumber as shown in FIG. 1.

Figure 35:
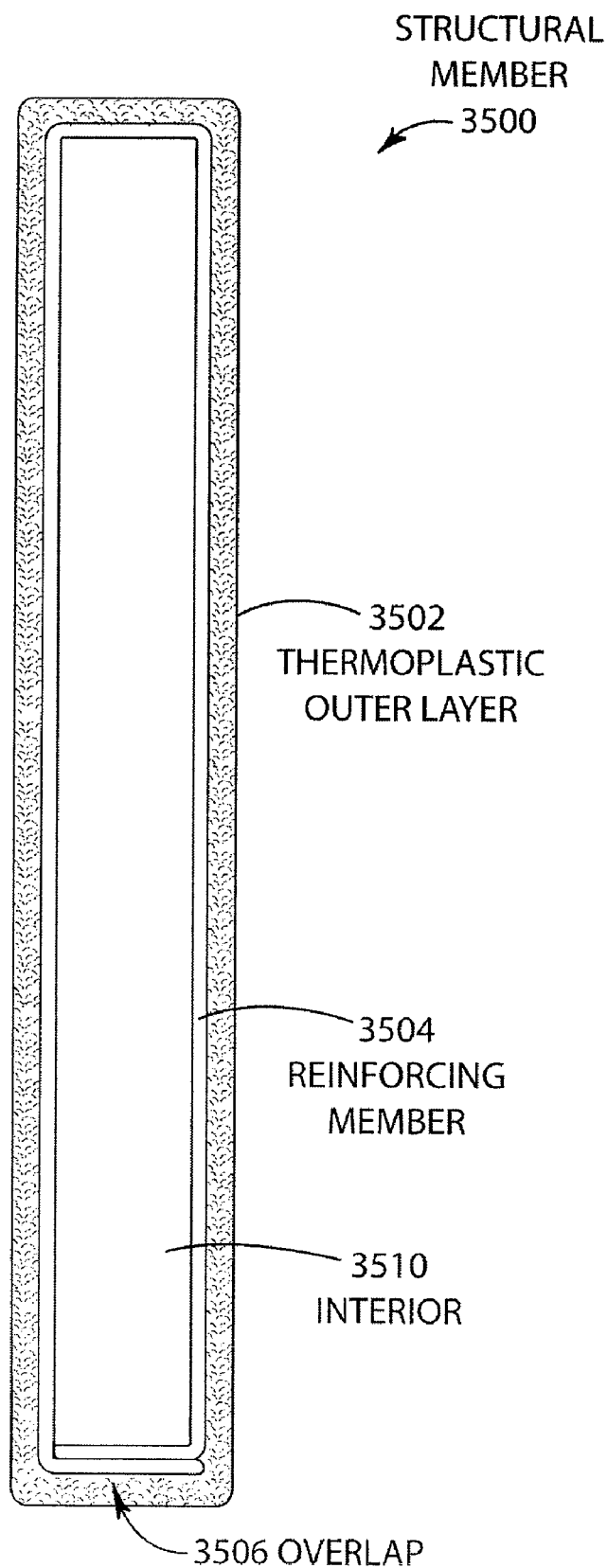

FIG. 35 illustrates another embodiment of a structural member 3500. As shown in FIG. 35, a reinforcing member 3504 is formed in a rectangular shape and has an overlapping area 3506. A thermoplastic outer layer 3502 is extruded over the reinforcing member 3504 in the manner described above. As the thermoplastic outer layer 3502 cools, it shrinks and causes a waist banding effect that squeezes the thermoplastic outer layer 3502 around the reinforcing member 3504. The structural member 3500 can be used in place of various sizes of dimensional lumber. For example, structural member 3500 can be used in place of 2 inch×10 inch dimensional lumber. In that instance, the thermoplastic outer layer 3502 may have a thickness of between 0.12 to 0.25 inches. Other ranges of thicknesses include 0.125 to 0.20 inches or approximately 0.1875 inches, which is 3/16 of an inch. In one embodiment, the reinforcing member 3504 may comprise an aluminum alloying having a thickness of between approximately 0.05 to 0.2 inches. Other embodiments include thicknesses of approximately 0.075 to 0.15 or 0.1 inches. The interior portion 3510 that is inside of the reinforcing member 3504 may be empty, partially filled or filled with foam or other reinforcing structural material to assist in increasing the rigidity of the structural member 3500.

Figure 36:
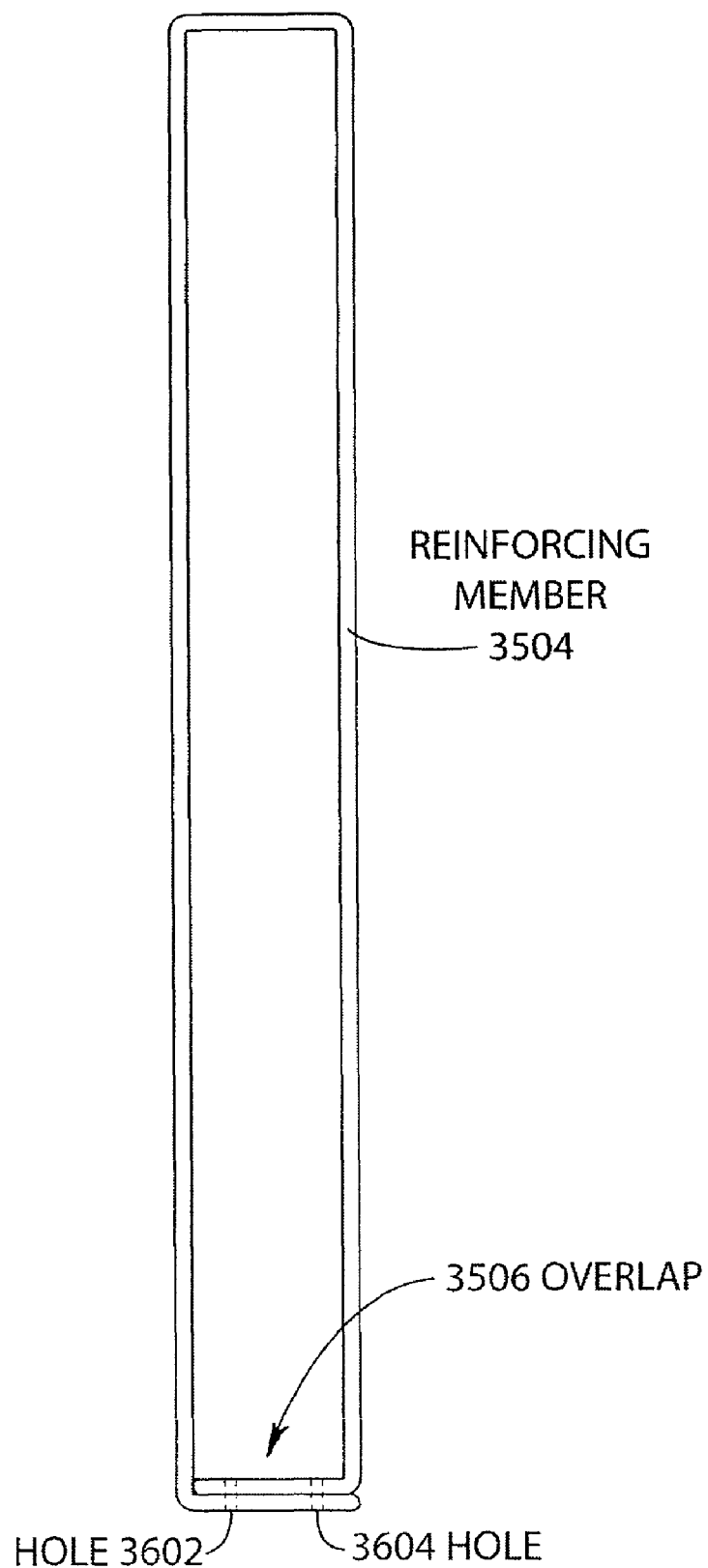

FIG. 36 is a schematic end view of the reinforcing member 3504 that is illustrated in FIG. 35. As shown in FIG. 36, the overlap area 3506 is along one of the short ends of the reinforcing member 3504. Of course, the overlapping area can be formed on any edge of the reinforcing member 3504, although overlapping of a short end of the reinforcing member 3504 provides the greatest strength and reduces the material cost. As also shown in FIG. 36, holes 3602, 3604 can be formed in the reinforcing member 3504 in the overlap area 3506 that assists in holding the reinforcing member 3504 together and securely attaching the thermoplastic layer 3502 (FIG. 35) to the reinforcing member 3504.

Figure 37:
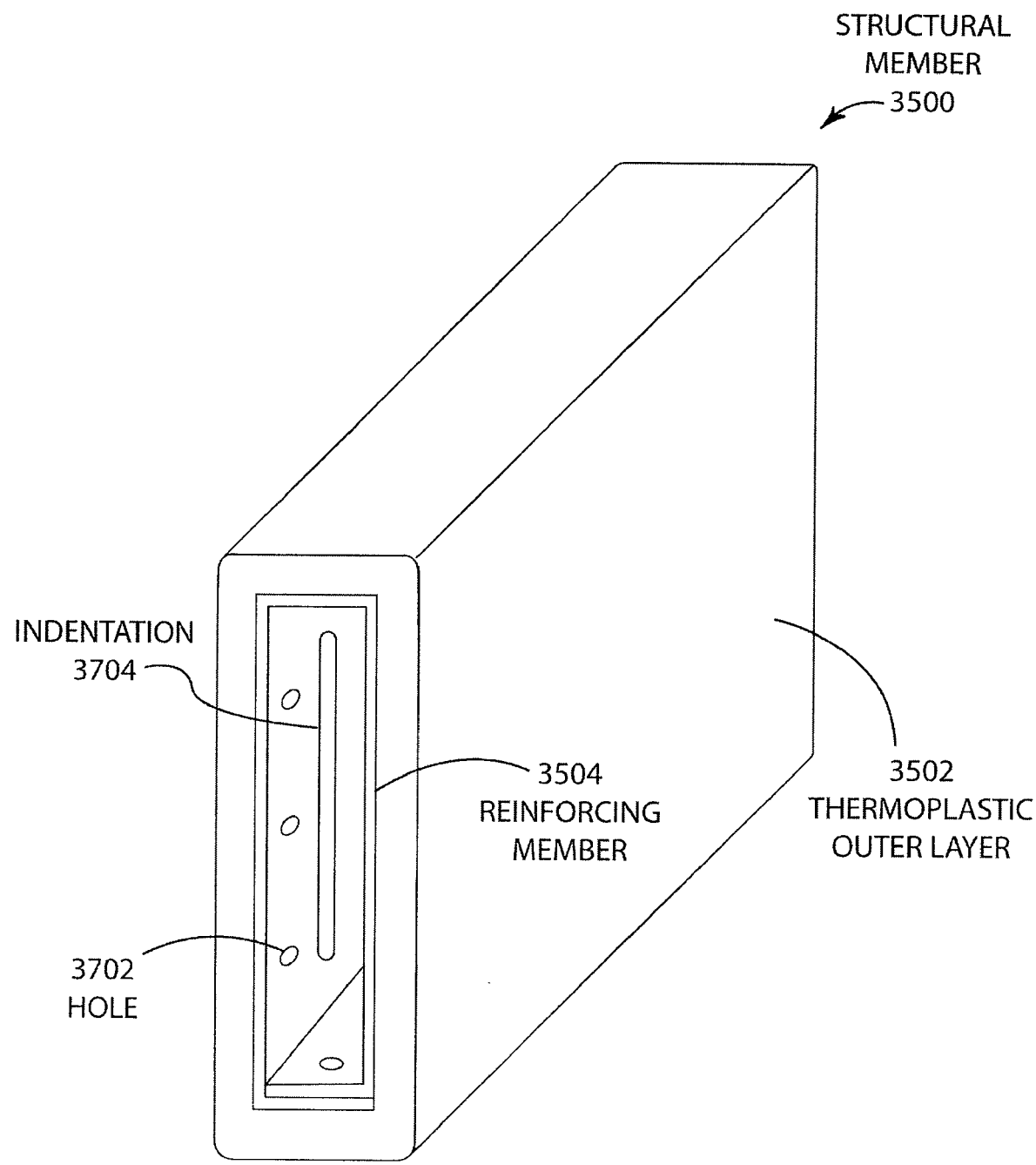

FIG. 37 is a schematic perspective view of the structural member 3500 that is illustrated in FIGS. 35 and 36. As shown in FIG. 37, a structural member has a thermoplastic outer layer 3502 that covers the reinforcing member 3504. Reinforcing member 3504 has a plurality of holes, such as hole 3702 that assists in holding the thermoplastic outer layer 3502 to the reinforcing member 3504. In addition, an indentation 3704 is formed in the reinforcing member 3504 to further assist in holding the thermoplastic outer layer 3502 to the reinforcing member 3504.

Figure 38:
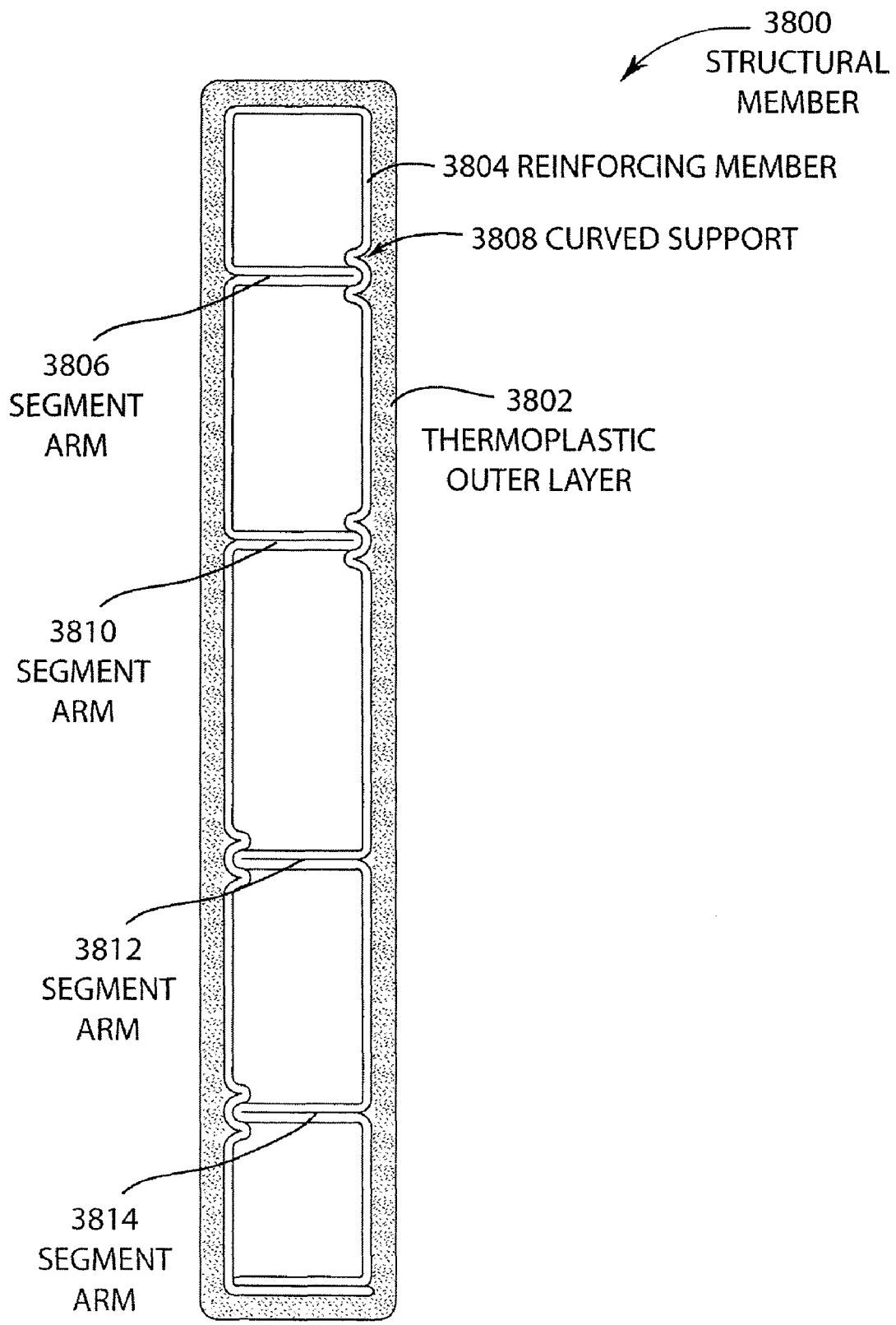

FIG. 38 is a schematic end view of another embodiment of structural member 3800. As shown in FIG. 38, a thermoplastic outer layer 3502 surrounds a reinforcing member 3804. The reinforcing member 3804 is divided into a series of segments by segment arms, such as segment arms 3806, 3810, 3812, 3814. Each of the segment arms is held in place by a curved support. For example, segment arm 3806 is held in a curved support 3808 that is formed into the reinforcing member 3804. In this manner, the segment arms 3806-3814 are secured in the structural member 3800. The waist banding effect that is caused when the thermoplastic outer layer 3802 cools and shrinks which forces the segment arms into the curved supports.

Figure 39:
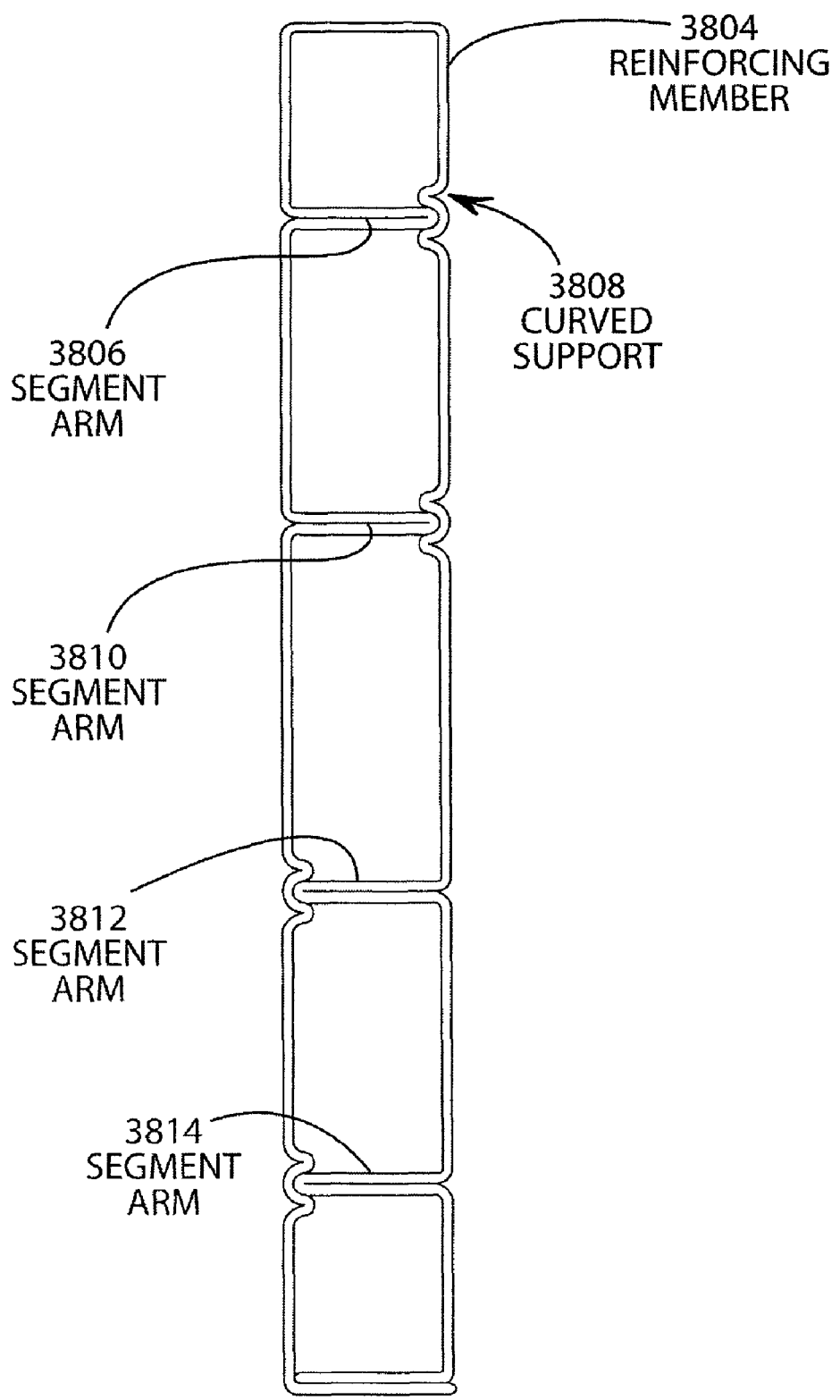

FIG. 39 is a schematic end view of the reinforcing member 3804 illustrated in FIG. 38. As shown in FIG. 39, the segment arm 3806 is placed in the curved support 3808 and is held in a secure position by the reinforcing member 3804. The segment arms 3806-3814 provide additional support to the reinforcing member 3804.

Figure 40:
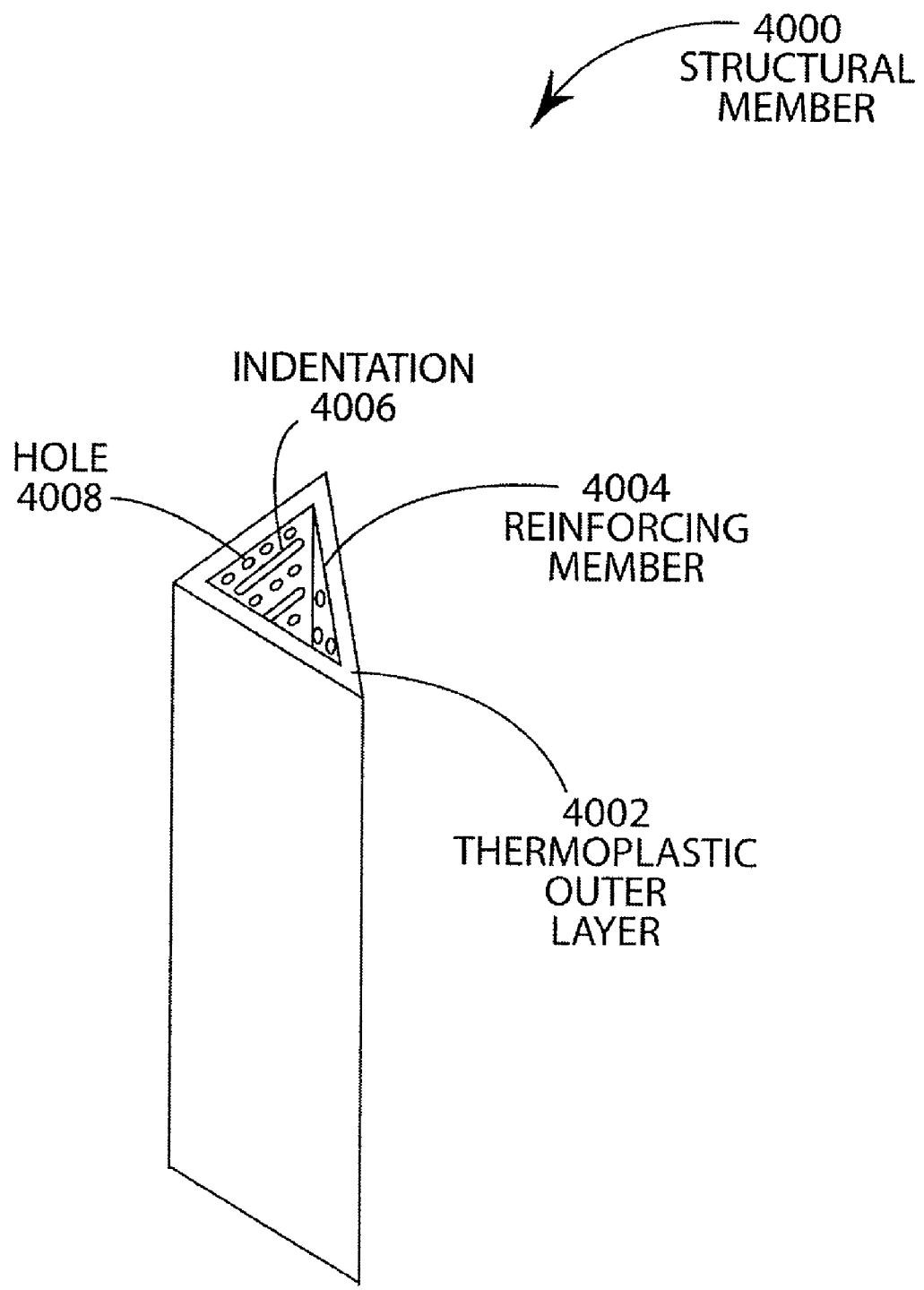

FIG. 40 is a schematic isometric view of another embodiment of a structural member 4000. As shown in FIG. 40, the thermoplastic outer layer 4002 surrounds the reinforcing member 4004. Indentations, such as indentation 4006, are formed in the reinforcing member 4004 to hold the thermoplastic outer layer 4002 to the reinforcing member 4004. In addition, a plurality of holes are also formed in the reinforcing member 4004, such as hole 4008, which also assists in holding the thermoplastic outer layer 4002 to the reinforcing member 4004.

Figure 41:
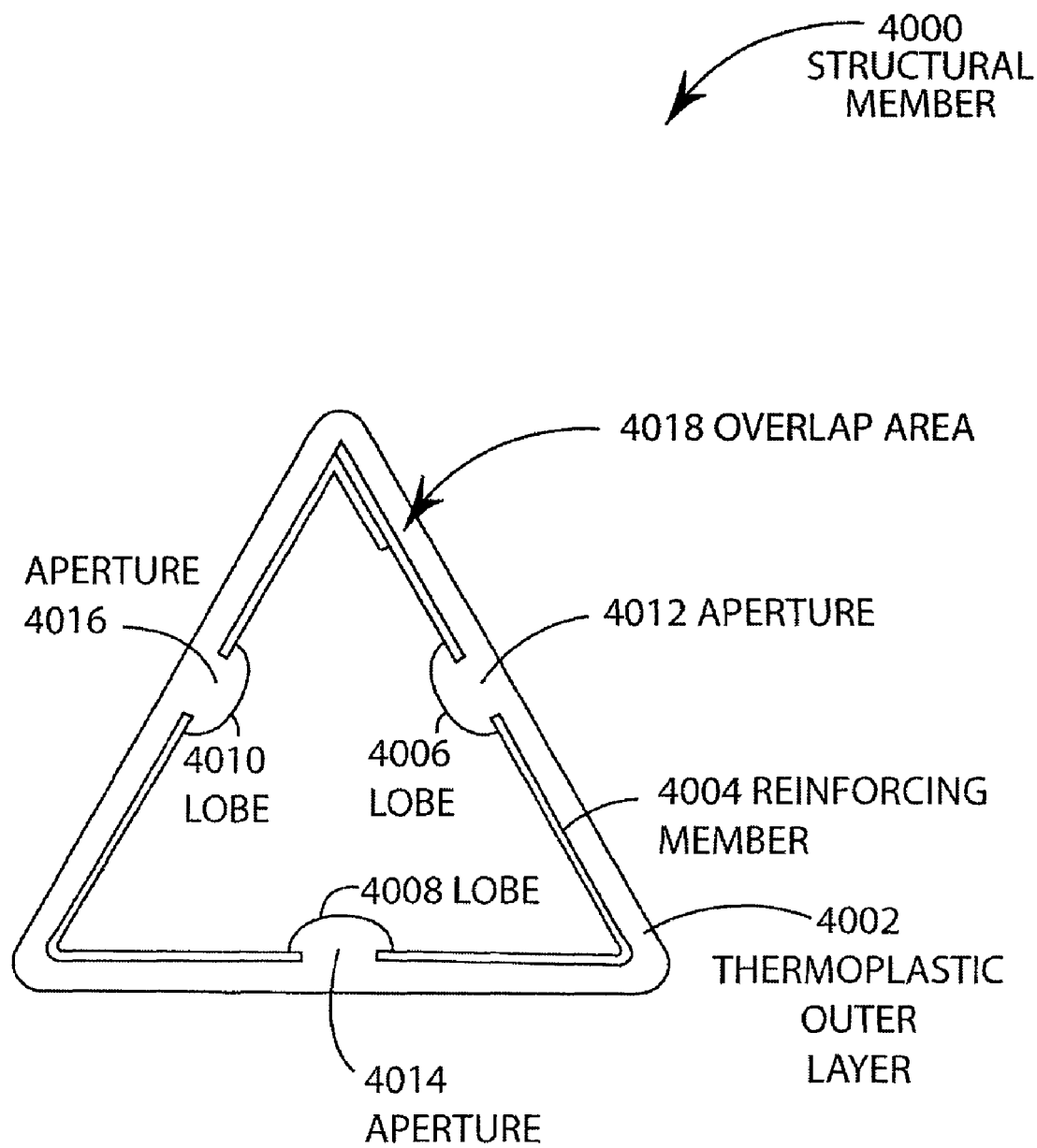

FIG. 41 is a schematic end view of the structural member 4000 that is illustrated in FIG. 40. As shown in FIG. 41, the thermoplastic outer layer 4002 is extruded over the reinforcing member 4004. Since the thermoplastic outer layer 4002 is hot and somewhat fluid during the extrusion process, the thermoplastic outer layer 4002 seeps in the apertures 4012, 4014, 4016 to create lobes or buttons 4006, 4008, 4010, respectively. The lobes 4006-4010 hold the thermoplastic outer layer 4002 securely to the reinforcing member 4004. In addition, the waist banding effect, that occurs as the thermoplastic outer layer 4002 cools, also holds the thermoplastic outer layer 4002 to the reinforcing member 4004. The reinforcing member 4004 has an overlap area 4018 that is adjacent to one of the corners of the triangular shape of the structural member 4000. As disclosed above, the overlap area 4018 may also have an aperture or opening that assists in holding the reinforcing member 4004 together in the overlap area 4012.

Figure 42:
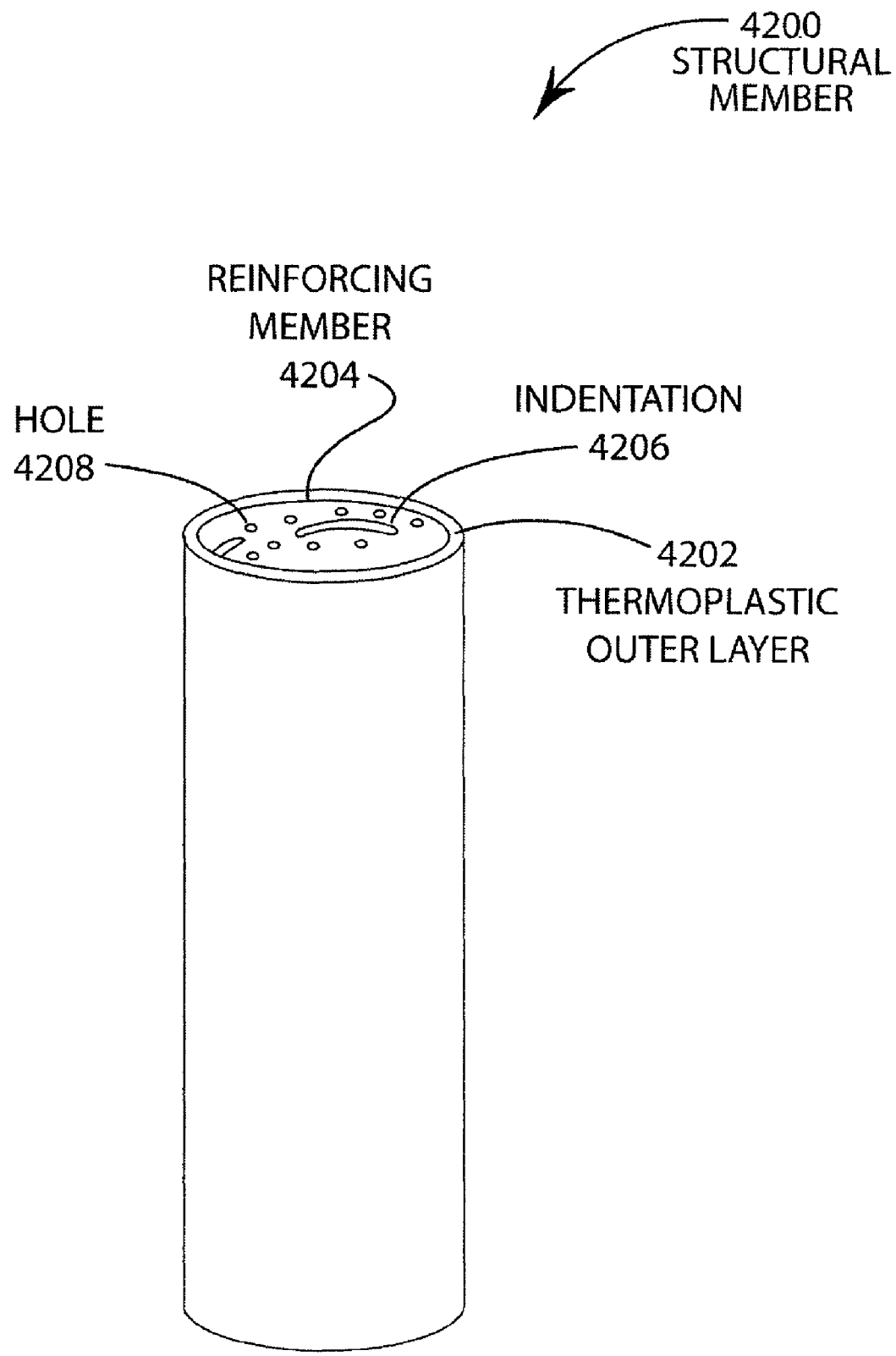

FIG. 42 is a schematic perspective view of another embodiment of a structural member 4200. As shown in FIG. 42, the structural member 4200 has a cylindrical shape and can be used as a round post. Thermoplastic outer layer 4202 is extruded onto the outer surface of reinforcing member 4204. Indentations, such as indentation 4206, and holes, such as hole 4208, assist in holding the thermoplastic outer layer 4202 to the reinforcing member 4204. Again, as the thermoplastic outer layer 4202 cools, it shrinks and creates a waist banding effect around the reinforcing member 4204.

Figure 43:
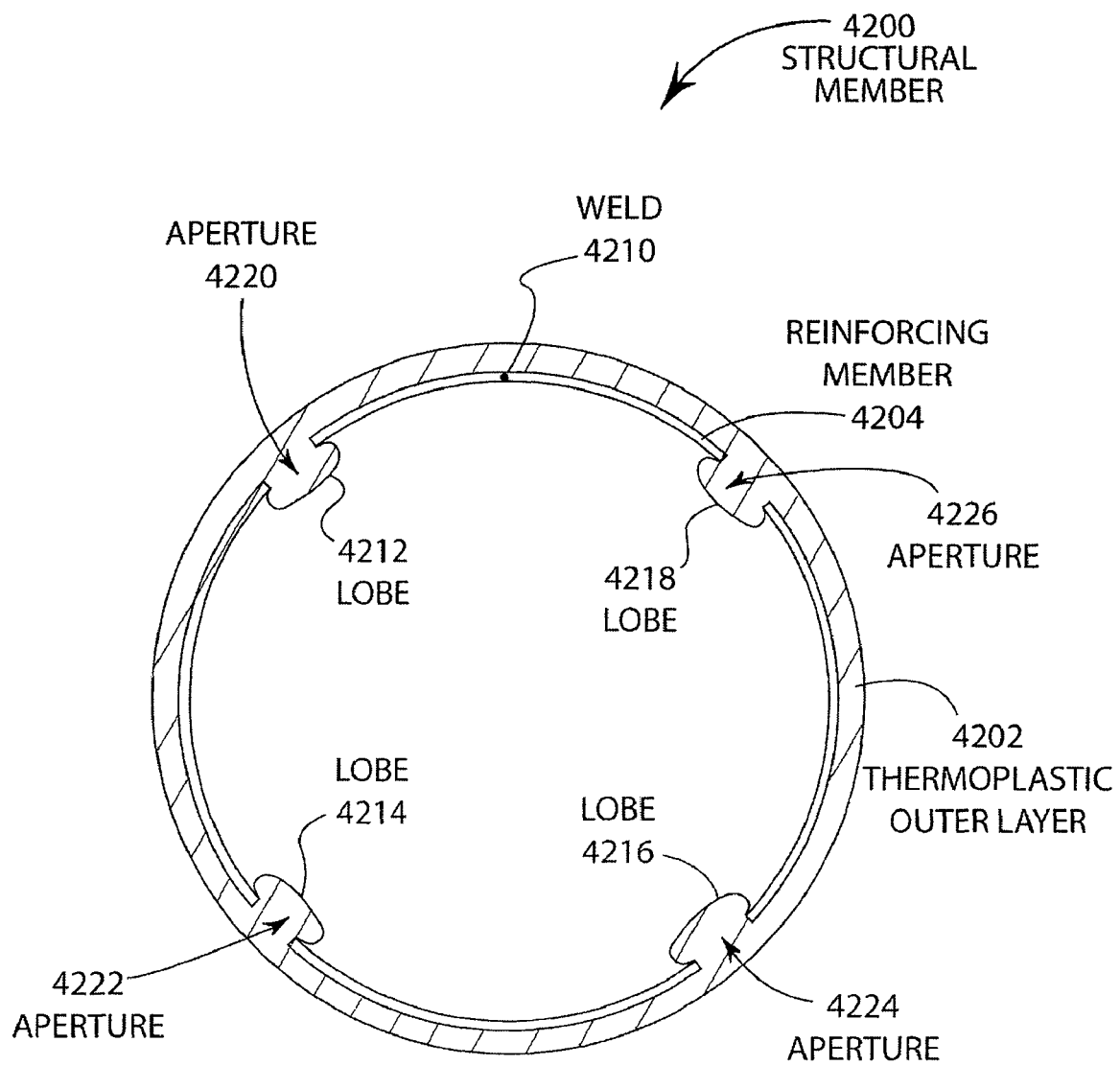

FIG. 43 is a cut-away view of the structural member 4200 illustrated in FIG. 42. As shown in FIG. 43, the thermoplastic outer layer 4202 is co-extruded around the reinforcing member 4204 in a hot, semi-liquid state which causes the thermoplastic material to seep within the apertures 4220, 4222, 4224, 4226 to form buttons 4212, 4214, 4216, 4218, respectively. The lobes 4212-4218 function to hold the thermoplastic outer layer 4202 to the reinforcing member 4204 in a secure manner. In addition, as the thermoplastic outer layer 4202 cools, it shrinks and causes a waist banding effect around the reinforcing member 4204. Reinforcing member 4204 is joined together by a weld 4210 rather than being overlapped as shown in other embodiments.

Figure 44:
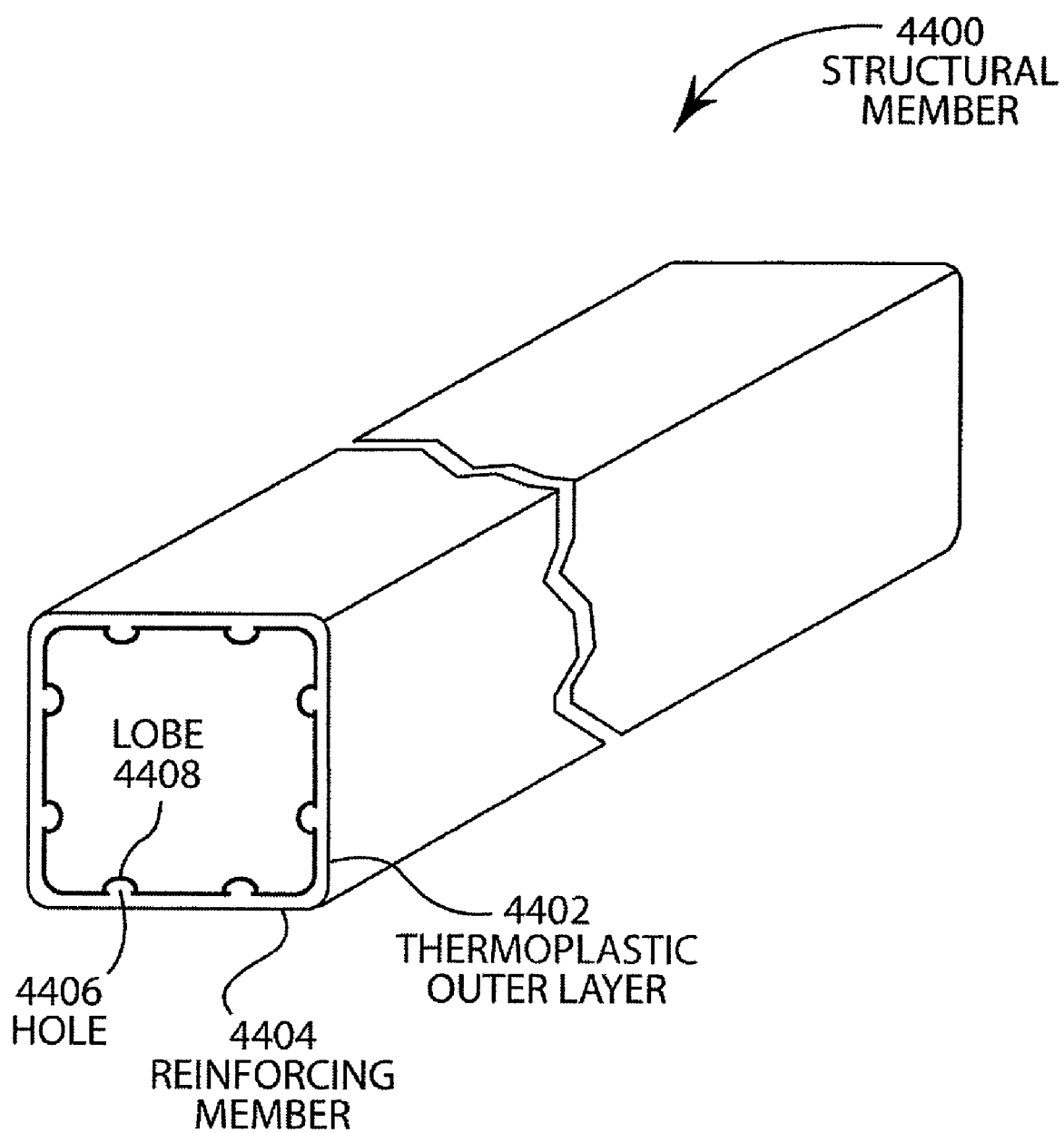

FIG. 44 is a schematic perspective view of another embodiment of a structural member 4400 that has a substantially square cross section. As shown in FIG. 44, the thermoplastic outer layer 4402 is extruded around the reinforcing member 4404. The thermoplastic outer layer 4402 is a hot, semi-liquid state and forms a plurality of lobes, such as lobe 4408, when it seeps through the holes, such as hole 4406. The lobes assist in holding the thermoplastic outer layer 4402 to the reinforcing member 4404. In addition, when the thermoplastic outer layer 4402 cools, it shrinks and causes a waist banding effect that causes the thermoplastic outer layer 4402 to squeeze the reinforcing member 4404 and hold the thermoplastic outer layer 4402 to the reinforcing member 4404.

Figure 45:
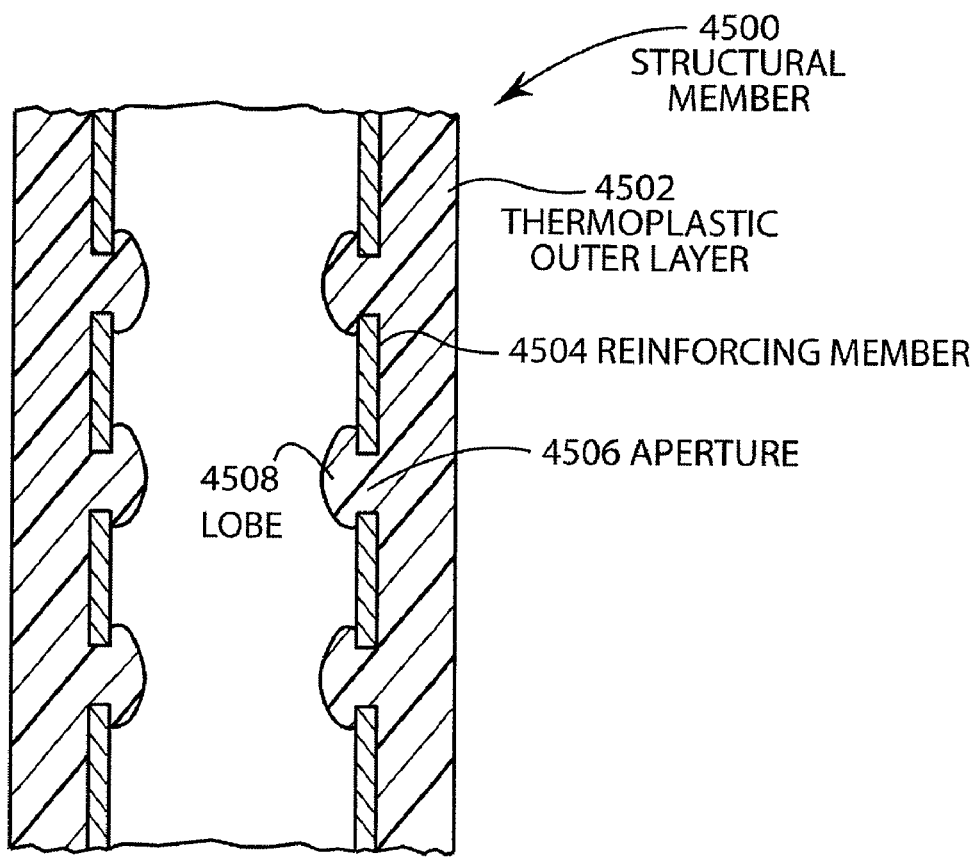

FIG. 45 is a schematic cross-sectional view of another embodiment of a structural member 4500. As shown in FIG. 45, a thermoplastic outer layer 4502 surrounds a reinforcing member 4504. Reinforcing member 4504 has a plurality of apertures, such as aperture 4506. When the thermoplastic outer layer 4502 is extruded over the reinforcing member 4504, it is in a hot, semi-liquid state so as to cause the thermoplastic material to flow through the apertures, such as aperture 4506, and form lobes, such as lobe 4508, on the interior portion of the reinforcing member 4504. The lobes, such as lobe 4508, help to anchor or secure the thermoplastic outer layer 4502 to the reinforcing member 4504.

Figure 46:
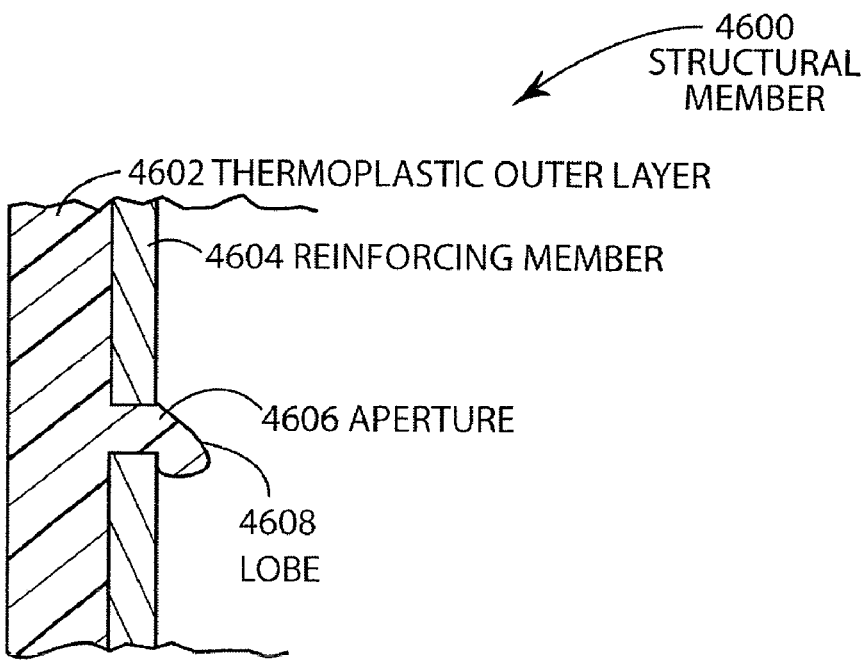

FIG. 46 is a partial schematic cross-sectional view of a structural member 4600. As shown in FIG. 46, a thermoplastic outer layer 4602 is extruded in a hot state over the reinforcing member 4604 and flows through aperture 4606 to form lobe 4608. Lobe 4608 is affected by gravity and secures to the bottom portion of the aperture 4606. Lobe 4608 helps to anchor the thermoplastic outer layer 4602 to the reinforcing member 4604.

Figure 47:
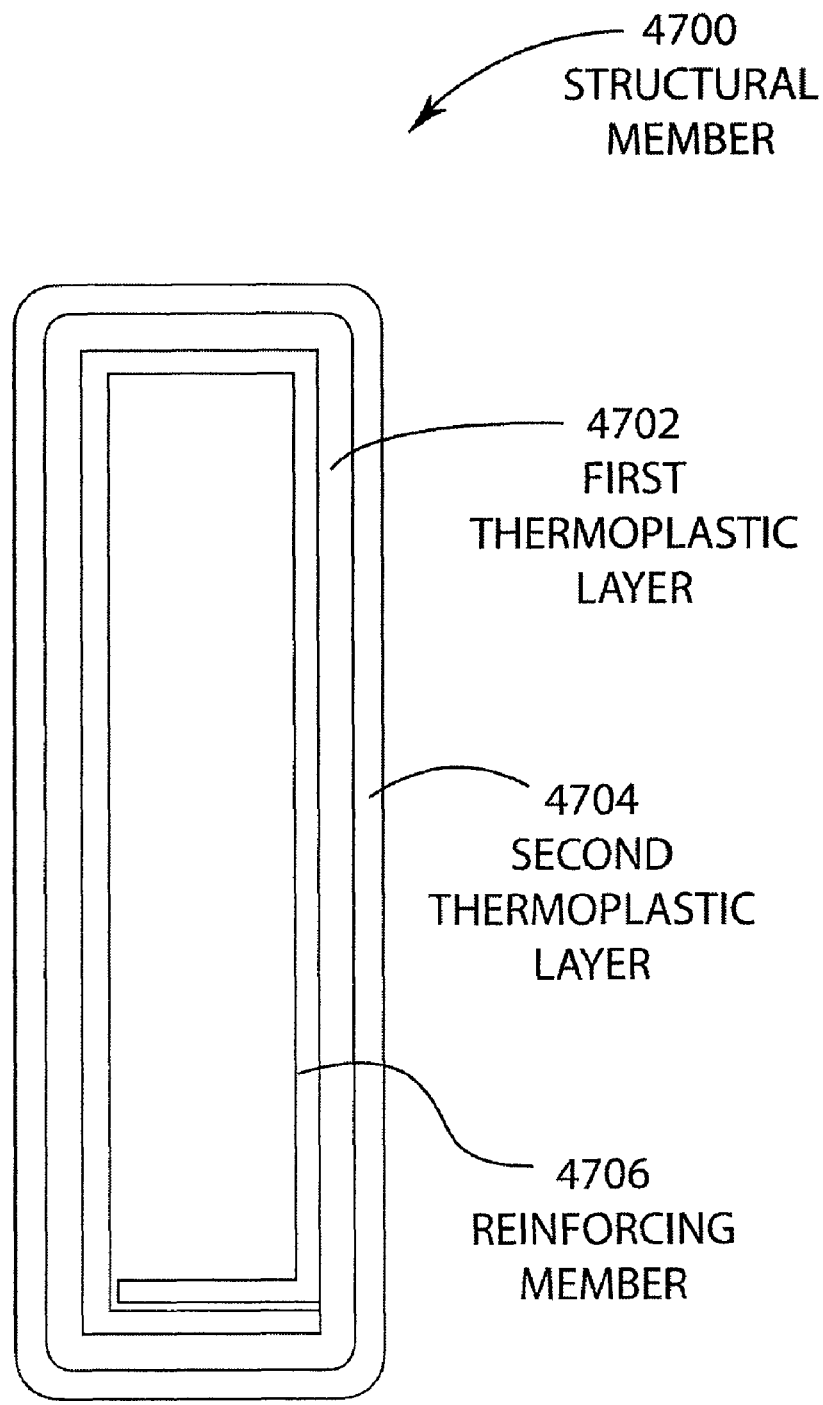

FIG. 47 is a schematic end view of a structural member 4700. As shown in FIG. 47, a first thermoplastic layer 4702 is extruded over the reinforcing member 4706. Subsequently, a second thermoplastic layer 4704 is extruded over the first thermoplastic layer 4702. The first thermoplastic layer 4702 may have different properties than the second thermoplastic layer 4704. For example, first thermoplastic layer 4702 may have properties that allow thermoplastic layer 4702 to adhere to the reinforcing member 4706. Second thermoplastic layer 4704 may include color or other properties that are desirable for an outer covering. For example, second thermoplastic layer 4704 may comprise PVC which can have a bright white color that is not achievable in many thermoplastics. Of course, other materials can be used that have other colors and surface textures. Layers 4702, 4704 can be extruded using a two-stage crosshead die, such as two-stage crosshead die 2800, illustrated in FIG. 28.

FIG. 48 is a schematic perspective view of a debossing device 4800. As shown in FIG. 48, a structural member 4802 is fed into the input of the debossing device 4800. The debossing device 4800 has a series of debossing wheels 4806, 4808, 4814, 4816 that create debossing (divots) 4818, 4820 on the structural member 4802. Other debossing wheels may be located to deboss other sides of the structural member 4802. Motor 4804 drives the debossing wheels which are coupled together by gears 4810, 4812. The debossing process creates divots 4818, 4820 in the structural member 4802 that do not penetrate the walls of the structural member 4802. The debossing provides surface structure which allows the thermoplastic material to more securely attach to the surface of the structural member 4802. The size and spacing of the debossing assist in distributing stress of the thermoplastic layer over the surface of the structural member 4802 to prevent cracking of the thermoplastic material. Alternatively, the debossing wheels 4806, 4808, 4814, 4816 can be replaced with wheels that form holes in the structural member 4802.

FIG. 49 is a schematic perspective view of a scarification device 4900. As shown in FIG. 49, the scarification device 4900 includes sanding devices having sanding belts 4904, 4906. The sanding belts 4904, 4906 engage two opposing sides of the structural member 4902 to sand two surfaces of the structural member 4902. Other surfaces can also be sanded with additional belts. The sanding belts 4904, 4906 create scarifications 4910 on the surface of the structural member 4902 that assist in attaching the thermoplastic material to the surface of the structural member 4902. Of course, both the process of scarification illustrated in FIG. 49 as well as the process of debossing as illustrated in FIG. 48 can be used to increase the adhesion of the thermoplastic material to the surface of the structural members.

Figure 50:
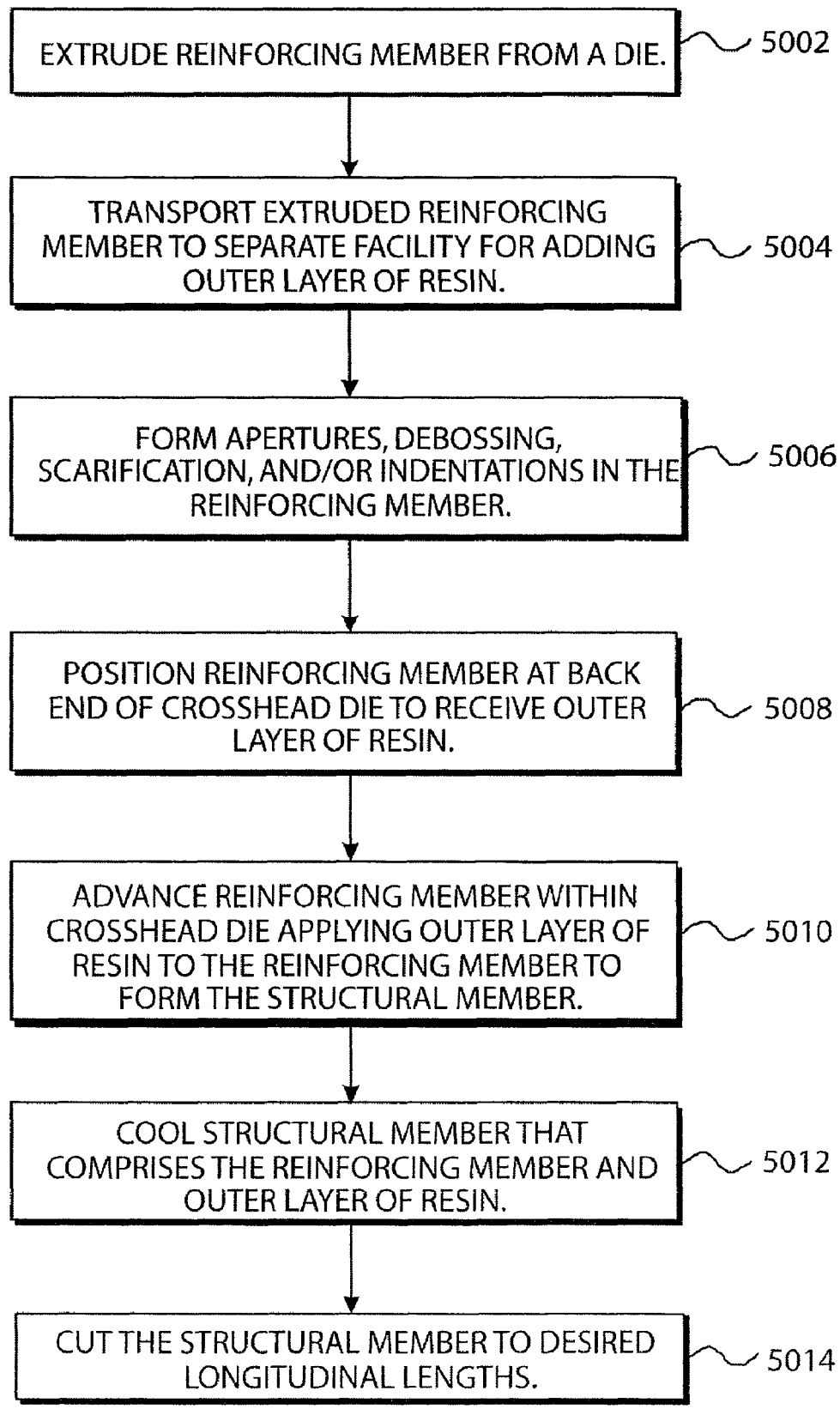
FIG. 50 is a flow diagram of one embodiment of a process for forming a structural member.

FIG. 50 is a flow diagram of one embodiment of a process for forming a structural member. As shown in FIG. 50, at step 5002 a reinforcing member is extruded from a die. In that regard, the reinforcing member is shaped in the desired shape using an extrusion process. At step 5004, the extruded reinforcing member is transported to a separate facility for adding an outer layer of resin. At step 5006, apertures, debossing, scarification and/or indentations are formed in the reinforcing member. This is more fully disclosed in FIGS. 48 and 49. At step 5008, the reinforcing member is positioned at the backend of a crosshead die for extrusion of an outer layer of resin, as more fully disclosed with respect to the description of FIG. 28. In several of the embodiments disclosed herein, a two-stage crosshead die configuration is used, so that two layers of thermoplastic material are extruded onto a reinforcing member. In several of the other embodiments, only a single layer of thermoplastic material is required. In these embodiments, only a single stage crosshead die extruder is required that is similar to that shown in FIG. 28, except that it has only a single stage. At step 5010, the reinforcing member is advanced through the crosshead die so that the thermoplastic layer is extruded over the reinforcing member to form the structural member. At step 5012, the structural member is cooled as illustrated in FIG. 28 by cooling tank 2820. At step 5014, the structural member is cut to the desired longitudinal lengths, as illustrated in FIG. 28, by cutter 2826.

Figure 51:
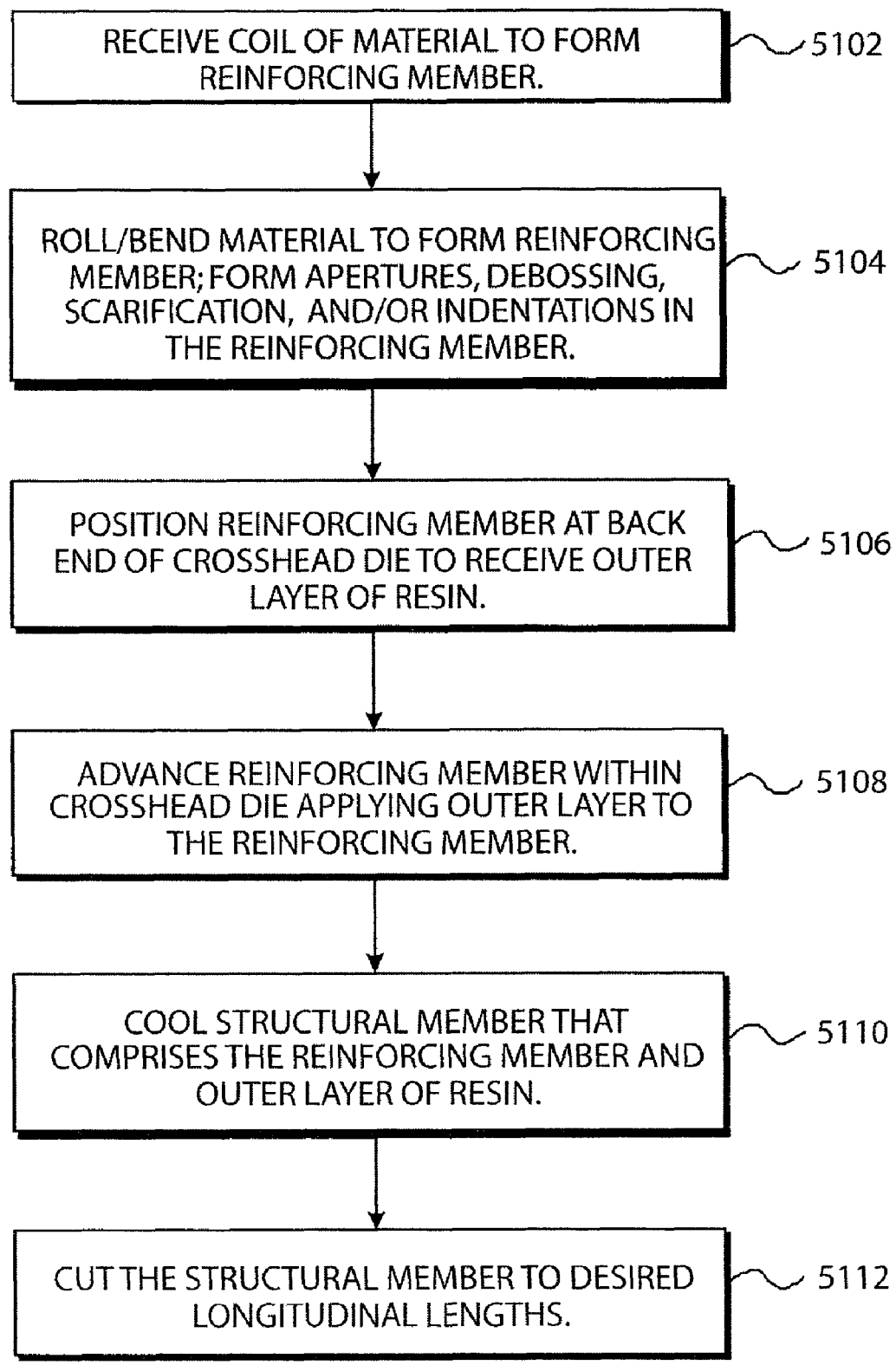
FIG. 51 is a schematic block diagram of another embodiment of a process for forming a structural member.

FIG. 51 is a schematic block diagram of an alternative process for forming a structural member. At step 5102, a roll of material, such as a roll of aluminum alloy metal, is received to form a reinforcing member. At step 5104, the roll material is bent to form the shape of the reinforcing member. The reinforcing member formation device 2822 bends the metal to form the shape of the reinforcing member. Apertures, debossing, scarification and/or indentations can be formed in the metal either before or after the sheet roll has been bent into the shape of the reinforcing member. Metal working device 2826, illustrated in FIG. 28, can perform the processes of forming apertures, debossing, scarification and/or indentations. At step 5106, the reinforcing member is positioned at the back of the die, as illustrated in FIG. 28, to receive the outer layer of resin using the extrusion process disclosed with respect to FIG. 28. At step 5108, the reinforcing member is advanced through the crosshead die plates, as disclosed in FIG. 28, and the outer thermoplastic layer is applied to the reinforcing member. At step 5110, the structural member 2818 is cooled in cooling tank 2820, as also illustrated in FIG. 28. At step 5112, the structural member is cut to the desired longitudinal lengths using a cutter 2826, as disclosed in FIG. 28.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A frame structure comprising:
   a reinforcing member having an outer surface and at least a portion having a substantially hollow interior, a plurality of lobes formed in said reinforcing member that have an interior lobe that is larger than a waist opening;
   a first plastic layer that is disposed in said lobes and extends into said waist opening;
   an exterior plastic layer that is disposed on substantially all of said outer surface of said reinforcing member and that is attached to said first plastic layer, said exterior plastic layer disposed on said reinforcing member in a contracted state that holds said exterior plastic layer securely to said reinforcing member;
   a recess formed in said reinforcing member, that is covered by said exterior plastic layer, and that secures an insert to said frame structure.

2. The frame structure of claim 1 wherein said frame structure comprises a non-structural frame member.

3. The frame structure of claim 2 wherein said frame structure comprises a mullion.

4. The frame structure of claim 1 wherein said insert comprises a frame for a protective layer for a photodetector.

5. The frame structure of claim 2 wherein said frame structure comprises a window frame.

\* \* \* \* \*